(12) United States Patent
Laubach et al.

(10) Patent No.: US 6,917,614 B1
(45) Date of Patent: Jul. 12, 2005

(54) MULTI-CHANNEL SUPPORT FOR VIRTUAL PRIVATE NETWORKS IN A PACKET TO ATM CELL CABLE SYSTEM

(75) Inventors: Mark E. Laubach, Mountain View, CA (US); Sanford L. Helton, San Jose, CA (US); Alireza Raissinia, Monte Sereno, CA (US); Paul A. Gordon, Santa Clara, CA (US); Malay M. Thaker, Campbell, CA (US); Kathleen M. Nichols, Woodside, CA (US)

(73) Assignee: Arris International, Inc., Suwanee, GA (US)

( * ) Notice: Subject to any disclaimer, the term of this patent is extended or adjusted under 35 U.S.C. 154(b) by 0 days.

(21) Appl. No.: 09/398,267

(22) Filed: Sep. 17, 1999

(51) Int. Cl.[7] ............................................. H04L 12/28

(52) U.S. Cl. ....................................... 370/392; 370/486

(58) Field of Search ................................ 370/235, 230, 370/412, 229, 232, 233, 234, 253, 389, 392, 396, 395.3, 395.31, 395.4, 395.41, 400, 409, 415, 486, 487

(56) References Cited

U.S. PATENT DOCUMENTS

| | | | | | |
|---|---|---|---|---|---|
| 5,963,557 | A | * | 10/1999 | Eng | 370/432 |
| 6,028,860 | A | * | 2/2000 | Laubach | 370/395 |
| 6,081,533 | A | * | 6/2000 | Laubach | 370/421 |
| 6,137,793 | A | * | 10/2000 | Gorman | 370/360 |
| 6,467,091 | B1 | * | 10/2002 | Lin | 725/126 |
| 6,490,727 | B1 | * | 12/2002 | Nazarathy et al. | 725/129 |

FOREIGN PATENT DOCUMENTS

EP  0695092 A1  1/1996  .......... H04N/7/173

OTHER PUBLICATIONS

Laubach, M., "To Foster Residential Area Broadband Internet Technology, IP Datagrams Keep Going, and Going, and Going", Computer Communications, vol. 19, No. 11, Sep. 1, 1997, pp. 867–875.

Rooney, S., et al, The Tempest: A Framework For Safe, Resource-Assured, Programmable Networks, IEEE Communication Magazine, vol. 25, No. 10, Oct. 1, 1998, pp. 42–53.

* cited by examiner

Primary Examiner—Chau Nguyen
Assistant Examiner—Ricardo Pizarro

(57) ABSTRACT

A two-way cable network offering high-speed broadband communications delivered via virtual private networks over a multi-channel shared media system. Bi-directional transmission of packet to ATM cell based communications is established between a head end communication controller and a number of subscriber terminal units, whereby individual cells are prioritized and routed according to a virtual connection. Virtual connections are organized to support multiple virtual private networks in a shared media CATV system. The virtual private network to which a particular STU belongs is user selectable and has the flexibility of handling multi up/downstream channels with different MAC domains. The present invention can also handle non-ATM MAC domains via the same common ATM switch. To overcome the limited number of addresses inherent to common ATM switches, a mapping/remapping function is implemented in the port cards. Furthermore, downstream as well as upstream traffic are filtered at each STU. In one embodiment, information pertaining to downstream traffic is used to implement predictive scheduling in order to improve the timing associated with the request/grant cycle. In another embodiment, a user has the ability to select a quality of service that best suits the needs of the current application. In a further embodiment, the scheduling function is associated with each of the receivers in order to provide improved scalability.

5 Claims, 38 Drawing Sheets

MULTI-CHANNEL SUPPORT FOR VIRTUAL PRIVATE NETWORKS IN A PACKET TO ATM CELL CABLE SYSTEM

FIELD OF THE INVENTION

The present invention pertains to high-speed broadband communications delivered via virtual private networks over a multi-channel shared media system. More particularly, the present invention relates to bidirectional transmission of packet to ATM cell based communications between a head-end communication controller and a plurality of subscriber terminal units whereby individual cells are prioritized and routed according to a virtual connection and whereby the virtual connections are organized to support multiple virtual private networks in a shared media CATV system.

BACKGROUND OF THE INVENTION

Due to the proliferation of personal computers, the widespread acceptance of the Internet, and the advent of the Information Age, there is a virtual explosion in the amount of digital data transmissions. Currently, one common method for transmitting and receiving digital data involves the use of telephone modems. A telephone modem is used to transmit digital data generated by a computer to an intended destination over standard telephone lines. The same modem also can receive digital data from a telephone line. This setup enables computers to gain access to the Internet and other on-line services over standard telephone jacks. Although this form of communications is convenient, it is painfully slow because telephone lines simply consist of pairs of twisted copper wires. These lines were primarily designed to carry analog voice signals rather than digital data. As such, telephone lines are bandwidth limited, and the rate at which digital data can be transmitted is relatively quite slow. It can take several minutes or even hours to download picture, audio, and video files via standard telephone modems. Hence, telephone modems are not ideally suited for conveying video (e.g., teleconferencing, movies, etc.), graphics (e.g., computer-aided design, medical imaging, simulations), or multimedia applications.

A faster medium for high-speed communications entails the use of dedicated computer networks, whereby computers are interconnected to form local area networks or wide area networks (LAN/WAN). However, the downside to this approach is the high cost of purchasing, routing, and maintaining the requisite interconnecting coaxial and fiber lines. Furthermore, highly skilled network administrators are necessary to monitor the network in order to keep it operational. In addition, expensive networking equipment (e.g., routers, hubs, repeaters, concentrators, servers, bridges, etc.) must be purchased and installed. Hence, the advantage of having faster data communications and higher bandwidth comes at a steep price. Furthermore, it is prohibitively expensive to set up dedicated computer networks amongst individual homes.

There is, however, another medium which is widespread and already in place and which also has a very high bandwidth suitable for transmitting vast amounts of information This medium is the cable TV (CATV) networks. CATV is comprised of coaxial and fiber optic cables which have very high transmission capacity. These CATV lines connect a central station or headend to set-top boxes in everyone's homes. CATV was primarily limited to being only a one-way transmission medium, whereby TV signals were broadcast from a headend terminal, over the CATV network, to a host of subscriber units. After down conversion, the RF TV signals are eventually displayed on a subscriber's television set.

Instead of simply broadcasting TV signals, it is feasible to use these same CATV networks to provide high capacity two-way data communications. One ideal implementation, as adopted by the present invention, is to use a Cell-based Asynchronous Transfer Mode (ATM) approach. ATM is ideally suited for supporting services requiring real-time functionality due to its precise control over delay and jitter, such as video teleconferencing, game playing, voice communications, etc. At the same time, ATM is also well suited for handling data transmissions which are not as delay sensitive (e.g., Internet services). In addition, the nature of an ATM cell based system allows for other multimedia applications to be upgraded without requiring iterative changes to the underlying structure. Hence, ATM offers several advantages over competing prior art systems which attempt to deliver digital data by using the CATV network as an end-to-end solution by converting it into a shared media local area network (LAN). Some prior art end-to-end CATV shared media LANs include Ethernet, Carrier Sense Multiple Access (CSMA), Collision Detect (CD), Token Ring, and Fiber Distributed Data Interface (FDDI) protocols. The main problem faced by these different schemes lies with dealing and handling time-critical data. Because much of the data being conveyed is highly delay sensitive, these prior art systems typically do not provide tight enough tolerances which are required in order to adequately support integrated services. As such, they fall far short of providing the degree of services that could potentially be derived from CATV networks. These problems associated with prior art systems can be overcome by using an isochronous ATM approach. For instance, Ethernet packets can be converted into ATM cells for transmission over the CATV network.

Unfortunately, ATM switches are typically restricted in the total number of addresses which can be handled. Since each subscriber terminal unit (STU) coupled to the CATV network has to have its own unique address, the total number of STUs which can be supported by a common ATM switching fabric is limited. The present invention provides one way to overcome this addressing restriction.

Another problem which must be overcome in converting a CATV system into a data highway relates to the fact that CATV networks have historically been limited to being a public service provider. The same content was indiscriminately conveyed to all the receiving stations. This scheme works well for public transmissions, such as television broadcasts. However, it fails utterly when dealing with transmissions that are sensitive or confidential in nature (e.g., a professional working at home). Hence, there is a need for some mechanism to ensure that specific data is securely routed to only the intended recipient STU or a specific group of STUs. Furthermore, it would be prudent to include some mechanism for filtering data to prevent intentional or benign errors from causing the entire CATV to break down. The present invention solves both these issues.

Yet another problem is that whereas some data transmissions are extremely delay sensitive, other data might not be as time critical but require a high degree of accuracy. For example, telephone communication requires that the corresponding data be transmitted rapidly so that the parties can carry on conversations with imperceptible lags. In contrast, video data can be routed as bandwidth permits because users can suffer slight delays in receiving the data with minor perceptible distortions, but the data should be error-free to ensure a high quality picture. Thus, it would be beneficial if a user could somehow tailor their reception to meet the specific needs of their current application. The present invention allows a user to select a Quality of Service that best meets the current needs.

The present invention offers solutions to all the problems described above so that CATV networks can function as a flexible, effective, economic, and fully integrated two-way multimedia bearer system, thereby granting immediate support for Internet services, traditional voice telephony, and digital video services.

SUMMARY OF INVENTION

The present invention pertains to a two-way cable network offering high-speed broadband communications delivered via virtual private networks over a multi-channel shared media system. Bi-directional transmission of packet to ATM cell based communications is established between a head end communication controller and a number of subscriber terminal units, whereby individual cells are prioritized and routed according to a virtual connection. Virtual connections are organized to support multiple virtual private networks in a shared media CATV system. The virtual private network to which a particular STU belongs is user selectable, provided that the user is authorized. Furthermore, the same STU can service two or more personal computers, hereby the computers can belong to either the same or different virtual private networks. Due to the flexibility offered by the present invention, STUs belonging to the same virtual private network can be on different downstream channels and different upstream channels on the same MAC domain; different downstream channels and the same upstream channel on the same MAC domain; or different downstream channels and different upstream channels on different MAC domains. The present invention can also handle non-ATM MAC domains via the same common ATM switch. To overcome the limited number of addresses inherent to common ATM switches, a mapping/remapping function is implemented in the port cards.

In one embodiment, multicast downstream packets are received by a number of STUs, but filtering is performed at each STU so that only those packets which were intended for that particular STU are processed. For upstream transmissions, ARP filtering is performed by the STUs in order to prevent invalid data from compromising the system. In another embodiment, information pertaining to downstream traffic is used to implement predictive scheduling in order to improve the timing associated with the request/grant cycle. In yet another embodiment, a user has the ability to select a quality of service that best suits the needs of the current application. In a further embodiment, the scheduling function is implemented on the receiver cards in order to provide improved scalability.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
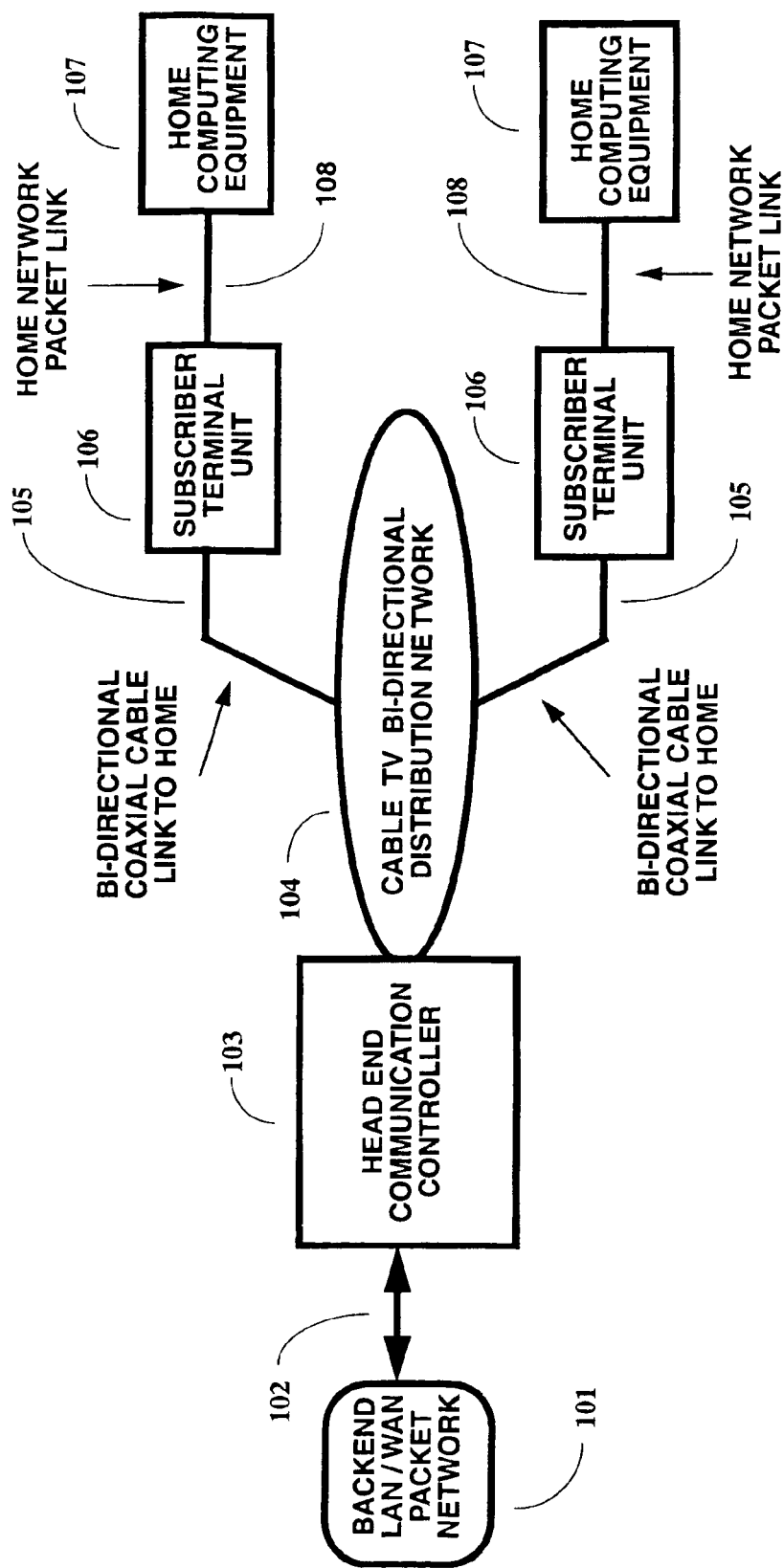
FIG. 1 shows a head-end communication controller coupled to the subscriber terminal units in a cable television network.

A system and method for prioritized packet to ATM cell bi-directional transmission between a headend controller and multiple station terminal units over a cable network is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Residential broad band access network technology based on Asynchronous Transfer Modem (ATM) cell transmission is viable. The capabilities provided by ATM access network support integrated services bandwidth available in excess of those provided by traditional twisted pair copper wire public telephone networks. ATM services to the subscriber home place needed Quality of Service capability closest to the subscriber premises allowing immediate support for Internet services, traditional voice telephony, and digital video services.

The selection of ATM cells as the data-link layer protocol data unit for Cable TV networks has the advantage in that it provides a suitable integrated multiplexing platform capable of supporting both Constant Bit Rate (CBR) scheduling service for isochronous services and the Available Bit Rate (ABR) scheduling service for best effort traffic classes which is well suited for internet services. In addition, the nature of ATM cell based systems allow for other multimedia applications to be added in the future without requiring iterative changes to the basic ATM protocol. Cable operators can deploy ATM systems as part of an evolutionary path to a fully integrated multimedia bearer service offering.

In one embodiment, a Media Access Control (MAC) protocol layer is layered or coupled to existing physical RF transmission system to create a means to pass cell-based data-link layer information between cooperating subscriber terminal units (STU—also known as cable modems) and the head-end controller. In one embodiment, the ATM data-ink protocol is layered in a straightforward manner using a slotted approach for both the downstream and upstream RF channels. Downstream traffic management is not distributed and is under the direct control of the head-end communications controller. Upstream traffic management must be precisely controlled to support the Quality of Service (QOS) needs of the subscriber system on a user demand basis. The choice of the allocation protocol and the placement of the bandwidth ownership intelligence is important. To properly allocate and mange CBR streams in a contention-free manner, the straightforward approach is to place the ownership of the upstream bandwidth subscriber unit and by centralizing the allocation intelligence in the network. Communications between the head-end controller and each subscriber unit is important as permission to use the upstream channel is granted by the head-end controller whose allocation algorithm must take into account needs communicated to it by each subscriber unit. These communications between bearer service elements must support at least a subset of the ATM User Network Interface (UNI) traffic management classes: i.e., Constant Bit Rate (CBR), Available Bit Rate (ABR), Variable Bit Rate (VBR), and Unspecified Bit Rate (UBR).

Further, the use of ATM as the basic data-link protocol data unit transmitted over the access network directly supports the use of non-ATM network interfaces with the subscriber home or small business. Specifically, other networking services are transmitted over ATM using standard ATM adaptation layer methods as details in ITU-T specifications, ATM Forum specifications, and Internet Engineering Task Force Internet protocol standards. Examples of the other network services include, but are not limited to: Ethernet, IP datagrams, digital video using MPEG2 standards, and telephony.

Residential system architectures shall be constructed such that both small and large systems can be built that work in the variety of cable television plants that exist today and allow incremental growth such that deployment of Synchronous Optical NETwork (SONET) technology is easily incorporated in a variety of places within the back -end and distribution networks.

As used herein, the following terms have the following meanings:

"ATM data" refers to cells having a fixed length comprised of a header followed by a payload, which is commonly 48 bytes. The ATM Forum Traffic management Revision 4.0 specification defines an architecture which supports five ATM service categories: these are Constant Bit Rate (CBR), Real-Time Variable Bit Rate (rt-VBR), Non-Real-Time Variable Bit Rate (nrt-VBR), Available Bit Rate (ABR), and Unspecified Bit Rate (UBR). In addition, various minimum and maximum data bit rates may be specified for each of the service categories. When a user requests services from an ATM network, they select the service category and the desired data rates. CBR directly supports voice telephony and some forms of video-teleconferencing, ABR and UBR directly support Internet data services, and VBR directly supports downstream digital video services.

"A Cable Television Network", also known as a Community Access Television (CATV) network. A traditional coaxial cable tree and branch or Hybrid Fiber-Coax (HFC) network. The downstream signals and downstream channels originate from a CATV head end (or headend). The upstream signals and upstream channels terminate in the CATV headend. Typical CATV signals enter and exit the headend via coaxial cable or combinations of coaxial cable and amplitude modulated (AM) optical fiber. It is envisioned that future CATV distribution systems will incorporate the individual or combined use of either traditional coaxial cable, AM modulated optical fiber, digitally modulated optical fiber, or wireless "last drop" systems. Further, wiring in a headend typically uses traditional coaxial cabling for interconnecting equipment and distribution systems within the headend, it is envisioned that future wiring may consist of individual or combinations of coaxial cable, AM fiber, digital fiber, or wireless techniques.

"Channel spacing" refers to the minimum RF spectral bandwidth spacing needed between communication channels, this is also referred to as the minimum RF spectral bandwidth needed by a communication channel.

"Communications channel" refers to the allocation of a range of radio frequency spectrum for conveying digital information.

"Contention grant" refers to the signal generated by the headend controller which gives permission for any STU to transmit in a particular slot.

"Direct grant" refers to the signal generated by the headend controller which allows an STU to transmit an ATM cell.

A "downstream signal" embodies both a modulation and demodulation means by which digital information is encoded in a downstream form suitable for transmission over the downstream transmission segment media, transmitted by the headend controller, and ultimately decoded in a manner suitable for reception and processing by the cable modem. The downstream form is one of or a combination of a common variety of modulation techniques suited to the transmission medium such as, but not limited to, Quadrature Phase Shift Keying (QPSK), Quadrature Amplitude Modulation (QAM); or other advanced modulation techniques such as, but not limited to, Code Division Multiple Access (CDMA), Spread Aloha, or other orthogonal based system such as Discrete Multitone (DMT); or other technique suitable to modulating signals through optical fiber; or other technique suitable for wireless last-drop systems. A downstream distribution system may provide conversion from one downstream media to another, on a segment by segment basis. One example is coaxial cable in the headend, to AM fiber (in an HFC system) and back to coaxial cable.

A "downstream channel" embodies the spectral bandwidth, frequency, and other spectral characteristics required for transmitting and amplifying a downstream signal through the downstream media.

In the preferred embodiment, "downstream latency" (or downstream channel pipeline delay) refers to the time delay experienced by a packet as is traverses the downstream channel. Downstream Latency is objectively measured between a transmission reference point in the head-end controller and a reception reference point in the Subscriber Terminal Unit or Cable modem. Downstream Latency is subjectively measured by users as a perceivable component of response time. Downstream Latency is a combination of both fixed and variable time-delay components, including, but not limited to, Forward Error Correction processing delay and over-the-cable propagation delay. Different Forward Error Correction techniques have different amounts of burst protection and subsequently different amounts of end-to-end pipeline delay. In general, the wider the burst protection, the longer the downstream delay. For example, some FEC techniques will provide error correction protection for noise burst sizes of up to 19 microseconds, with a 600 microsecond latency contribution. Other techniques will provide up to 96 microseconds of noise burst protection with 3.7 milliseconds of latency contribution.

"A Headend Digital Communications Controller or Headend Controller" is a device located in the CATV headend responsible for mastering the communications between itself and a plurality of cable modems. The headend controller is responsible for managing downstream and upstream bandwidth resources which have been assigned to a cable modem service. A downstream channel is serviced by a transmitter port card located within the headend controller. An upstream channel is serviced by a receiver port card located within the headend controller. A port card may service one or more channels. A headend controller may simultaneous provide service and control one or more downstream channels and one or more upstream channels.

A "Home Equipment (HE), or Home Terminal Equipment (HTE)" is a consumer appliance device, typically located in the subscriber's home, which participates in an exchange of digital data with other network devices connected to the Home Network. In the preferred embodiment, a Home Equipment is a two-way interactive digitally networked packet exchange device. Examples of Home Equipment are personal computers, digital telephones, digital televisions, digital answering machines, digital FAX machines, digital network computing appliances, digital interactive game devices, etc. It is envisioned that future Home Equipment will be interconnected to the Home Network by the individual or combined use of either traditional coaxial cable, twisted pair copper cable, fiber optic cable, or wireless links. It is noted that Home Equipment may also be one-way transmit communication devices, such as a burglar alarm system (e.g., surveillance video) or energy management system (remote sensing equipment), which provide sensory management for a subscriber's home. It is noted that Home Equipment may also be one-way receive communication devices, such as legacy television systems, X10power control stations, toasters, etc. which in the future will receive operational instructions from the Home Network or from other Home Equipment.

A Home Computing Equipment (HCE) is a subset of Home Equipment. In the preferred embodiment, Home Computing Equipment consists of two-way interactive networked packet exchange devices such as personal computers, X Termainals, Unix workstations, etc. It is envisioned that future Home Computing Equipment will be interconnected to the Home Network by the individual or combined use of either traditional coaxial cable, twisted pair copper cable, fiber optic cable, or wireless links.

"Null grant" refers to a signal issued by the headend controller to an STU which instructs the STU to delay entering an idle state.

"Packet data" refers to the components of a protocol packet comprised of a fixed or variable length header and either a fixed or variable length data payload.

"QAM" refers to Quadrature Amplitude Modulation, which is a well known encoding and decoding method for digital data. "16 QAM" refers to a method which produces a digital bit carrying gain of 4 bits per Hertz. "64 QAM" refers to a method which produces a digital bit carrying gain of 6 bits per Hertz. "256 QAM" refers to a method which produces a digital bit carry gain of 8 bits per Hertz.

"Quality of Service" (QoS) is specified using three separate parameters: peak-to-peak cell delay variation (known commonly as jitter); maximum cell transfer delay (also know as latency) which specifics the maximum end-to-end delay tolerance allowed for the connection; and cell lost ratio, this is basically a maximum tolerable discard rate for ATM cells (which directly impacts error loss, rate). The user specifies the service category, bandwidth parameters for the service category, and the QoS requirements for each connection. For example, users can specify an ABR or UBR connection with a large maximum end-to-end delay tolerance (very much like the Internet is today), or they may specify an ABR with a very short end-to-end maximum end-to-end delay tolerance, this is needed for interactive gaming over Internet for example. Further a downstream connection may specify a VBR connection with desirable bandwidth, but with very low cell loss, very tight jitter bounds, and not much care for end-to-end delay, which is very well suited for downstream digital video. ATM networks support a variety of combinations of services classes and QoS. User requirements may be communicated to the ATM network via User Network Interface (UNI) signaling for Switched Virtual Circuits (SVCs), or via administrative provisioning for Permanent Virtual Circuits (PVCs), or indirectly through other signaling means. It should be noted that indirect methods may be used to communicate user signaling needs, these methods include: the automatic sensing of packets meeting certain criteria, where the packets are examined which flow through an observation and control point in the system, and a change to a particular type of packet service flow (e.g. a voice over IP telephone session starting or stopping) would affect a bandwidth or QoS change to the underlying bearer service; an out of band users interfaces, such as a web server home page, where a user could connect using their standard web browser client software, and affect a QoS change to the services they are receiving over a cable modem to their home; or via a proxy signaling technique, where at the application layer or transport layer (e.g. via an API) a specific protocol message could be interpreted for service class or QoS requirements, where a proxy agent could observe these needs, and produce UNI signaling appropriate for the underlying bearer service. The mechanism by which the subscriber (user) can directly or indirectly affect a change to the QoS of their delivered service will be called the "QoS Knob" is this disclosure. It is noted that the QoS Knob can be implemented by a variety of direct and indirect means as mentioned above.

A "Subscriber Terminal (STU)" is a device typically located at the home of a CATV network subscriber. A Subscriber Terminal Unit receives information and instructions via signals received on one or more downstream channels by the headend controller A Subscriber Terminal Unit transmits information and replies via signals one to more upstream channels to the headend controller. Typical CATV signals enter and exit the Subscriber Terminal via coaxial cable. It is envisioned that future Subscriber Terminal Units will exchange information with the headend controller via the individual or combined use of either traditional coaxial cable, AM modulated optical fiber, digitally modulated optical fiber, or wireless links. In the preferred embodiment, a Subscriber Terminal Unit to one or more Home Equipment via one or more physical media links, such as twisted-pair-copper (e.g. Ethernet), traditional coaxial cable, fiber optic cable, or wireless; or the Subscriber Terminal Unit connects to the Home Network. It is noted that a Subscriber terminal Unit may support more than one type of physical link and connect to a digital telephone using a wireless link.

In the preferred embodiment, a "Cable Modem" (CM), is Subscriber Terminal Unit which connects to one or more Home Computing Equipment (e.g. personal computers) via one or more physical link connections. A Cable Modem supplies a Cable Modem Service to a Home Computing Equipment. A Subscriber Terminal Unit may simultaneously support both a Cable Modem Service together with other services such as a telephone connection to a Home Equipment telephone or a video service to a Home Equipment digital television. In the preferred embodiment, a cable modem receives downstream signals via a single downstream channel and transmits upstream signal via a single upstream channel. It should be noted that a cable modem could support a plurality of downstream channels or a plurality of upstream channels.

"QPSK" refers to Quadrature Phase Shift Keying modulation, which is a well known encoding and decoding method for digital data. QPSK produces a digital bit carrying gain of 2 bits per Hertz.

An "upstream signal" embodies both a modulation and demodulation means by which digital information is encoded in an upstream form suitable for transmission over the upstream transmission segment media, transmitted by the cable modem, and ultimately decoded in a manner suitable for reception and processing by the headend controller. The upstream form is one of or a combination of a common variety of modulation techniques suited to the transmission medium such as, but not limited to, Quadrature Phase Shift Keying (QPSK), Quadrature Amplitude Modulation (QAM); or other advanced modulation techniques such as, but not limited to, Code Division Multiple Access (CDMA), Spread Aloha, or other orthogonal based system such as Discrete Multitone (DMT); or other technique suitable to modulating signals through optical fiber. An upstream distribution system may provide conversion from one upstream media to another on a segment by segment basis. One example is coaxial cable in the home, to AM fiber in the upstream distribution network, and back to coaxial cable in the headend.

"Upstream" refers to the direction of communications form the subscriber home of small business to the CATV head-end.

A "upstream channel" embodies the spectral bandwidth, frequency, and other spectral characteristics required for transmitting and amplifying a upstream signal through the upstream signal through the upstream media.

In the preferred embodiment, "upstream latency" (or upstream channel pipeline delay) refers to the time delay experienced by a packet as is traverses the upstream channel. Upstream Latency is objectively measured between a transmission reference point in the Subscriber Terminal Unit and a reception reference point in the head-end controller. Upstream Latency is subjectively measured by users as a perceivable component of response time. Upstream Latency is a combination of both fixed and variable time delay components, including, but not limited to, Forward Error Correction processing delay and over-the-cable propagation delay and upstream channel scheduling and access delay.

Different Forward Error Correction techniques have different amounts of burst protection and subsequently different amounts of end-to-end pipeline delay. In general, the wider the burst protection, the longer the upstream delay.

In the preferred embodiment, a Media Access Control (MAC) Domain is an association of one or more downstream channels with one or more upstream channels for the purposes of 1) allocating downstream data resources to one or more cable modems, 2) allocating upstream data resources to one or more cable modems, 3) providing a means by which cable modem service requests, management messages, and user data can be received from an upstream channel, and 4) providing a means by which resource grants, management messages, and user data can be transmitted on a downstream channel. A MAC domain has associated with it one or more scheduler functions which process service requests and user data flow observations in order to allocate downstream and upstream data resources in a fair manner to allow participating cable modems. In general, the downstream and upstream channels of a MAC domain will usually share the same MAC packet formats; i.e., ATM cells, variable length packets, or combinations of ATM cells and variable length packets. There is usually MAC specific overhead information associated with each of the data format types. It is noted that a MAC domain may support the delivery of integrated services: the transport of any combination of voice, video, data, and interactive games. It is noted that a MAC domain may provide service beyond high speed data to cable modems, that is interactive services to television, telephone, and other subscriber home appliances. It is noted that a headend controller may support more than one MAC domain service. In this case, there will be a disjoint (non-overlapping) set of downstream and upstream channels associated with each MAC domain. It is noted that hybrid combinations may exist, although not practical; that is a cable modem may participate in the downstream channel(s) from one MAC domain, yet participate in the upstream channel(s) of another MAC domain.

"A virtual network or Virtual Private Network (VPN) is a facility based on a circuit switched network or packet switched network (with sufficient multiplexing capability) that gives the user the appearance of a private network for a given service (e.g. telephone or data networking). The virtual network is dynamically configured in the sense that the cable operator or the user provides entries into a database used by the cable operator to configure, manage, monitor, and report on the operation of the network. VPNs are characterized by flexibility, a rich set of features, a high degree of operator control, and an ability to be changed quickly based on operator or customer needs. In the preferred embodiment, a VPN is taken to be a group of users sharing a OSI Layer 2 network, e.g. Ethernet or IEEE 802.3 network. One user of the group may be the cable operators networking interface to external routing and/or switching equipment. The number of customers in a VPN group may be as small as one and as many as the number of customers receiving high-speed data services from the cable operator. A customer's Subscriber Terminal Unit or cable modem may belong to one or more VPNs. The customer's home computing equipment may belong to one or more VPNs. The customers home equipment VPN assignments may be different that the Subscriber Terminal Unit or cable modem VPN assignments; that is a Subscriber Terminal Unit or cable modem may support multiple home equipment, which each equipment operating in a different VPN, or combinations of the home equipment operating in the same VPNs.

The deployment and configuration of VPNs over a CATV plant are independent of the downstream channels and upstream channels being serviced by the headend controller. The deployment and configuration of VPNs over a CATV plant are independent of the number of MAC domains being serviced by the headend controller. It is noted that the OSI Layer 2 VPN presented here can be extended to support an OSI Layer 3 networking Virtual Logical IP Subnet (VLIS) in a straightforward manner. It is noted that a VPN also applies to circuit switched services, such as telephony and video teleconferencing. In the case of a telephony service VPN, it could be a centrex group or a local PBX group, an Off Premise Extension (OPX) group, etc. In the case of video teleconferencing, a VPN may be used for a local conference group or meeting.

Referring to FIG. 1, a head-end communication controller 103 coupled to the subscriber terminal units 106 in a cable television network 104 is shown. A backend LAN/WAN packet network 101 transmits and receives packet data to/from the headend controller 103 over a network interface 102. These packet data correspond to exclusive or combination of Ethernet, ATM (including SONET, D353, or T1), FDDI, or voice (TR303, TR57, or TR08) protocols. The headend controller 103 facilitates communications, both upstream and downstream, and is responsible for all bandwidth management and all resource management, including modulation, frequency, bandwidth, and power assignment. The headend controller prioritizes upstream ATM cells. Moreover, it also converts packet data into ATM cells and assigns virtual connection to each individual ATM cell. This virtual connection information allows individual cells to be prioritized for transmission. In addition, the virtual connection information is used to identify one or more subscriber terminal units (STUs) which are to receive the particular cell. More specifically, the virtual connection information identifies particular circuits within designated STUs to which an individual ATM cell is to be routed. The ATM cells are then sent as one or more RF signals over the bidirectional CATV distribution network 104. The CATV distribution network 104 consists of standard coaxial cable, hybrid fiber-coax (HFC) cable, or fiber optic cables. Cables 105 provide physical links to multiple subscriber terminal units, such as STUs 106. Local packet links 108 are used to establish communications between the STUs 106 and personal computers 107.

In summary, packet data originating from backend LAN/WAN network 101 are sent to the headend controller 103 and converted into ATM cells. These ATM cells are prioritized and routed according to their respective virtual connections and sent downstream as RF signal(s) over the CATV network 104. The target STU(s) 106 demodulate the RF signal(s), convert the ATM cells into data packets, and forwards the packet data to PCs 107. Conversely, a number of PCs 107 may forward packet data to their respective STUs 106. The packet data are converted into ATM cells and transmitted upstream in a slotted burst mode over the CATV network 104 to the headend controller 103. The ATM cells are then converted back into packet data which are sent on to the LAN/WAN network 101.

Figure 2:
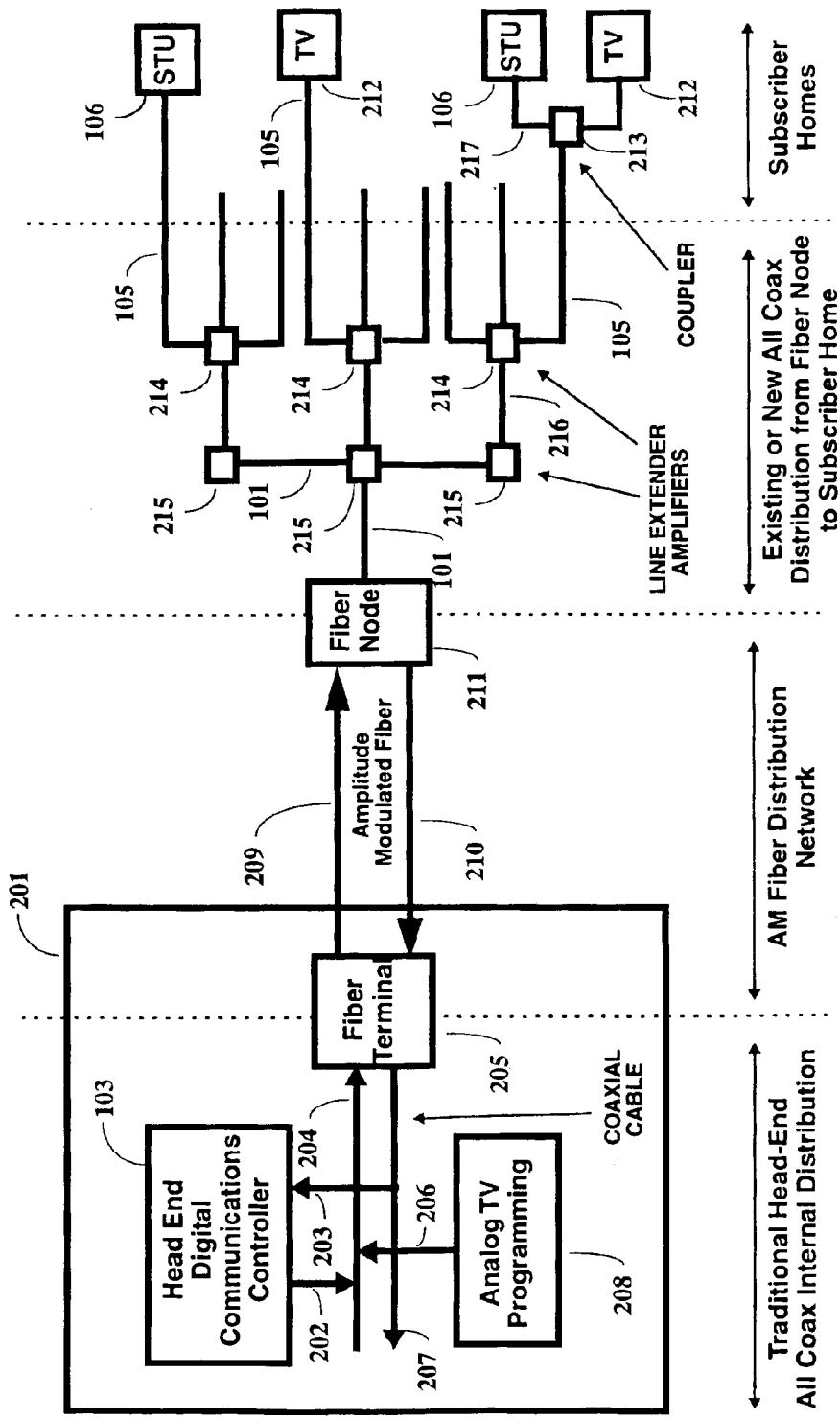
FIG. 2 illustrates a Hybrid Fiber-Coax Cable TV distribution network with a headend network and the placement of the head-end communications controller and subscriber terminal units.

FIG. 2 illustrates a Hybrid Fiber-Coax Cable TV distribution network with a headend network 201 and the placement of the head-end communications controller 103 and subscriber terminal units 106. The headend network 201 consists of a headend digital communications controller 103 for controlling all digital data traffic, both to the fiber terminal 205 via coaxial links 202 and 204 and from the fiber terminal 205 via coaxial links 203 and 207. Traditional analog TV programming by block 208 can be supported as well by transmitting the RF television signals over lines 206 and 204 to the fiber terminal 205. Fiber terminal 205 is used as an interface to the fiber node 211. Amplitude modulated fiber cables 209–210 provide the connections between the fiber terminal 205 and fiber node 211. A plurality of junctions 213–215 splitting off from fiber node 211 form a coaxial distribution network for routing signals to/from a number of STUs 106 and television sets and set-top boxes 212. For example, STU 106 is connected to fiber node 211 via line 105, line extender/amplifier 214, line 216, line extender/amplifier 215, and line 101. Likewise, a television set or set-top box 212 is connected to the fiber node 211 via coupler 213, line 105, line extender/amplifier 214, line 216, line extender/amplifier 215, and line 101. The delineation between the various stages of a traditional headend all coax internal distribution, analog fiber distribution network, existing or new all coax distribution, and subscriber homes/offices is shown in this figure.

Figure 3:
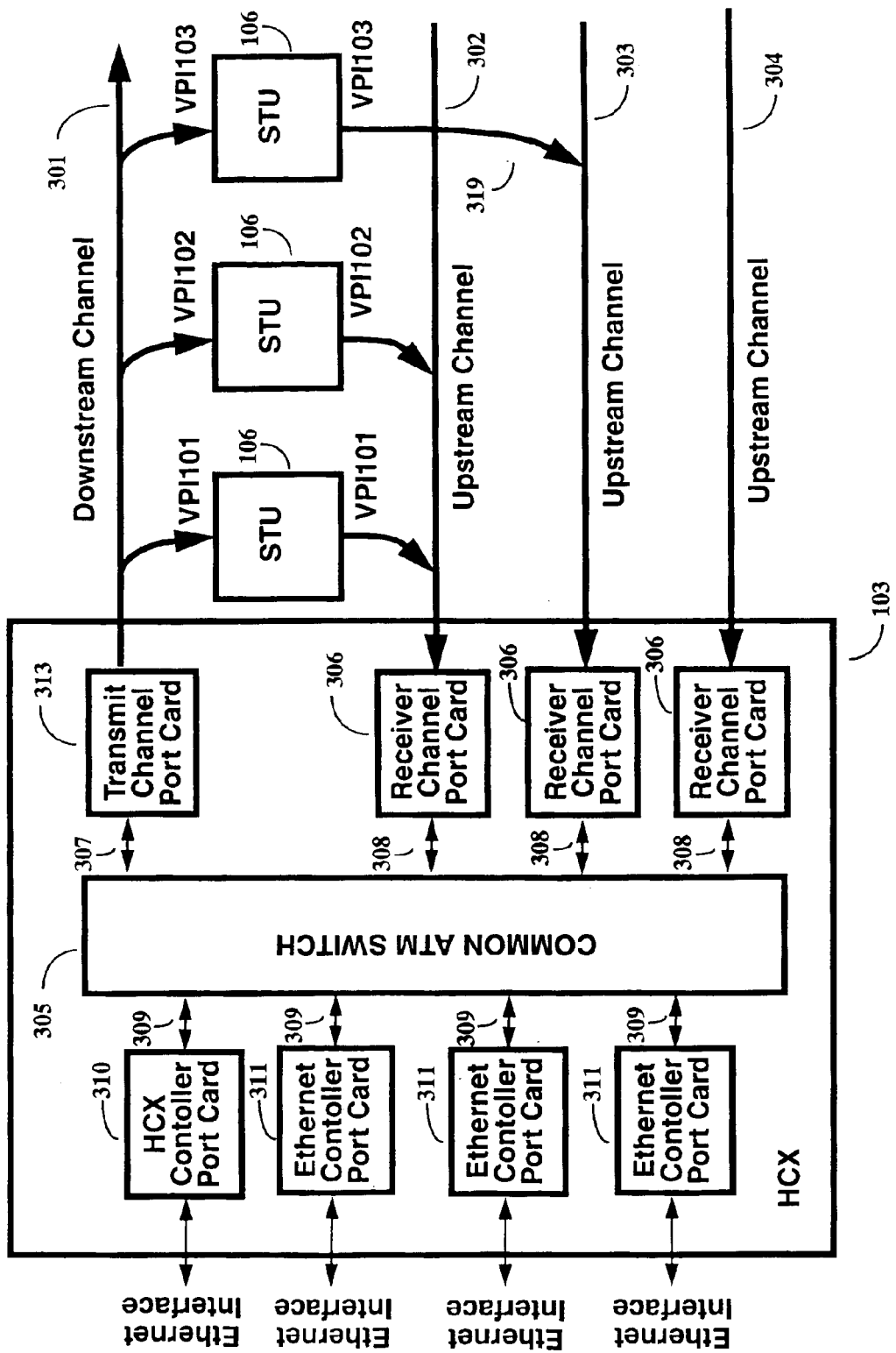
FIG. 3 illustrates the connection of downstream and upstream channels between the headend controller and the subscriber terminal units.

FIG. 3 illustrates the connection of downstream 301 and upstream channels 302–304 between the headend controller 103 and the subscriber terminal units 106. The headend controller (HCX) 103 is comprised of an HCX controller port card 310 which allows an external device/network to direct and monitor the operations of the HCX, including placing of STUs on channels, moving STUs from channel to channel, managing system bandwidth resources, and maintaining the station provisioning database. A number of ethernet controller port cards 311 (also referred to as Ethernet root controllers) are used to provide an interface between the HCX 103 and a number of Ethernet signals. The ethernet communications is routed according to the command ATM switch 305. One or more RF signals containing ATM cells are sent by the transmit channel port card 313 to the various STUs 106 via the downstream channel 301. Although only one downstream channel is shown, other embodiments include multiple downstream channels. Individual ATM cells are routed to their intended destinations according to their respective virtual path identifiers (VPIs). The VPIs are included as part of the ATM cells. For example, VPI101 is used to identify the left STU; VPI102 is used to identify the middle STU; and VPI103 is used to identify the right STU. Any number of upstream channels 302–304 may be used by the STUs 106 to transmit signals to the HCX 103. A specific feature of the present invention is that if more than one upstream channel is active for that head-end controller on a given physical cable plant return, then stations may be hopped from one upstream channel to another. For example, VP103 may be hopped onto upstream channel 304 in lieu of the regular upstream channel 302 via VPI103 and line 319. This behavior is under control of the head-end and will be used for load balancing, or to move stations to a cleaner upstream channel in the event of severe noise impairments, etc. The receiver channel port cards 306 are used to receive slotted, burst RF signals containing ATM cells from each of the upstream channels. It should be noted that the cards 306, 3310, 311, and 313 are all connected to a common ATM switch 305 via links 307–309.

Figure 4:
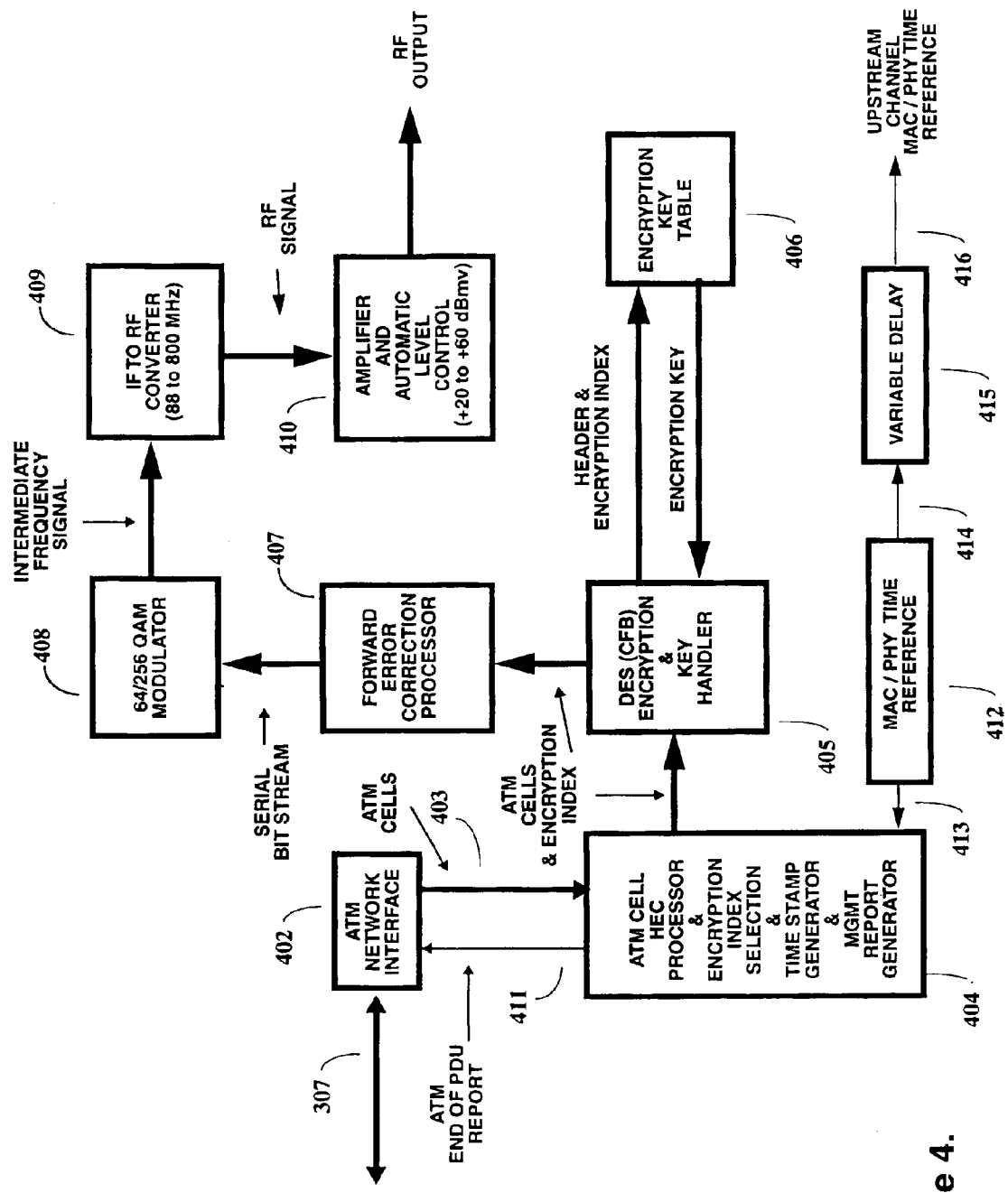
FIG. 4 is a detailed block diagram of the transmit channel port card in the headend controller used for processing downstream transmissions.

FIG. 4 is a detailed schematic of the circuitry (transmitter channel port card) in the headend controller used for processing downstream transmissions. ATM cells containing packet data arrive from an outside source (e.g., a computer network) via the common ATM switch on line 307. These ATM cells are input to an ATM network interface 402 which converts the cells from a format corresponding to the interconnect of the common ATM fabric to a format corresponding to the card (e.g., a conversion from sonic or ATM25 twisted pair connection to a bus signals appropriate for a printed circuit board). The ATM cells are then sent over line 403 to be processed by the ATM cell processor 404 which performs a Header Error Check (HEC); selects an encryption index; generates a time stamp; and generates a management report. The ATM cells and the encryption index are sent to a Data Encryption Standard (DES) encryption and key handler block 405 which encrypts the ATM cell payload according to an encryption key. The encryption key is supplied by referencing the header and encryption index to an encryption key table 408. A forward error correction processor 407 provides error correction capability (e.g., CRC) for individual ATM cells. The resulting serial bit stream is then modulated by a 64/256 QAM modulator 408. The modulated intermediate frequency (IF) signal is converted to a radio frequency (RF) signal by IF to RF converter 409 for downstream transmission over the CATV network. In the currently preferred embodiment, the RF signal corresponds to 88 to 800 MHz. Before transmission, the RF signal is amplified and automatic level control is performed by block 410. In the currently preferred embodiment, the power level of the RF signal is maintained at +20 to +60 dBmv. The downstream RF channel is managed as a one-to-many system in that the headend has one transmitter and each station has one receiver. There can be many stations participating on that single downstream channel. Each station is addressed separately (unicast), via a group address (multicast), or via an all stations broadcast (broadcast). The details on station addressing are presented later in this description.

Referring back to block 404, the time stamp being generated corresponds to an inverted HEC value at periodic intervals. Alternatively, an ATM cell can be embedded with a unique time stamp in its payload. In order to generate the time stamp, the time stamp generator receives a timing signal on line 413 from the MAC/PHY time reference block 412. In addition, this same timing signal is delayed by variable delay block 415 and sent via line 416 to the receiver channel port-cards operating with the transmitter card in the MAC scheduling domain. The variable delay is set specifically to correlate with the round trip time of the system (e.g., end-to-end delays including the FEC processing time in the head end, downstream propagation time, FEC processing time in the cable modem, processing time through the cable modem, upstream FEC processing time, upstream propagation delay, and upstream demodulating processing time). This delayed timing signal is used by the receiver port cards as part of the ranging scheme.

The ATM End of PDU Report signal on line 411 is generated as part of the management report. Header information corresponding to ATM cells are examined to determine whether that cell contains an End of PDU (Protocol Data Unit) bit that has been set. If the cell's End of PDU bit is set, a report message is generated stipulating that an End of PDU was detected. The report also contains a time stamp and that cell's VPI and VCI. This message is used for scheduling purposes.

The report signal of line 411 consists of one or more messages packaged within one or more ATM cells. The operation of the Management Report Generator 404 has been detailed sufficiently to enable description of the predictive scheduling invention described later in the embodiment. The specific mechanisms used to generate the end of PDU report can be simple, that is anytime an AAL5 end of pdu bit is sampled in the ATM cell flow, or may be more complex to examine only certain VCI values for certain VPI values. Such discrimination would be necessary to only enable this report feature on select VCI pertaining to one or more specific STUs out of the set of all STUs.

Figure 5:
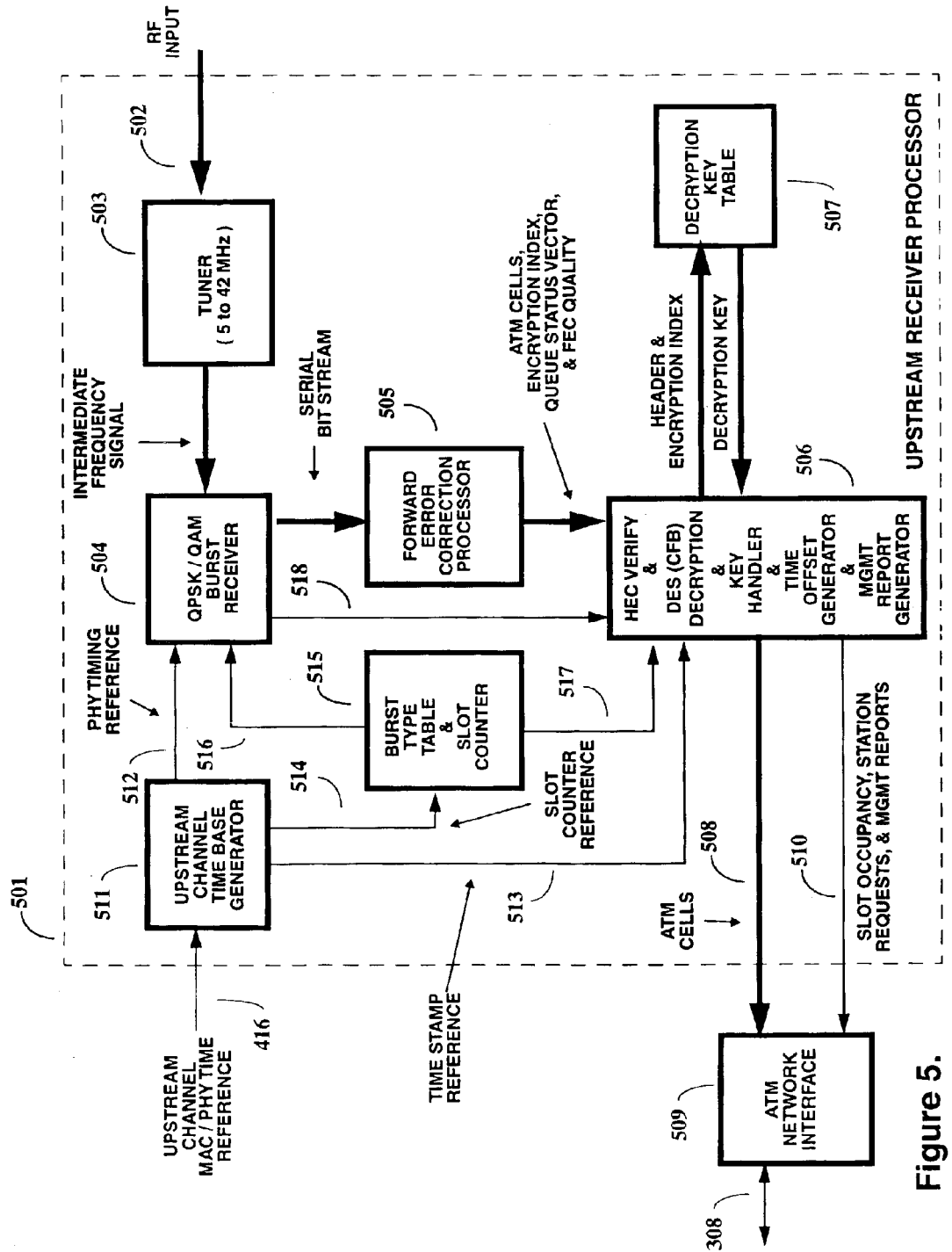
FIG. 5 shows a detailed block diagram of the receiver port card of the headend controller used for processing upstream transmissions.

FIG. 5 shows a detailed schematic diagram of the headend controller used for processing upstream transmissions. An upstream receiver processor is shown as block 501. One or more RF signals received from the CATV network are input via line 502 to the headend controller. A tuner 502 is used to tune in the frequencies of interest. In the currently preferred embodiment, this corresponds to 5 to 42 MHz. The IF signal output from the tuner is demodulated by a QPSK/QAM burst receiver 504. The demodulated serial bit stream containing the ATM cells is then sent to the Forward Error Correction Processor 505. The output from FEC processor block 505 includes ATM cells, an encryption index, queue length, and reception quality data (e.g., received error-free, received with correctable error, or received with incorrectable error). This information is sent to the HEC Verify block 506.

Another input to Upstream Receiver Processor 501 is the upstream channel MAC/PHY time reference signal from line 416 which is input to the Upstream Time Base Generator 511. Generator 511 accepts the timing signal from the transmitter card and generates a PHY time signal, a slot time signal, and a time stamp signal. The PHY time signal is input to the QPSK/QAM Burst Receiver 504 on line 512 and is used to perform ranging. The slot time signal is sent to the Burst Type Table and Slot Counter 515 via line 514. Burst Type Table and Slot Counter 515 tracks the number of slots, slot sizes, and the number of slots per burst on the upstream. It also determines the type of burst that is received. This information is sent via line 516 to the QPSK/QAM Burst Receiver 504 so that it can set its demodulator and equalizer to specifically receive that particular burst type. The HEC Verify block 506 also receives this information.

The HEC Verify Block 506 also includes a DES (CFB) Decryptor, a Key Handler, a Time Offset Generator, and a Management Report Generator. The HEC Verify Block 506 outputs a header and encryption signal to the Decryption Key Table; ATM cells to the ATM Network Interface 509 on line 508; and a signal containing slot occupancy, station requests, and management reports also to the ATM Network on line 510. The header and encryption index signal is used to index encryption key table 507 in order to determine the proper encryption key. Based thereon, the HEC Verify block 506 can output ATM cells to the ATM network interface 509 which converts the data into packets for output to an external device or network via line 308. The slot occupancy, station requests, and management reports signal on line 510 contains information regarding whether a slot assigned to a particular cable modem for transmission was actually utilized by that cable modem and whether, during a contention opportunity, a cable modem transmitted, no. cable modem transmitted, or RF energy detected, no discernible data occurred. The power level of a slot that was received is supplied by the QPSK/QAM Burst Receiver 504 on Line 518. In addition, station requests generated as part of the normal request grant protocol are included in the management reports. These station requests include those requests which arise in contention opportunities as well as "piggybacking" requests which are formed in response to the queue length identifier of block 505.

Figure 6:
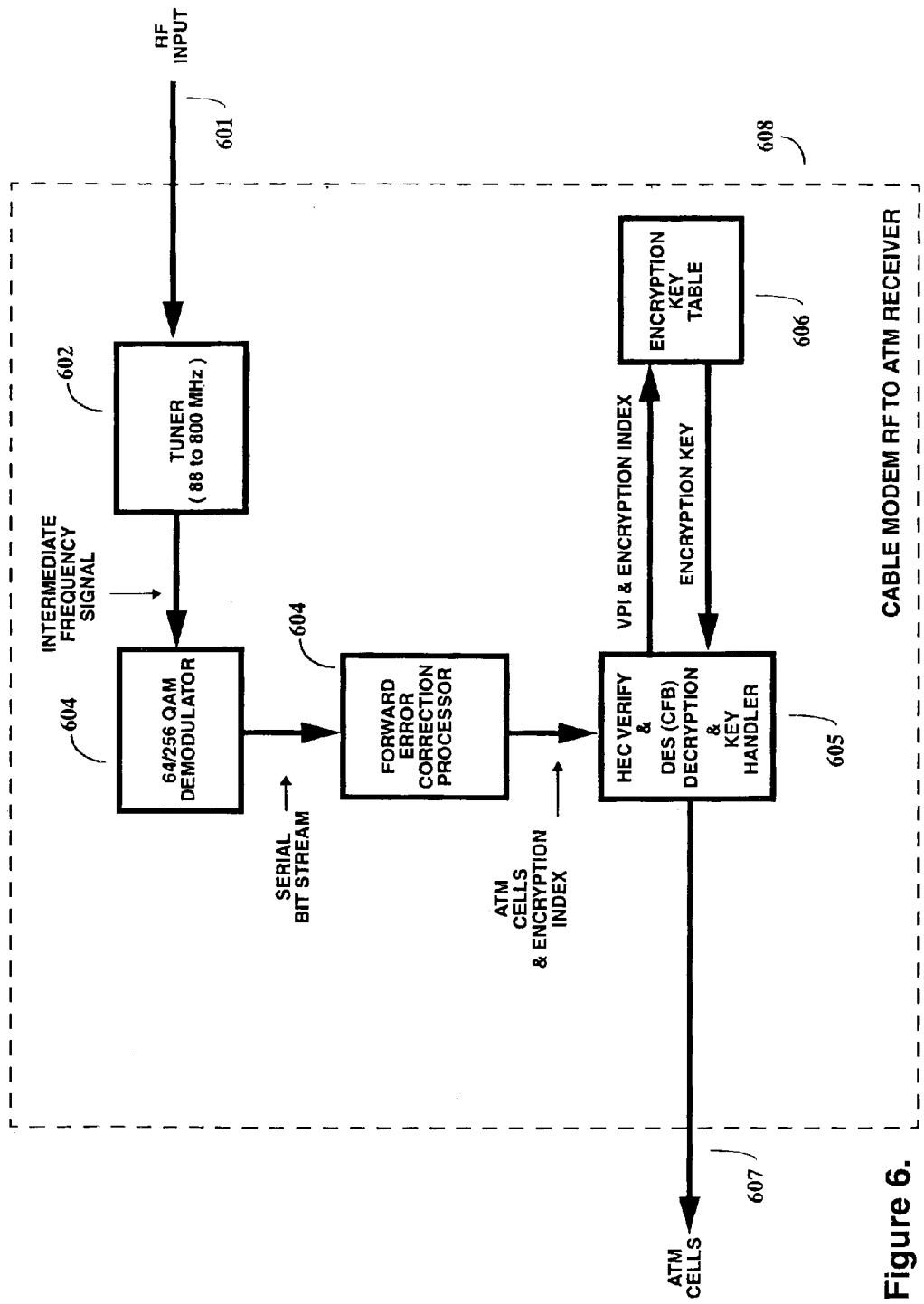
FIG. 6 shows a detailed schematic diagram of the processing of a downstream transmission by an STU.

FIG. 6 shows a detailed schematic diagram of the processing of a downstream transmission by a cable modem RF to ATM receiver 608. The downstream RF signal sent from the headend controller over the CATV network on line 601 is received by the Tuner 602. In the currently preferred embodiment, Tuner 602 is tuned to the frequency range of 88 to 800 MHz which matches the frequency corresponding to the converter in the headend controller. The IF signal from the tuner 602 is demodulated by the 64/256 QAM Demodulator 604. The resulting serial bit stream containing the ATM cells are checked by the Forward Error Correction Processor 604. The ATM cells and encryption index from processor 604 is the verified and decrypted by block 605. This is accomplished by referencing the Encryption Key Table 606 with the VPI and encryption index. Based thereon, the appropriate encryption key is supplied to block 605. The decrypted ATM cells can then be sent on for further processing on line 607. The simplicity of this system is used to illustrate the function of the mechanism. Other mechanisms, such as examining specific bit fields and values in the packet headers taken together or not with the encryption index, can lead to similar functional behavior. The specific novelty of the approach in this embodiment is that the encryption key is selected based firstly upon implicit or explicit values contained in the data being sent to the STU or in the data received from an STU and secondly, upon information contained in a key lookup table. For the purposes of consistency in this descriptive embodiment, the VPI value together with the encryption index values forms the basis for the key table lookup.

Figure 7:
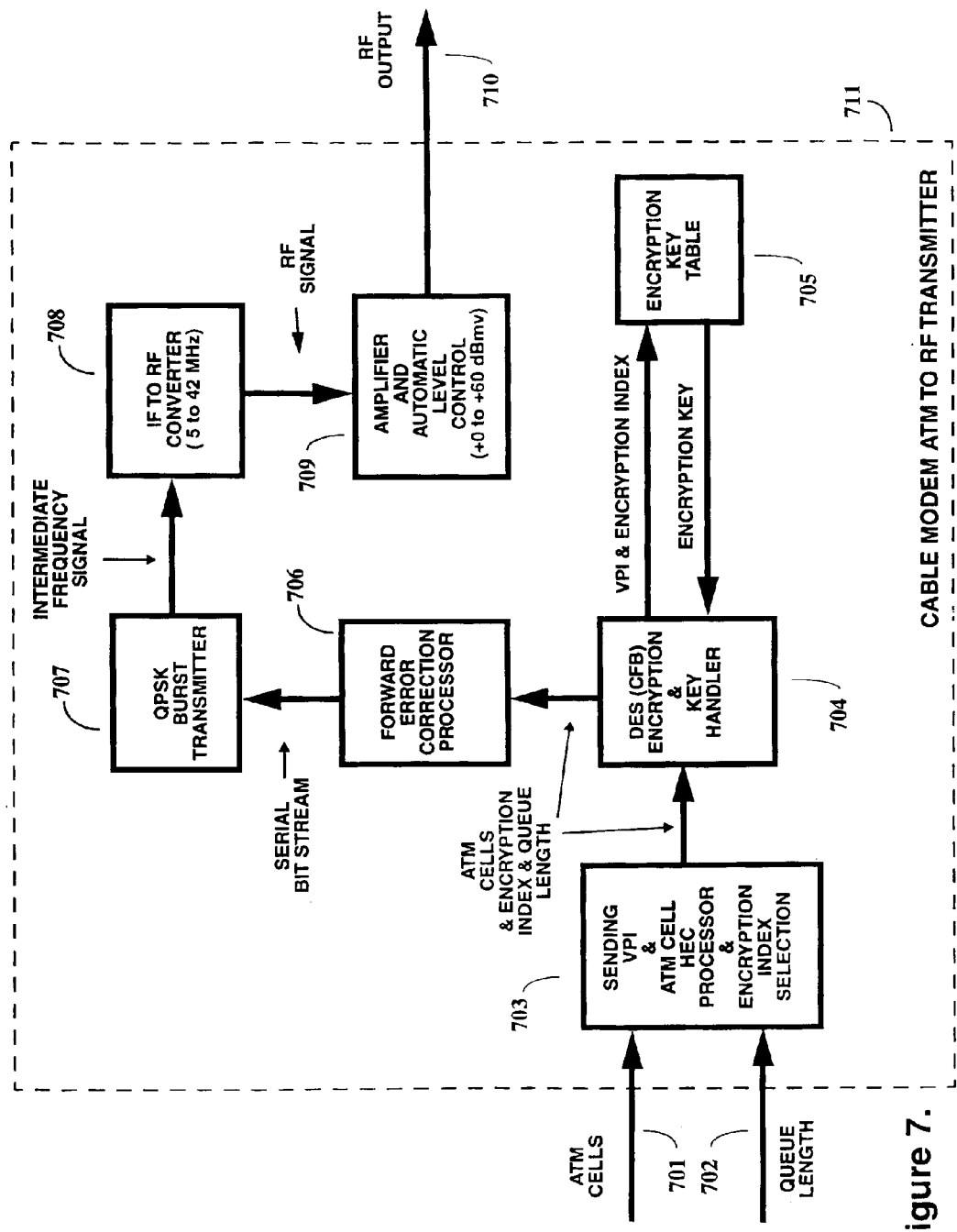
FIG. 7 is a detailed schematic of the circuitry in an STU used for processing upstream transmissions.

FIG. 7 is a detailed schematic of the circuitry in a cable modem used or processing upstream transmissions by the cable modem ATM to RF transmitter 711. ATM cells on line 701 are input to block 703. Furthermore, a queue length is also input to block 703 on line 702. Based on this information, processor 703 provides the ATM cells with the appropriate VPI, encodes the HEC bits, and encrypts the ATM cells. The ATM cells, encryption index, and queue length are sent to the DES Encryption and Key Handler block 704 which encrypts the ATM cell payload according to an encryption key. The encryption key is supplied by referencing the VPI and encryption index to an Encryption Key Table 705. A Forward Error Correction Processor 706 provides standard ATM cell header error check processing and forward error correction processing for the burst transmission. The resulting serial bit stream is then modulated by a QPSK Burst Transmitter 707. The modulated intermediate frequency (IF) signal is converted to a radio frequency (RF) signal for downstream transmission over the CATV network by Converter block 708. In the currently preferred embodiment, the RF signal corresponds to 5 to 42 MHz. Before transmission, the RF signal is amplified and automatic level control is performed by Amplifier and AGC block 709. In the currently preferred embodiment, the power level of the RF signal is maintained at +0 to +60 dBmv. The upstream RF channel is managed as a many-to-one system in that multiple STUs may transmit to the headend controller.

A detailed description of the Distributed Hierarchic Ethernet Switch is now presented. The hierarchic Ethernet switch supports the bi-directional exchange of Ethernet frames between a common Ethernet interface connected to an Ethernet Root Controller ("controller"). Common Ethernet interfaces are connected to a plurality of Ethernet Leaf Processors ( "stations"). The controller is connected to a plurality of stations via a common distributed ATM network, which is comprised of commonly available ATM switches interconnected via commonly available ATM links. The ATM cell virtual connections and Ethernet information flow is organized as a strict tree based ordered hierarchy, whereby the controller serves as the root to each station. Information flow from the controller to one or more stations is defined as the "downstream" direction Information flow from a station to the controller is defined as the "upstream" direction. A virtual connection is defined to be a configured unidirectional ATM cell path through the ATM network, using common ATM semantics. It is based on the ATM cell Virtual Path Identifier (VPI) value and the Virtual Circuit Identifier (VCI) value. A virtual connection is indicated by "VCxx, yy", where "xx" represents the VPI value, and "yy" the VCI value. For example, VC1,10 means a virtual connection with a VPI value of 1 and a VCI value of 10.

The downstream information flow supports unicast information flow. In other words, flow that is from the controller to a single stations Unicast information flow is directly supported by use of ATM point-to-point virtual connections. Multicast information flow is also supported, that is from the controller to any preselected group of two or more stations. Multicast information flow is directly supported by use of ATM point-to-multipoint virtual connections with the controller being the source of the virtual connection and with two or more stations being receivers in the multicast group. And broadcast information flow is also supported, that is from the controller to all .stations. Broadcast information flow is directly supported by use of a single ATM point-to-multipoint virtual connection with all stations being members of the multicast group. The upstream information flow supports unicast only, that is from the station to the controller. The strict hierarchy of the inventive method requires that all information flow from one station to another to pass through the controller. In one embodiment of the present invention, a station with a single Ethernet interface, exchanges Ethernet information with a single controller only. The set of all stations that communicate with the controller and the controller is defined to be an Ethernet Local Area Network (LAN) segment.

Figure 8:
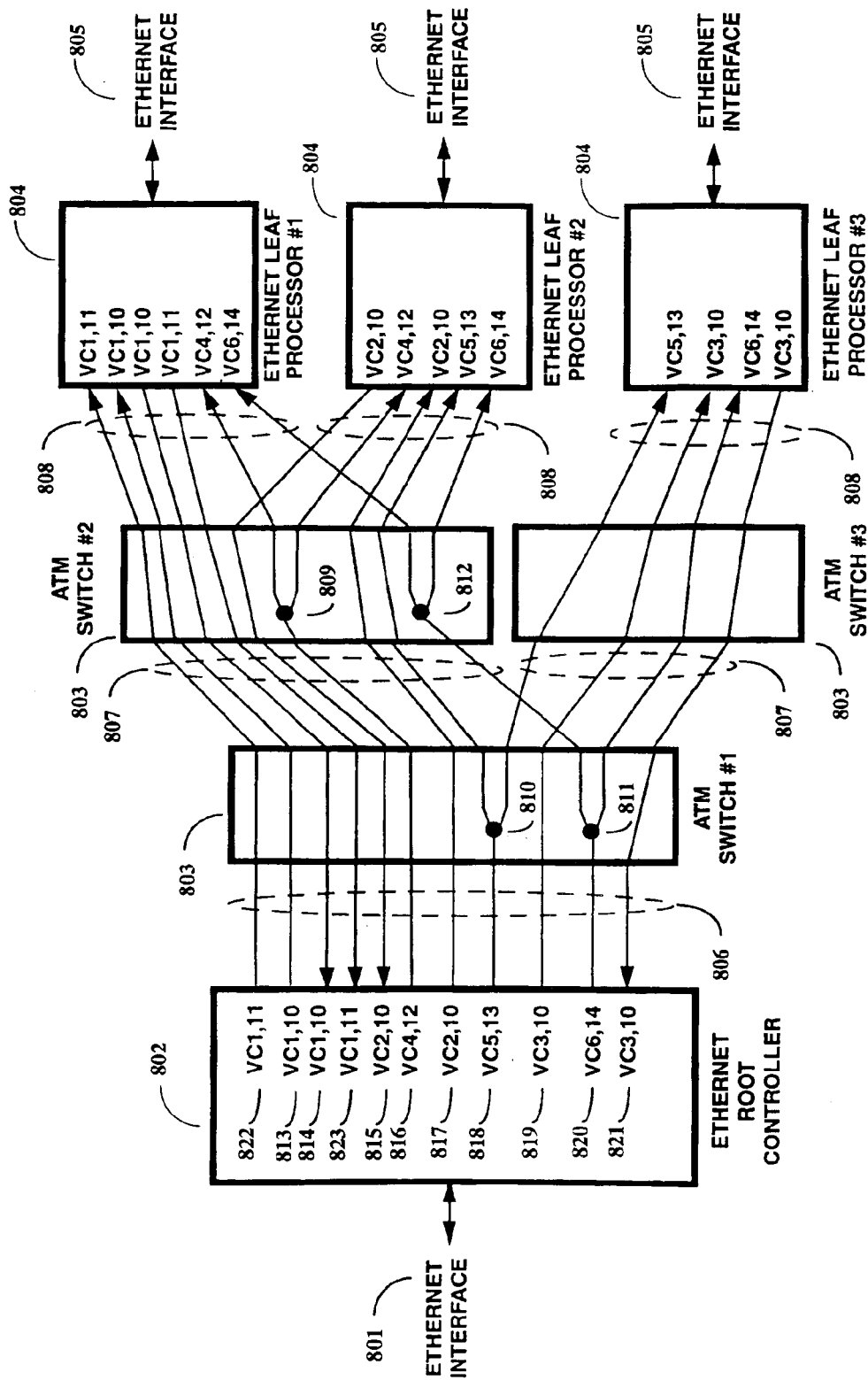
FIG. 8 schematically illustrates an Ethernet Root Controller connected to Ethernet Leaf Processor.

FIG. 8 schematically illustrates the Ethernet Root Controller 802 connected to Ethernet Leaf Processor #1 804, Ethernet Leaf Processor #2 804, and Ethernet Leaf Processor #3 804 via an ATM network comprised of commonly available ATM Switches: ATM Switch #1 803, ATM Switch #2 803, and ATM Switch #3 803 interconnected via commonly available ATM cell links 807. The Ethernet Root Controller 802 is connected to ATM Switch #1 803 via a commonly available ATM link 806. Ethernet Leaf Processor #1 804 and Ethernet Leaf Processor #2 804 are each connected to ATM Switch #2 803 via commonly available ATM links 808. Ethernet Leaf Processor #3 804 is connected to ATM Switch #3 803 via ATM link 808. An Ethernet Interface 801, operating in promiscuous mode, connects to Ethernet Root Controller 802, and transfers all Ethernet frames received on the Ethernet Interface 801. An Ethernet Interface 805 connects to Ethernet Leaf Processor 804.

Unicast information from the controller 802 to Ethernet Leaf Processor #1 804 is transmitted on VC1,10 813 at the controller 802 and carried through the ATM network 803 and delivered to the Ethernet Leaf Processor #1 804 on VC1,10. Unicast information from the Ethernet Leaf Processor #1 804 to the controller 802 to is transmitted on VC1,10 at the Ethernet Leaf Processor #1 804 and carried through the ATM network 803 and delivered to the controller 802 on VC1,10 814.

A second virtual connection is shown supporting unicast information from the controller 802 to Ethernet Leaf Processor #1 804, transmitted on VC1,11 822 at the controller 802 and carried through the ATM network 803 and delivery to the Ethernet Leaf Processor #1 804 on VC1,11. A second virtual connection is shown supporting unicast information from the Ethernet Leaf Processor #1 804 to the controller 802 to is transmitted on VC1,11 at the Ethernet Leaf Processor #1 804 and carried through the ATM network 803 and delivered to the controller 802 on VC1,11 823.

Unicast information from the controller 802 to Ethernet Leaf Processor #2 804 is transmitted on VC2,10 817 at the controller 802 and carried through the ATM network 803 and delivered to the Ethernet Leaf Processor #2804 on VC2,10. Unicast information from the Ethernet Leaf Processor #2 804 to the controller 8G2 to is transmitted on VC2,10 at the Ethernet Leaf Processor #1 804 and carried through the ATM network 803 and delivered to the controller 802 on VC2,10 815. Unicast information from the controller 802 to Ethernet Leaf Processor #3 804 is transmitted on VC3,10 819 at the controller 802 and carried through the ATM network 803 and delivered to the Ethernet Leaf Processor #3 804 on VC3,10. Unicast information from the Ethernet Leaf Processor #3 804 to the controller 802 to is transmitted on VC3,10 at the Ethernet Leaf Processor #1 804 and carried through the ATM network 803 and delivered to the controller 802 on VC3,10 821.

Multicast information from the controller 802 to both Ethernet Leaf Processor #1 804 and Ethernet Leaf Processor #2 804 is transmitted on VC4,12 816 at the controller 802 and carried through the ATM network 803 and delivered to the Ethernet Leaf Processor #1 804 on VC4,12 and delivered to the Ethernet Leaf Processor #2 804 on VC4,12. ATM Switch #2 803 performs a common ATM cell copy operation 809 to support the point-to-multipoint operation. Multicast information from the controller 802 to both Ethernet Leaf Processor #2 804 and Ethernet Leaf Processor #3 804 is transmitted on VC5,13 818 at the controller 802 and carried through the ATM network 803 and delivered to the Ethernet Leaf Processor #2 804 on VC5,13 and delivered to the Ethernet Leaf Processor #3 804 on VC5,13. ATM Switch #1 803 performs a common ATM cell copy operation 810 to support the point-to-multipoint operation.

Broadcast information from the controller 802 to all stations, specifically Ethernet Leaf Processor #1 804, Ethernet Processor #2 804, and Ethernet Leaf Processor #3 804, is transmitted on VC6,14 820 at the controller 802 and carried through the ATM network 803 and delivered to the Ethernet Leaf Processor #1 804 on VC6,14 and Ethernet Leaf Processor #2 804 on VC6,14 and delivered to the Ethernet Leaf Processor #3 804 on VC6,14. ATM Switch #1 803 performs the first common ATM cell copy operation 811 and ATM Switch #2 803 performs the s second ATM Cell copy operation 812 to support the point-to-multipoint operations necessary to include all stations in the multicast group.

It should be noted that more than one controller and many stations may be connected to the ATM network. The nature of ATM networking allows many simultaneous virtual connections to be established across the network, thereby allowing each controller to communicate with a subset of all stations; such that each station communicates with only a single controller and that all stations are configured to communicate with a controller. Each controller therefore defines a virtual Ethernet LAN segment and many segments many operate through the same ATM network simultaneously. Furthermore, commonly available AIM Switches can support an arbitrary number of receivers in a point-to-multipoint group. Additionally, an arbitrary number of unicast virtual connections may be established through the ATM network to the same ATM endpoints.

Consequently, ATM cells are capable of being routed to a cable modem on a virtual connection basis. Furthermore, ATM cells are capable of being transmitted from a cable modem on a virtual connection basis. The ATM cells are capable of being prioritized according to a virtual connection basis. This is accomplished in the same manner as described above for a distributed Ethernet switch.

Figure 9:
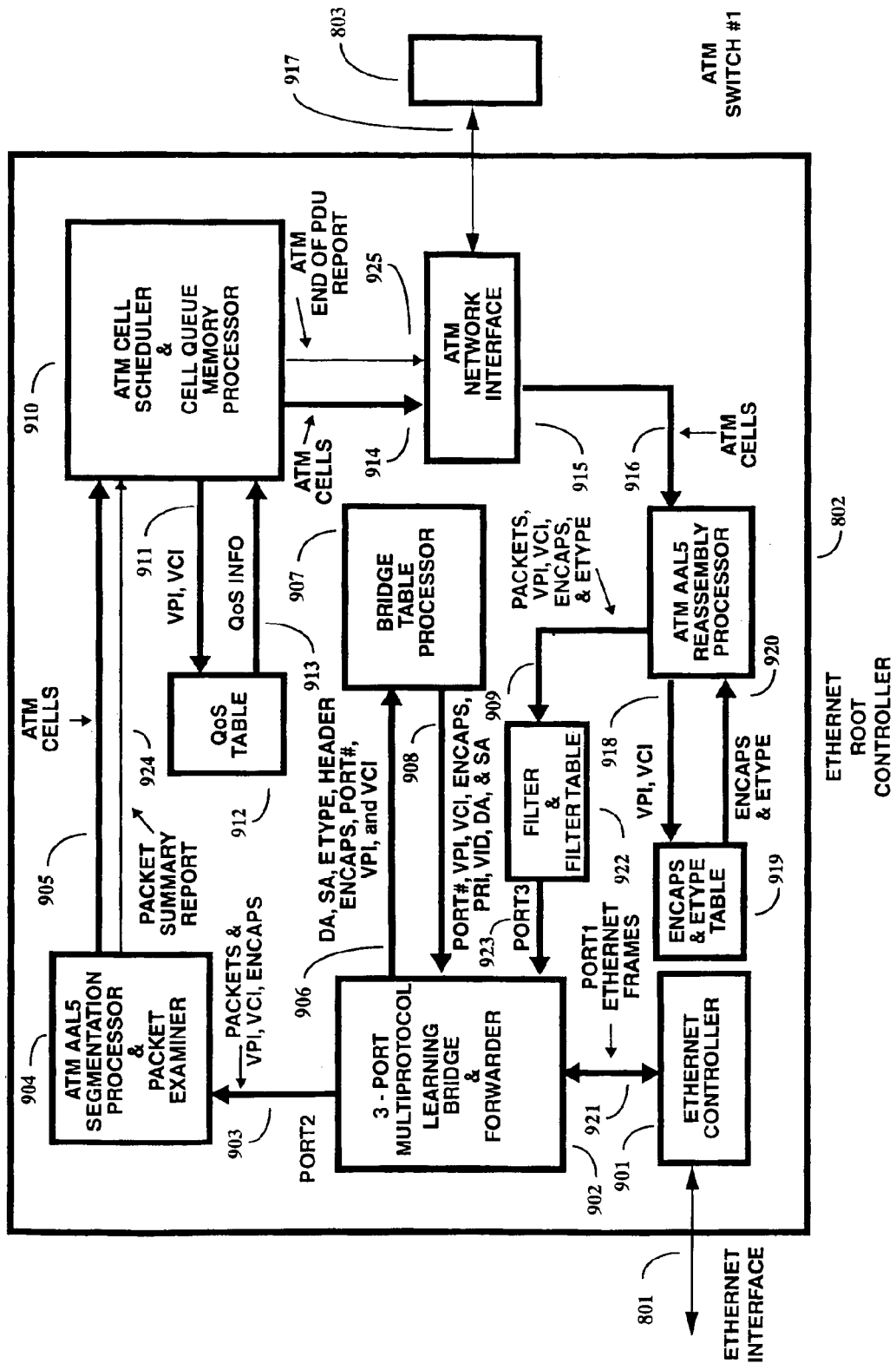
FIG. 9 schematically illustrates an exemplary Ethernet Root Controller.

FIG. 9 schematically illustrates an exemplary Ethernet Root Controller 802. Ethernet frames are received over a commonly available Ethernet Interface 801 where they are received by a common Ethernet Controller 901. Ethernet frames are then transferred 921 to the 3-Port Multiprotocol Learning Bridge and Forwarder 902 (hereafter referred to as the "Root Forwarder"). Upon receiving a Ethernet Frame from Port 1 921, the Root Forwarder 902 constructs a query 906 comprised of information obtained from the Ethernet Frame. Specifically, this includes the Destination Address ("DA"), the Source Address ("SA"), and the Ethernet Type field ("ETYPE"), additionally the port number that the Ethernet frame was received on, the first 64 octets of the Ethernet frame data or the entire data if less than 64 octets, the encapsulation type set to "null", and the VPI and VCI set to 0. This query on line 906 is received by the Bridge Table Processor 907 which performs a table lookup function based upon the information in the query. The Bridge Table Processor 907 returns a response online 908 to the Root Forwarder comprised of the forwarding port number, the VPI and VCI values for the ATM virtual connection, the ATM encapsulation type, a priority indication, a virtual LAN identifier, the destination address and the source address.

If the DA of the received Ethernet frame was received from Port 1 921, and indicated a unicast address of an Ethernet device connected to the Ethernet Interface 805 at Ethernet Leaf Processor #1 804. And if the EtherType value of the Ethernet frame indicated a specific type or set of types, the virtual connection is identified as VC1,11 822 and the Port number set to 2, otherwise the virtual correction is identified as VC1,10 813 and the Port number set to 2. This mechanism demonstrates that received Ethernet frames of different Ethernet types may be transmitted via different virtual connections downstream from the controller 802 to the same Ethernet Leaf Processor #1 804.

However, if the DA of the received Ethernet frame was received from Port 1 921, and indicated a multicast address whose members included Ethernet devices connected to the Ethernet Interface 805 at Ethernet Leaf Processor #1 804 and to the Ethernet Interface 805 at Ethernet Leaf Processor #2 805, the virtual connection is identified as VC4,12 816 and the Port number set to 2. If the DA of the received Ethernet frame was received from Port 1 921, and indicated a broadcast address, the virtual connection is identified as VC6,14 820 and the Port number set to 2. The Bridge Table Processor 907 follows the learning bridge forwarding semantics commonly found in the IEEE 802.1D standard. The encapsulation type response is "null" for Ethernet Frames, or "RFC1483-null" if the Ethernet frame contained an Internet Protocol ("IP") datagram and the Internet Engineering Task Force (IETF) RFC1483 standard for null encapsulation was selected, or "RFC1483-LLCSNAP" if the Ethernet frame contained protocol packet of ETYPE and the IETF RFC1483 standard for LLC/SNAP encapsulation was selected. For Ethernet frames received from Port 1 921, if the response port number was 2 in 908, the Ethernet frame, the virtual connection information, and the encapsulation type is communicated 903 to the ATM AAL5 Segmentation Processor 904. If the port number contained in the response 908 indicated Port 0, the Ethernet frame is discarded.

The ATM AAL5 Segmentation Processor 904 is responsible for receiving packets, virtual connection, and encapsulation information 903 from the Root Forwarder 902 and converting the packets into a stream of ATM cells consistent with the commonly available ATM Adaptation Layer 5 ("AAL5") segmentation semantics. Ethernet frames are encapsulated using a null encapsulation. Non Ethernet Packets are processed according to the encapsulation information 903 passed from the Root Forwarder 902. Packets are processed according to the encapsulation information. The virtual connection information is copied to the VPI and VCI values contained in the ATM cells generated by the process. The ATM cells are then transmitted 905 to the ATM Cell Scheduler & Cell Queue Memory Processor 910. Also included within block 904 is a Packet Examiner which performs multi-protocol filtering which filters TCP packets containing data on the downstream. When a packet is matching certain criteria is detected, this detection is sent along with the packet's VPI and VCI as a packet summary report within an ATM cell on line 924 to the ATM Cell Schleduler 910 and onto the receiver port card. The packet summary report is used for predictive acknowledgment scheduling processes. Note that the packet summary report function has been described here using the examination of TCP packets. The mechanism however, is general in nature, is not limited specifically to TCP packets, and can be used to generate reports with content specific to the protocols being examined; for example. ATM, Ethernet, IEEE 802.3, IEEE 802.2, and/or application specific protocols such as. File Transfer Protocol (FTP) or Telnet. The specific novelty of this invention is that a general packet examiner can be placed within the head-end controller for shared media network, e.g. high speed data over CATV, and such examiner observes data being sent to stations in the downstream direction. Certain types of packets or specific protocol messages are indications with high probability that a future packet will be sent from the station to the head-end controller on the upstream channel. The occurrence of the downstream examination event is of interest to the mechanism(s) which schedule upstream resources. Note that this predictive examination mechanism is well suited for any communications systems which utilizes shared media with a master or head-end controller, and characterized as controlling downstream channels with one transmitter and many receivers and independent scheduled-access upstream (return) channels with one receiver and many transmitters. CATV systems are the typical example, but this mechanism is also suited for wireless as well as satellite communications. The nature of the filter is to keep a list of filters per STU, such that when packets are received the filters specific to that STU are retrieved. This allows per STU packet filtering that can be tailored to suit the cable operators data networking needs. In addition, in the preferred embodiment of this invention, the filter performs two filter functions: 1) it examines Address Resolution Protocol (ARP) packets, as specified in IETF RFC826, and validates the IP addresses contained therein against a list of IP source addresses that are kept in the filter table for each STU, ARP packets that do not contain proper IP source addresses are discarded. With this filter function ARP packets are verified per subscriber cable modem which prevents severe network denial of service that can be caused due to either unintentional or intentional mis-configured of personal computers in the subscriber's home; and 2) the filter maintains a list of IP source addresses, source address masks, IP destination addresses, and destination address masks. When receiving IP packets from an STU, the IP source and destination addresses in the IP packets are compared with entries in the table. The cable operator can tailor the list to specifically allow or specifically deny IP source and IP destination pairs. This filter enables cable operators to specifically tailor IP traffic flows based on the configuration of the system, the availability of the backend network, and the needs and preferences of the subscribers.

The ATM Cell Scheduler & Cell Queue Memory Processor 910 performs a lookup of the virtual connection information 911 in the Quality of Service ("QoS") table 912 to obtain the QoS information 913, which includes the ATM traffic management service class requirements and cell delay requirements, for the virtual connection. The ATM Cell Scheduler 910 also generates an ATM End of PDU Report on line 925 to the ATM Network Interface which is similar to that described above in FIG. 4. The ATM Cell Scheduler and Cell Queue Memory 910 enqueues the ATM cells appropriate to the QoS information, orders the cells consistent with preserving the QoS of ATM cells from other virtual connections that may be previously enqueued and transmits cells 914 to the ATM Network Interface 915 for transmission over the ATM link 918 to ATM switch #1 803. ATM cells received by the ATM Networking Interface 915 via the commonly available ATM link 918 are transmitted 916 to the ATM AAL5 Reassembly Processor 917. ATM cells are reconstituted into packets according to the commonly available semantics of AAL5 and the encapsulation information 920 obtained by a lookup of the virtual connection information 918 in the Encapsulation and ETYPE Table 919. The packet, the virtual connection obtained from the ATM cells which carried the data, the encapsulation type, and ETYPE information are transmitted on line 909 to the Filter 922 which examines the packet to determine whether that particular packet is valid or invalid based on the contents of the Filter Table. Valid packets are forwarded to the Root Forwarder 902 on Port3 923, whereas invalid packets are discarded. This filter function can be applied to specific STUs or VCIs.

Upon receiving an Ethernet Frame from Port 3 909, the Root Forwarder 902 constructs a query 906 comprised of information obtained from the Ethernet Frame, specifically the Destination Address ("DA"), the Source Address ("SA"), and the Ethernet Type field ("ETYPE"), additionally the port number that the Ethernet frame was received on, the first 64 octets of the Ethernet frame data or the entire data if less than 64 octets, and the encapsulation type. The query 906 is received by the Bridge Table Processor 907 which performs a table lookup function based upon the information in the query. The Bridge Table Processor 907 returns a response 908 to the Root Forwarder comprised of the forwarding port number, the VPI and VCI values for the ATM virtual connection, and the ATM encapsulation type. If the DA of the received Ethernet frame was received from Port 3 909, and indicated a unicast address of an Ethernet device connected to the Ethernet Interface 805 at Ethernet Leaf Processor #1 804, the virtual connection is identifed as VC1,10 813 and the Port number set to 2. If the DA of the received Ethernet frame was received from Port 3 909, and indicated a multicast address whose members included Ethernet devices connected to the Ethernet Interface 805 at Ethernet Leaf Processor #1 804 and to the Ethernet Interface 805 at Ethernet Leaf Processor #2 805, the virtual connection is identified as VC4,12 816 and the Port number set to 2, additionally if the packet was an encapsulated Ethernet frame the frame is copied to Port 1921, processed by the Ethernet controller 901 and transmitted via the Ethernet Interface 801.

If the DA of the received Ethernet frame was received from Port 3 909, and indicated a broadcast address, the virtual connection is identified as VC6,14 820 and the Port number set to 2, additionally if the packet was an encapsulated Ethernet frame the frame is copied to Port 1 921, processed by the Ethernet controller 901 and transmitted via the Ethernet Interface 801. If the DA of the received Ethernet frame was received from Port 3 909, and indicated a unicast address of an Ethernet device connected to the Ethernet Interface 801 specified as Port 1 921, the frame is transferred to Port 1 921, processed by the Ethernet controller 901 and transmitted via the Ethernet Interface 801. For Ethernet frames received from Port 3 909, if the response port number was 2 in 908, the Ethernet frame, the virtual connection information, and the encapsulation type is transferred via Port 2 903 to the ATM AAL5 Segmentation Processor 904. If the port number contained in the response 908 indicated Port 0, the Ethernet frame is discarded.

Upon receiving a packet which is not an Ethernet Frame from Port 3 909, the Root Forwarder 902 constructs a query 906 comprised of information obtained from received information 909, specifically the encapsulation type, the ETYPE, additionally the port number that the packet was received on, and the first 64 octets of the packets data or the entire data if less than 64 octets. The query 906 is received by the Bridge Table Processor 907 which performs a table lookup function based upon the information in the query. The Bridge Table Processor 907 returns a response 908 to the Root Forwarder comprised of the forwarding port number, the VPI and VCI values for the ATM virtual connection, and the encapsulation type. If the port number received in the response 908 is Port 1, the packet and the ETYPE received from Port 3 909 and SA, and DA information returned in the response 908 is used to construct an Ethernet Frame which is then transferred to the Ethernet Controller 901 for transmission on the Ethernet Interface 801. If the port number received in the response 908 is Port 2, the packet, virtual connection, and encapsulation type information is transferred to the ATM AAL5 Segmentation Processor 904 via Port 2 903, and if the DA value in the response 908 is non zero, a copy of the packet and the ETYPE received from Port 3 909 and SA, and DA information returned in the response 908 is used to construct an Ethernet Frame which is then transferred to the Ethernet Controller 901 for transmission on the Ethernet Interface 801.

The Source Address ("SA") information from Ethernet Frames received from Port 1 921 and Port 3 909, and the virtual connection information obtained from Port 3 909 are used by the Bridge Table Processor 907 to construct a table. The table maps Destination Addresses ("DA") to Port number and virtual connections. Virtual connection information is not required for Port 1. If an SA is learned from Port 3 909, its table information in the Bridge Table Processor 907 will indicate Port 2 903 for forwarding purposes. Port 2 903 is a transmit only port, Port 3 909 is a receive only port. The Bridge Table Processor 907 is responsible for directing the flow of packets through the learning bridge and forwarder 902; which also includes the ability to specifically discard packets meeting certain criteria. The novelty of this invention is that the behavior can be modeled to support a learning bridge behavior similar to IEEE 802.1D bridging, or an IEEE 802.1D bridge per virtual LAN, or a semi-forwarding bridge, or a semi-forwarding per virtual LAN. The semi-forwarding nature allows packets to be examined and specifically forwarded from Port 3 to Port 2 if the packet meets certain filter criteria. Additionally, no packets may be forwarded from Port 3 to Port 2, creating a scenario where the distributed Ethernet switching function exists as seen by the Ethernet interface 801. That is, devices attached to Ethernet Interface 801 can exchange broadcast and unicast packets with any Ethernet Leaf processor 804 and vice versa, but Ethernet Leaf processors cannot exchange packets with the other. With this feature, cable operators can configure the filtering and forwarding behavior of the Ethernet Root Controller 802 to meet the needs of their high speed data delivery service and of the needs of the customers.

Figure 10:
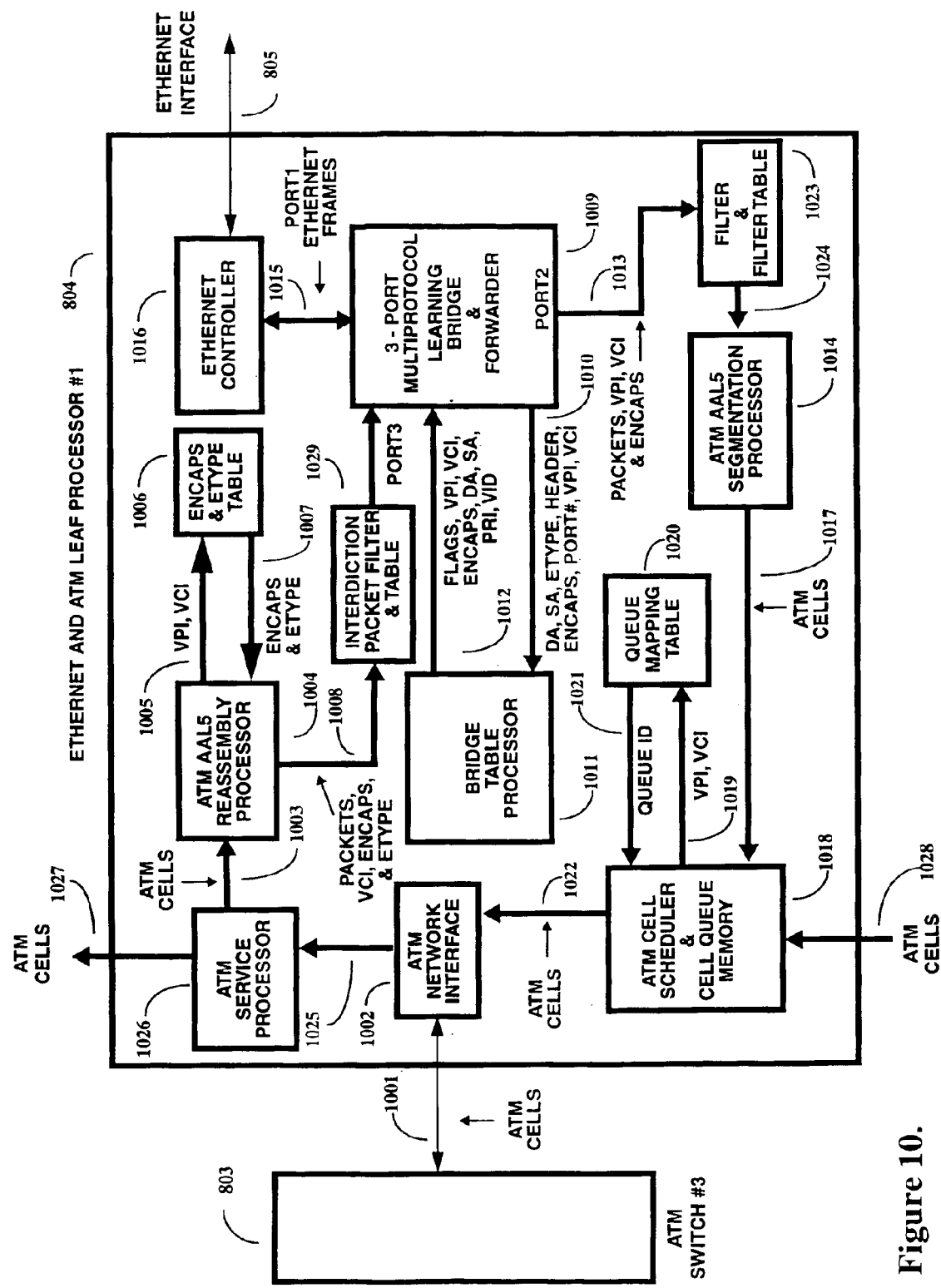
FIG. 10 schematically illustrates an exemplary Ethernet Leaf Processor.

FIG. 10 schematically illustrates an exemplary Ethernet Leaf Processor #1 804. ATM cells received by the ATM Networking Interface 1002 from ATM Switch #3 803 via the commonly available ATM link 1001 are transmitted to the ATM Service Processor 1026 on line 1025. Based on the VPI and VCI, the ATM Service Processor 1026 decides whether the ATM cells are to be forwarded to an external interface through line 1027 or to the ATM AAL5 Reassembly Processor 1004. In general, non-Ethernet cells (e.g., voice, video, graphics, etc.) are passed though on line 1027, whereas Ethernet based cells are forwarded on line 1003 to the Reassembly Processor 1004. In the ATM AAL5 Reassembly Processor 1004, ATM cells are reconstituted into packets according to the commonly available semantics of AAL5 reassembly and the encapsulation information 1007 obtained by a lookup of the virtual connection information 1005 in the Encapsulation and ETYPE Table 1006. The packet, the virtual connection obtained from the ATM cells which carried the data, the encapsulation type, and ETYPE information are transmitted 1008 to the Interdiction Packet Filter & Table 1029. The Interdiction Filter maintains an internal table of permit and deny filter entries that are maintained by the cable operator, no customer access is allowed to this table. The purpose of the filter is to restrict packet flow to the subscriber to only permit packets that have been assigned for reception. In unicast networking forwarding, this restriction function is typically met by limiting which packets are sent downstream to the STU. However, with this filter and the nature of multicast and broadcast traffic, the cable operator may be available to a customer on a fee basis. By specially enabling the STU to receive a multicast group, allows one copy of the information to be sent on the downstream channel, that is the downstream data bandwidth resources, and that only the STUs that have been enabled to receive the group are allowed access.

Upon receiving an Ethernet Frame from Port 3 1008, the Leaf Forwarder 1009 constructs a query 1010 comprised of information obtained from the Ethernet Frame, specifically the Destination Address ("DA"), the Source Address ("SA"), and the Ethernet Type field ("ETYPE"), additionally the port number that the Ethernet frame was received on, the first 64 octets of the Ethernet frame data or the entire data if less than 64 octets, and the encapsulation type. The query 1010 is received by the Bridge Table Processor 1011 which performs a table lookup function based upon the information in the query. The Bridge Table Processor 1011 returns a response 1012 to the Leaf Forwarder comprised of a Forward True/False flag, a Received-SA-Is-Known-SA True/False flag, the VPI and VCI values for the ATM virtual connection, the ATM encapsulation type, the SA and DA values, a priority indicator, and the Virtual LAN identification.

If the DA of the received Ethernet frame was received from Port 3 1008, and indicated a unicast address of an Ethernet device connected to the Ethernet Interface 805 on Port 1 1015, the Ethernet frame is transferred to the Ethernet Controller 1016 for transmission on the Ethernet Interface 805. If the DA of the received Ethernet frame was received from Port 3 1008, and indicated a multicast or broadcast address and the Received-SA-Is-Known-SA flag is False, the Ethernet frame is transferred to the Ethernet Controller 1016 for transmission on the Ethernet Interface 805. If the Received-SA-Is-Known-SA flag is True, the frame is discarded. In addition to a common learning bridge function constructed similar to that specified in the IEEE 802.1D standard, the Bridge Table Processor 1011 sets the Received-SA-Is-Known-SA flag when a query is made 1010 in which the SA appears in the bridge table as a SA learned from Port 1 1015. This mechanism prevents the retransmission of multicast and broadcast Ethernet Frames onto Ethernet Interface 805 that have originated from Ethernet Interface 805.

Upon receiving a packet which is not an Ethernet Frame from Port 3 1008, the Leaf Forwarder 1011 constructs a query 1010 comprised of information obtained from received information 1008, specifically the encapsulation type, the ETYPE, additionally the port number that the packet was received on, and the first 64 octets of the packets data or the entire data if less than 64 octets. The query 1010 is received by the Bridge Table Processor 1011 which performs a table lookup function based upon the information in the query. The Bridge Table Processor 1011 returns a response 1012 to the Leaf Forwarder 1009 comprised of the Forward flag, SA, DA, and the encapsulation type. If the Forward flag is false, the packet is discarded. If the Forward flag is True and if the port number received in the response 1012 is Port 1 1015, the packet and the ETYPE received from Port 3 1008 and SA, and DA information returned in the response 1012 is used to construct an Ethernet Frame which is then transferred to the Ethernet Controller 1015 for transmission on the Ethernet Interface 805. If the port number received in the response 1012 is value 2 or value 0, the packet is discarded. There are no transfers of packets or Ethernet frames from Port 3 1008 to Port 2 1013 for Leaf Forwarders 1009.

Ethernet frames are received over a commonly available Ethernet Interface 805, where they are received by a commonly available Ethernet Controller 1016. Ethernet frames are then transferred 1015 to the Leaf Forwarder 1009. Upon receiving a Ethernet Frame from Port 1 1015, the Leaf Forwarder 1009 constructs a query 1010 comprised of information obtained from the Ethernet Frame, specifically the DA, SA, and ETYPE, additionally the port number that the Ethernet frame was received on, the first 64 octets of the Ethernet frame data, and the encapsulation type set to "null". This query 1010 is received by the Bridge Table Processor 1011 which performs a table lookup function based upon the information in the query. The Bridge Table Processor 1011 returns a response 1012 to the Leaf Forwarder comprised of the Forwarding flag, the VPI and VCI values for the ATM virtual connection, and the ATM encapsulation type. If the EtherType value of the Ethernet frame received from the Ethernet Controller 1016 on Port 1 1015, indicated a specific type or set of types, the virtual connection is identified as VC1,11 822 and the Port number set to 2. Otherwise, the virtual connection is identified as VC1,10 813, and the Port number set to 2. This mechanism demonstrates that received Ethernet frames of differing Ethernet types may be transmitted upstream to the controller 802 using via different virtual connections.

The Bridge Table Processor 1011 follows the learning bridge forwarding semantics commonly found in the IEEE 802.1D standard. The encapsulation type response is "null" for Ethernet Frames, or "RFC1483-null" if the Ethernet frame contained an Internet Protocol ("IP") datagram and the Internet Engineering Task Force (IETF) RFC1483 standard for null encapsulation was selected, or "RFC1483-LLCSNAP" if the Ethernet frame contained protocol packet of ETYPE and the IETF RFC1483 standard for LLC/SNAP encapsulation was selected. For Ethernet frames received from Port 1, if the response Forward flag is True in 1012, the Ethernet frame, the virtual connection information, and the encapsulation type is communicated to the Filter And Filter Table 1023 on line 1023. Otherwise, if the Forward flag value is False, the Ethernet frame is discarded.

Filter And Filter Table 1023 provides a multi-protocol packet examination function which decides whether a packet is allowed to continue upstream or whether it should be discarded. More specifically, address and resolution protocol packets are examined to determine whether the contents of an Address Resolution Protocol (ARP) request or ARP reply match that stored in the Filter Table. The ARP packet is used to translate a hardware address into an IP address. The Filter Table is configure by the cable operator to allow only authorized transmissions upstream. Hence, if Filter 1023 determines that the packet is valid, the packet is allowed to proceed upstream to the ATM AAL5 Segmentation Processor 1014 on line 1024. Otherwise, if there is no match, the packet is discarded. Thereby, cable operators have the ability to control transmissions from the STUs, and unauthorized transmissions can be prevented. It should be noted that this filter function can be implemented in the Ethernet Root Controller. It should be noted that other packets types, such as but not limited to IP packets, can be examined by this filter function The ATM AAL5 Segmentation Processor 1014 is responsible for receiving Ethernet frames, virtual connection, and encapsulation information 1013 from the Leaf Forwarder 1009 and converting the Ethernet data into a stream of ATM cells consistent with the commonly available ATM Adaptation Layer 5 ("AAL5") segmentation semantics. The Ethernet data is processed according to the encapsulation information. The virtual connection information is copied to the VPI and VCI values contained in the ATM cells generated by the process. The ATM cells are then transmitted 1017 to the ATM Cell Scheduler & Cell Queue Memory Processor 1018 (hereafter "Queue Controller").

The Queue Controller 1018 performs a lookup of the virtual connection information 1019 in the Queue Mapping Table 1020 to obtain the queue identifier ("Queue ID") number in which to place the ATM cells. The Queue Controller 1019 then enqueues the appropriate internal cell queue. The Queue Controller 1018 maintains many internal queues in strict priority number and transmits cells 1022 from the highest priority queue which has enqueued cells to the ATM Network Interface 1002 for transmission over the ATM link 1001 to ATM switch #3 803. In addition, non-Ethernet cells transmitted as outputs on line 1027 of another STU is accepted as an input to the Queue Controller 1018 on line 1028. These non-Ethernet cells are forwarded as ATM cells 1022 to the ATM Network Interface 1002 on line 1022.

The SA information from Ethernet Frames received from Port 1 1015 is used by the Bridge Table Processor 1011 to construct a table which records the source addresses contained in Ethernet Frames received via Port 1 1015. If a query 1010 contains a unicast DA value which matches a recorded SA value in the table, the Forward Flag is set to False in response 1012, indicating that Ethernet Frame should not be forwarded upstream to the Ethernet Root Controller 802. If the SA match is not found or if the DA specifies a multicast or broadcast address, the Forward flag in response 1012 is set to True. It should be recognized that the similarity of Ethernet with the IEEE 802.3 standard and that 802.3 frame processing can be simultaneously supported with Ethernet frame processing.

Figure 11:
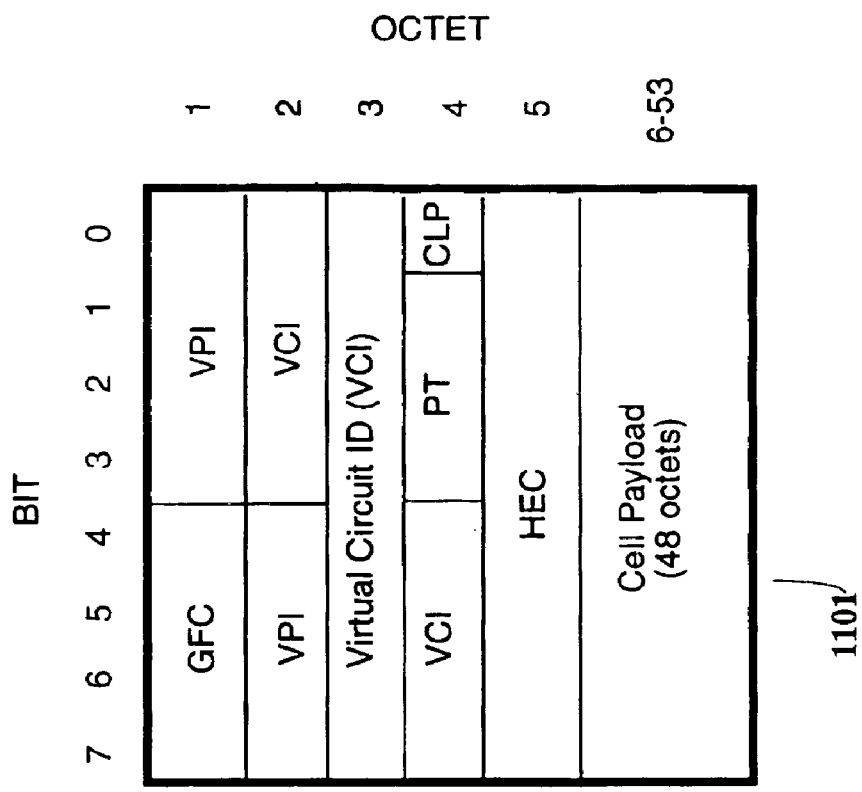
FIG. 11 schematically illustrates the format of a standard ATM User Network Interface (UNI) cell.

FIG. 11 schematically illustrates the format of a standard ATM User Network Interface (UNI) cell. The UNI ATM Cell 1101 is comprised of a total of 53 octets of information, where the first 4 bits is a Generic Flow Control (GFC) field, the next 8 bits are the Virtual Path Identifier, the next 16 bits are the Virtual Circuit Identifier, the next 3 bits are the Payload Type Indicator (PTI) field, the next bit is the Cell Loss Priority (CLP) bit, the next 8 bits is the Header Error Check (HEC)field. The remaining portion of the ATM cell comprises the 48 octet cell payload.

Figure 12:
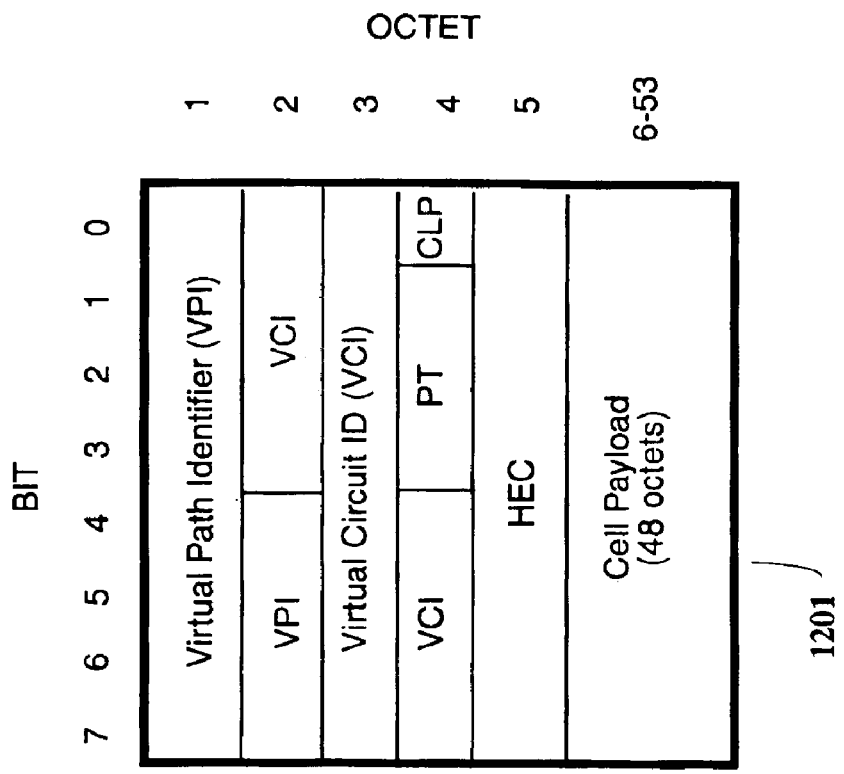
FIG. 12 schematically illustrates the format of a standards ATM Network to Network Interface (NNI) cell.

FIG. 12 schematically illustrates the format of a standards ATM Network to Network Interface (NNI) cell. The UNI ATM Cell 1201 is comprised of a total of 53 octets of information, where the first 12 bits are the Virtual Path Identifier, the next 16 bits are the Virtual Circuit Identifier, the next 3 bits are the Payload Type Indicator (PTI) field, the next bit is the Cell Loss Priority (CLP) bit, the next 8 bits is the Header Error Check (HEC) field. The remaining portion of the ATM cell comprises the 48 octet cell payload.

Figure 13:
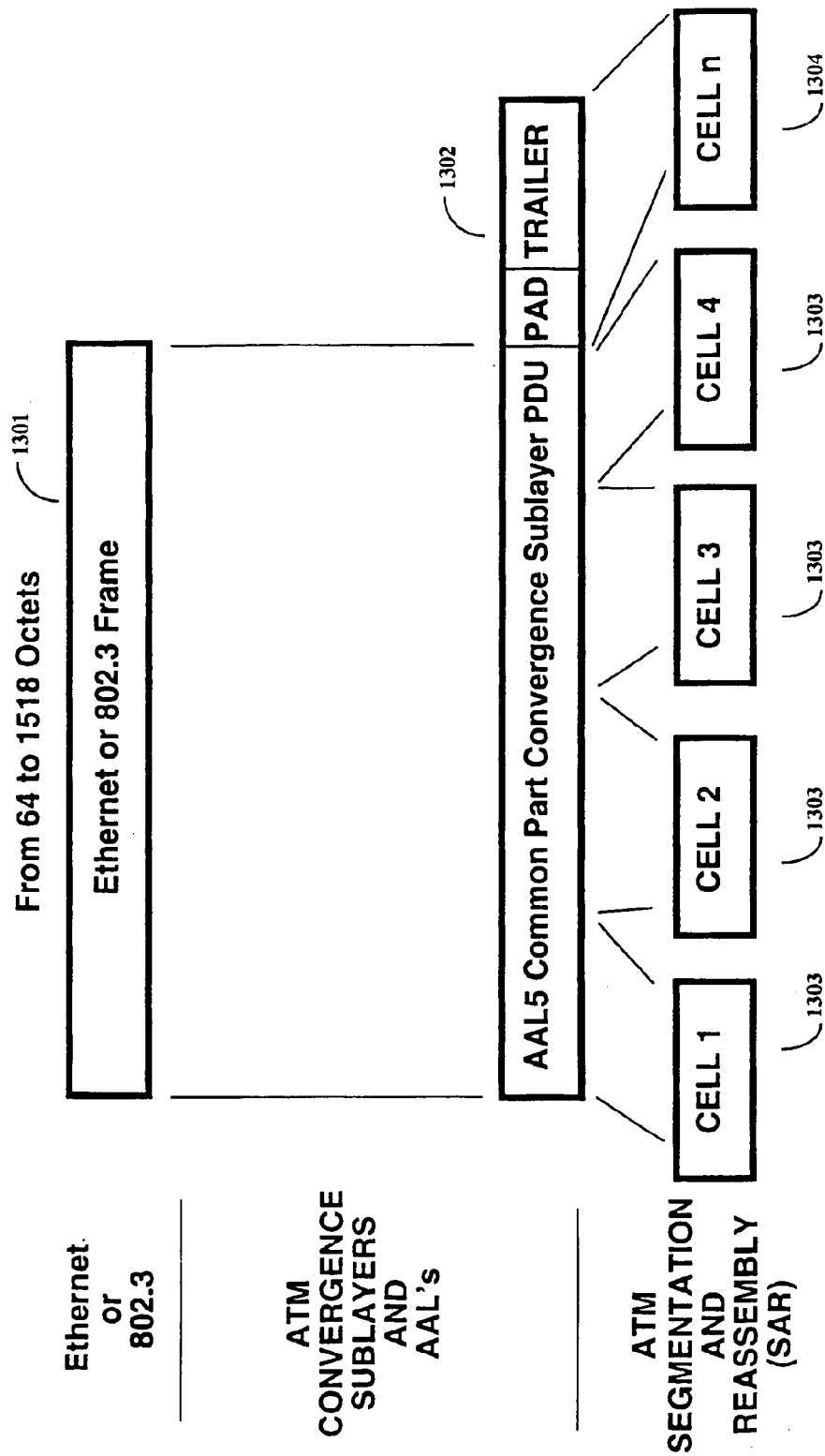
FIG. 13 schematically illustrates the null encapsulation of an Ethernet Frame into an ATM AAL5 Common Part Convergence Sublayer (CPCS) PDU, with pad, and Trailer.

FIG. 13 schematically illustrates the null encapsulation of an Ethernet Frame 1301 into an ATM AAL5 Common Part Convergence Sublayer (CPCS) PDU, with pad, and Trailer 1302. The variable length Ethernet Frame is placed into the AAL5 CPCS PDU. The AAL5 trailer contains both a CPCS PDU length value and a 32 bit (4 octet) Cyclic Redundancy Check (CRC) value. The length of the pad is adjusted according the standard AAL5 semantics so 4 octets of CRC in the trailer align with the last four octets of the last ATM cell payload which contains the CPCS PDU. An AAL5 CPCS PDU may be segmented in UNI or NNI ATM Cells 1303 and 1304. The ATM cell 1304 which holds the trailer has a special bit set in the PTI field (specifically, the SDU-type bit) which indicates the trailer is present in the payload. The segmentation process decomposes the AAL5 PDU into one or more ATM cells 1303 and 1304, depending on the length of the CPCS PDU. In the reverse process, the reassembly process, reconstructs the CPCS PDU from a stream of ATM cells 1303 and 1304. The CRC in the CPCS trailer is used to detect the correct reception of the CPCS PDU. ATM standards dictate that ATM cells are sent in order through the ATM network and the transmission order may not be rearranged. It should be noted that the method of encapsulating Ethernet in ATM AAL5 and selecting virtual connection and quality of service based on Destination Address and Ethernet Type can be extended to directly to support other networking protocols, such as IP, IPX, and Appletalk. Moreover, the encapsulation method as described in the IETF RFC1483 standard, virtual connection, and quality of service selection can be based on information contained in the headers or data of these other protocols.

It is the assertion of this detailed embodiment that the methods presented in the description of this Distributed Hierarchic Ethernet Switch provide a system of operation between the Ethernet Interface 801 and all Ethernet Interfaces 805 consistent with the operation of a commonly available multiple port Ethernet switching hub. In other words, unicast, multicast, and broadcast Ethernet frames are directed to the appropriate Ethernet Interface or Ethernet Interfaces 801 and 805, regardless of which Ethernet Interface 801 and 805 received the Ethernet frame. Furthermore, it has been shown that different virtual connections may be used for the downstream transfer. Ethernet frames of differing Ethernet Types between the controller 802 and the Ethernet Leaf Processor #1804 and that the Quality of Service and priority of ATM virtual connections may be separately specified on a per downstream virtual connection basis.

Different virtual connections may be used for the upstream transfer Ethernet frames of differing Ethernet Types from the same Ethernet Leaf Processor #1 804 controller 802 and that the Quality of Service and priority of ATM virtual connections may be separately specified on a per upstream virtual connection basis. In addition, it has been shown that Ethernet frames may received from an Ethernet interface 801 and encapsulated based on Ethernet Type or other non-Ethernet protocol header data, then segmented into ATM cells, then transmitted on a virtual connection by controller 802 downstream to the Ethernet Leaf Processor #1804 and reconstituted into an Ethernet frame via the Leaf Forwarder 1009. This is based on information associated with the virtual connection in the Bridge Table Processor 1011. The Ethernet Frame may be transferred to the Ethernet controller 1016 for transmission on the Ethernet Interface 805. The Quality of Service and priority of ATM virtual connections may be separately specified on a per downstream virtual connection basis.

It has been shown that Ethernet frames may received from an Ethernet interface 805 and encapsulated based on Ethernet Type or other non-Ethernet protocol header data, then segmented into ATM cells, then transmitted on a virtual connection by Ethernet Leaf Processor #1 804 to controller 802 upstream and reconstituted into an Ethernet frame via the Root Forwarder 902. This is based on information associated with the virtual connection in the Bridge Table Processor 907. The Ethernet Frame may be transferred to the Ethernet controller 901 for transmission on the Ethernet Interface 801, and that the Quality of Service and priority of ATM virtual connections may be separately specified on a per upstream virtual connection basis. It is the assertion that the operations described for the Ethernet Controller 802 and Ethernet Leaf Processor #1 804 are applicable for any Ethernet Leaf Processor.

Figure 14:
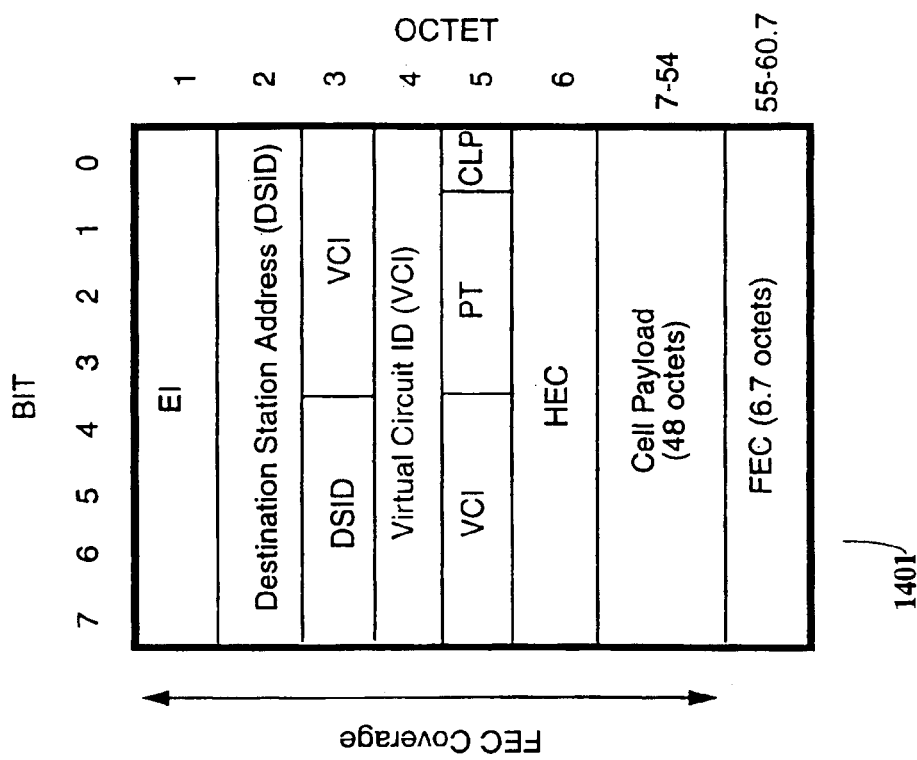
FIG. 14 shows a downstream slot structure.

FIG. 14 shows a downstream slot structure. The Encryption Index (EI) is an 8-bit value conveying a four valued indication of the encryption status of the ATM PDU. A value of <0x00> means that the ATM PDU is not encrypted, <0x55> means encrypted with key 1, <0xAA> means encrypted with key 2, and <0xFF> means encrypted with key 3. An encryption key table is kept for each station identifier (individual or group) used by the station to identify ATM cells that it should receive. The Destination Station ID (DSID) is 12 bits long. This is the station identifier of the stations(s) to receive the ATM cell. The DSID overlays the Virtual Path Identifier of the ATM NNI cell header. The Virtual Circuit Index (VCI) is a 16-bit ATM Forum UNI 3.1 VCI field. The 3-bit Payload Type (PT) is the ATM Forum UNI 3.1 field. It occupies bits 2–4 of octet 11 of the downstream slot. The Payload Type bits follow the ATM UNI 3.1 specifications:

TABLE 1

| PTI Coding (MSB first) | Interpretation |
| --- | --- |
| 000 | User data cell, congestion not experienced, SDU-type = 0 |
| 001 | User data cell, congestion not experienced, SDU-type = 1 |
| 010 | User data cell, congestion experienced, SDU-type = 0 |
| 011 | User data cell, congestion experienced, SDU-type = 1 |
| 100 | Segment OAM F5 flow related cell |
| 101 | End-to-end OAM F5 flow related cell |

TABLE 1-continued

| PTI Coding (MSB first) | Interpretation |
| --- | --- |
| 110 | Reserved for future traffic control and resource management |
| 111 | Reserved for future functions |

The single Cell Loss Priority (CLP) bit is the UNI 3.1 CLP bit which occupies bit 1 of octet 11 of the downstream slot. A CLP bit=0 indicates a higher priority traffic cell and a CLP bit=1 indicates a lower priority cell. Upon entering the overall system, a cell with CLP=1 may be subject to discard depending on network traffic conditions. The Header Error Control (HEC) is a standard ATM cell HEC field. The actual data is contained in the Cell Payload (PDU), which is 48 octets in length. This corresponds to the normal ATM cell PDU. Finally, 6.7 octets of forward error correction are provided.

Figure 15:
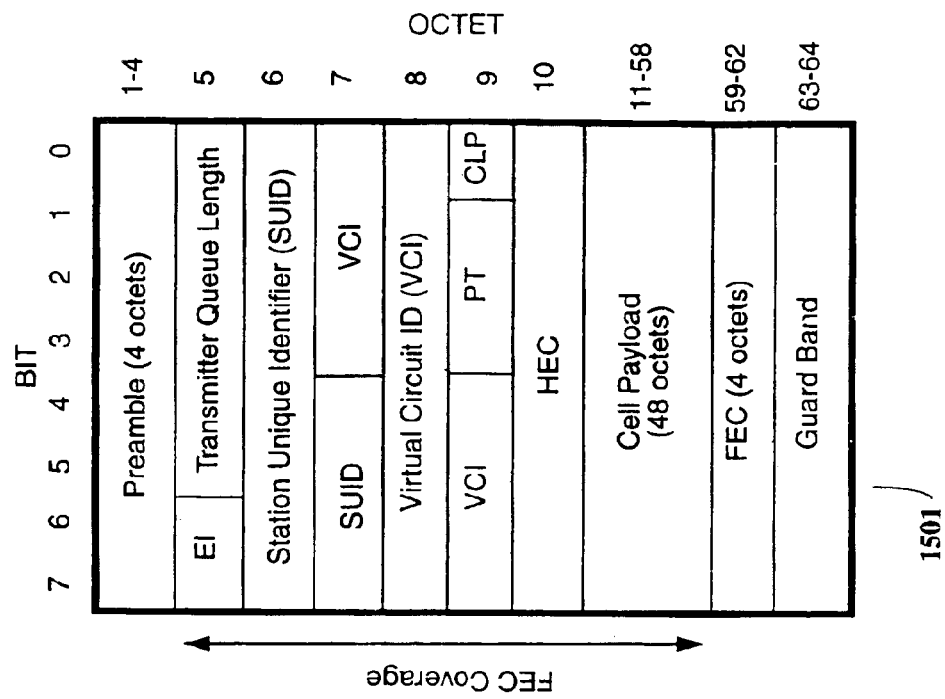
FIG. 15 shows an upstream slot structure.

FIG. 15 shows an upstream slot structure. The Preamble is 4 octets in length and consists of a series of ones and zeros used to help identify the beginning of a cell slot. The preamble contains a pattern which provides the receiver with an identification of the start of valid data, beginning with the EI bits, The two-bit Encryption Index (EI) 2 bits) conveys a four valued indication of the encryption status of the ATM PDU. A value of <0b00> means that the ATM PDU is not encrypted, <0b01> means encrypted with key 1, <0b10> means encrypted with key 2, and <0b11> means encrypted with key 3. A three-key index is kept for each the station address and each multicast group address of which the station is a member. The Transmitter Queue Length (TQL) is 6 bits and is obtained from the queue length on line 702 of FIG. 7. The station places the length (as measured in slots) of the transmit queue. This field is used to communicate a bandwidth request to the head-end controller. The TQL value range is <0x00> through <0x3F>. The Station Unique Identifier (SUID) is a 12-bit value which is the station unique identifier of the source station of this slot; i.e., the station that transmitted this ATM cell The Virtual Circuit Index (VCI) is (16 bits) corresponding to an ATM Forum UNI 3.1 VCI field. The Payload Type (PT) is 3 bits and corresponds the ATM Forum UNI 3.1 field. The PT field occupies bits 2–4 of octet 11 of the upstream slot. The Cell Loss Priority (CLP) bit corresponds to the UNI 3.1 CLP bit. The CLP bit occupies bit 1 of octet 11 of the upstream slot A CLP bit=0 indicates a higher priority traffic cell and a CLP bit=1 indicates a lower priority cell. Upon entering the system, a cell with CLP=1 may be subject to discard depending on network traffic conditions. The Header Error Control (HEC) corresponds to a standard ATM cell HEC field, and the Cell Payload (PDU)(48 octets) corresponds to a normal ATM cell PDU. The Forward Error Correction field is 4 octets which contain a 4-byte FEC which covers octets 4 through 59 of the upstream slot. The FEC type is RS (54, 58). Finally, the Guard Band is 2 octets. This dead zone is the transmitter guard band between cell bursts.

Figure 16:
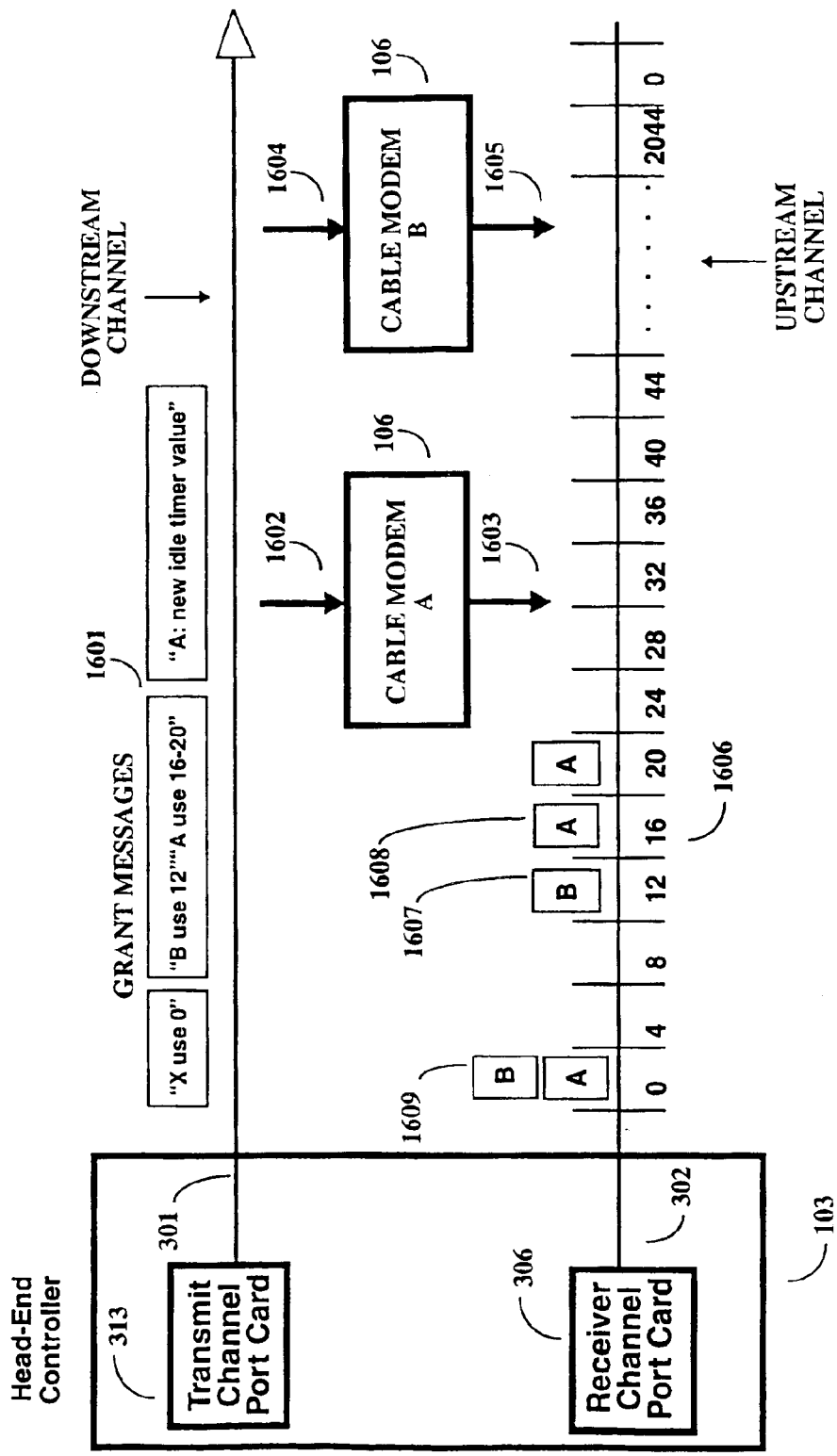
FIG. 16 schematically illustrates an upstream channel that has been organized into slots which may be assigned for the transmission of ATM cells from a first cable modem A or a second cable modem B.

FIG. 16 schematically illustrates an upstream channel 302 that has been organized into slots 1606 which may be assigned for the transmission of ATM cells from cable modem A 106 or cable modem B 106. The slots on the upstream channel are numbered in ascending order beginning at 0 up to 2044 (decimal) and then the count is repeated starting at 0. In the currently preferred embodiment, the slots are subdivided into mini-slots; four mini-slots comprise a whole slot which holds an ATM cell. Common techniques for ranging the cable modems 106 produce a timing alignment condition such that if two modems are both instructed to simultaneously transmit an ATM cell in the same slot n, where n is one integer value selected from 0 to 2044, the first bit from each cable modem transmission 1603 and 1605 would arrive at the head end receiver port 306 at the same time, within minimum time jitter 1609. Further, the head end controller 103, via the transmitter port card 313 and downstream channel 301, issues grant messages 1601 to cable modems via their receivers 1602 and 1604. The contents of the grant message contain individual grants that are directed to specific cable modems. Grant message 1601 contains a special grant "X", called a contention grant, which gives permission for any modem to transmit in slot 0, a direct grant for Cable Modem B 106 to transmit one ATM cell in slot 12 and a direct grant for Cable Modem B 106 to transmit two ATM cells, in slots 16 and 20, and a null grant which instructs cable modem A 106 to update its idle timer value. The direct grant messages are received by the Cable Modem B 106 such that its ATM cell is appropriately transmitted in upstream slot 12 1607 and received by Cable Modem B 106 such that its ATM cells are appropriately transmitted in slots 16 and 20 1608. It is asserted that the Grant Message 1601 mechanism can be extended to an arbitrary number of individually identified Cable Modems 106 which receive messages via the same downstream channel 301 such that sharing of the slotted upstream channel 302 is accomplished under direction of grants being issued from the head end controller 103.

It is asserted that the specific upstream channel access slot counting mechanism of counting from 0 to 2044 then repeating to 0 can be generalized to any slot counting method employing a repeating integer counting range where all cable modems on the same upstream channel share the starting integer and notion of the integer value on which to begin repeat count. Furthermore, in a slot grant system, the assignment of slots on a fixed repeating interval or at a fixed distance (e.g., n=n+60), yields a constant bit rate service rate to the cable modem. Further, it is asserted that while constant bit rate allocations are being granted, the unused slots on the upstream channel can be assigned to any cable modem on a dynamic basis, thereby assigning additional variable bandwidth to any cable modem. In one embodiment, the mixture of constant bit rate and variable bit rate allocations are scheduled on the same upstream channel.

Figure 17:
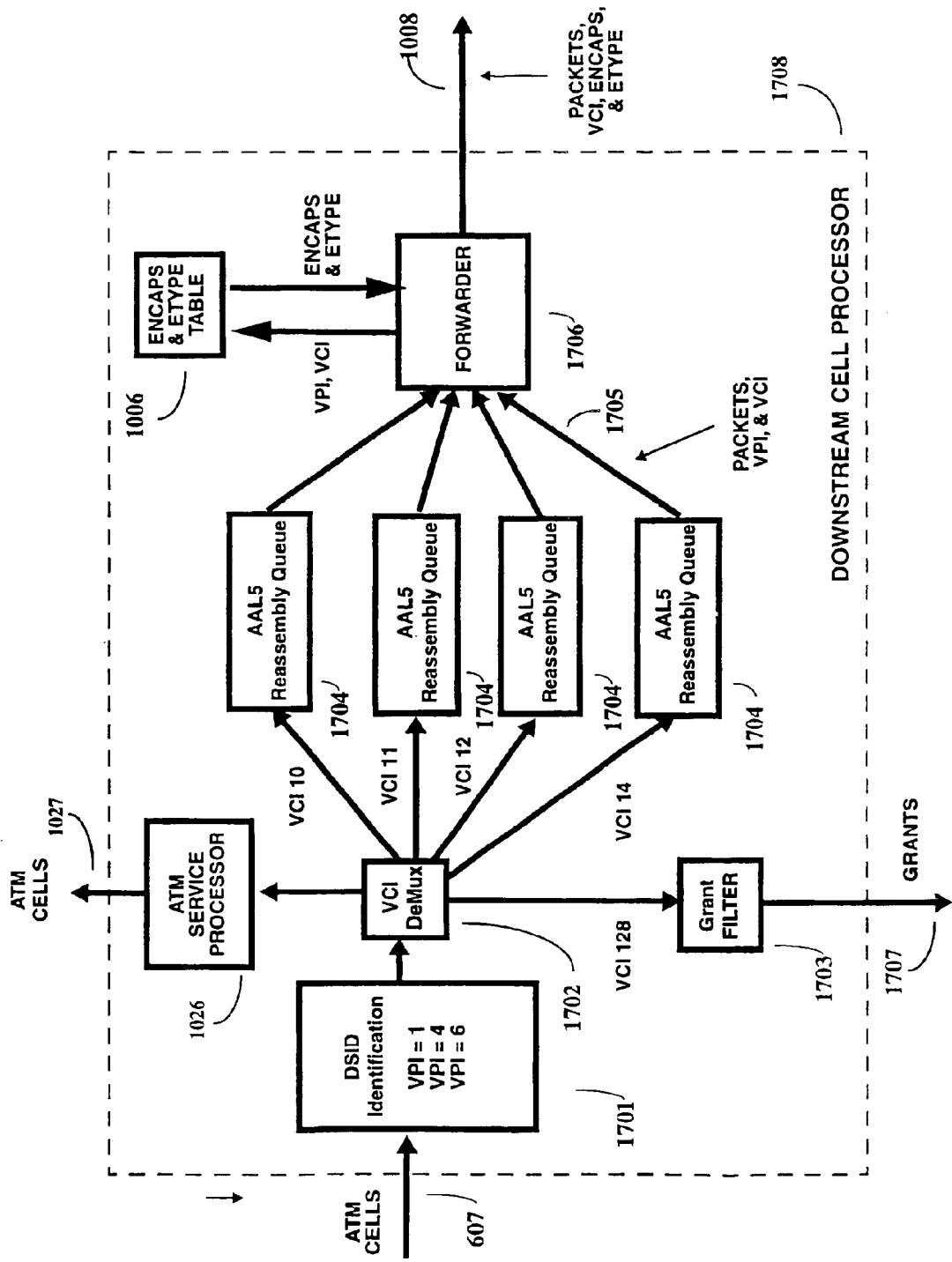
FIG. 17 is a circuit diagram showing the functions and interactions corresponding to a VPI selector and a VC demultiplexer of an STU for handling incoming ATM cells.

FIG. 17 is a circuit diagram showing the functions and interactions corresponding to a VPI selector and a VC demultiplexer of an STU for handling incoming ATM cells on line 607. This combination of circuits is called the Downstream Cell Processor 1708. The ATM cell stream output from the cell delineation, HEC verification, and DES decoding blocks is input to the Destination Station ID (DSID) Identification circuit 1701. The function of the DSID circuit 1701 is to determine which of the ATM cells are to be accepted and which are to be discarded. The STU has been preprogrammed to identify certain VPI values. In the preferred embodiment, one of these VPI values corresponds to the Station Unique Identifier (SUID). The selection process is determined according to the VPIs contained in each individual ATM cell as compared against the preprogrammed VPI values. Only those ATM cells with a VPI value matching the preprogrammed VPI values are retained. Other ATM cells are ignored. In this example, only those cells having VPIs of 1, 4, and 6 are retained for processing. VPI 1 may correspond to a unicast mode, whereby only this particular STU receives ATM cells with a VPI 1 value (i.e., the SUID value). The VPI 1 value is unique to this particular STU. A VPI 6 may correspond to a broadcast mode, whereby it is intended that all STUs are to receive the ATM cell. One or more VPIs can be programmed into the STU so that it accepts multicast ATM cells. For example, VPI 4 may correspond to multicast ATM cells, whereby this particular STU belongs to a specific group of STUs which have been programmed to accept ATM cells with a VPI value of 4. In the preferred embodiment, the DSID Identification function 1701 selects ATM cells based on VPI values. It should be noted that this function can be augmented to select ATM cells for further processing based upon any bit pattern contained in the downstream MAC messages. That is, combinations of VPI or VCI may be used or combinations of other MAC header information and VPI or VCI values may be used.

If the DSID identification circuit 1761 determines a match between the preprogrammed VPI values and the VPI field of the ATM cell, that particular ATM cell is routed for further processing by the VCI Demultiplexer 1702. The VCI Demultiplexer 1702 routes the ATM cell to one of several different circuits within the STU, depending on its VCI value. One such VCI value (e.g., VCI 128) causes the ATM cell to the Grant Filter 1703. Grant Filter 1703 filters the direct, contention, and null grants sent by the headend controller. The grants are then sent on for further processing via line 1707. Certain VCI values (e.g., VCI 10–14) cause the ATM cell to be sent to one of several Ethernet AAL5 reassembly queues 1704 which reassembles Ethernet frames which have been null encapsulated in an AAL5 stream into Ethernet packets. The reassembled Ethernet packets are sent via lines 1705 to the forwarder 1706. Based on the VPI, VCI values, the Encapsulation and Etype table 1006 provides the appropriate encapsulation and etype information to the Forwarder 1706. The resulting packets, VCI, encapsulation, and etype information is then output on line 1008. Packets which do not get sent to either the Grant Filter 1703 or AAL5 Reassembly Queues 1704, are input to the ATM Service Processor 1026 which determines whether the packet is to be discarded or output onto interface line 1027. It should be noted that the VCI Demux function 1702 could be a more sophisticated switching function.

Figure 18:
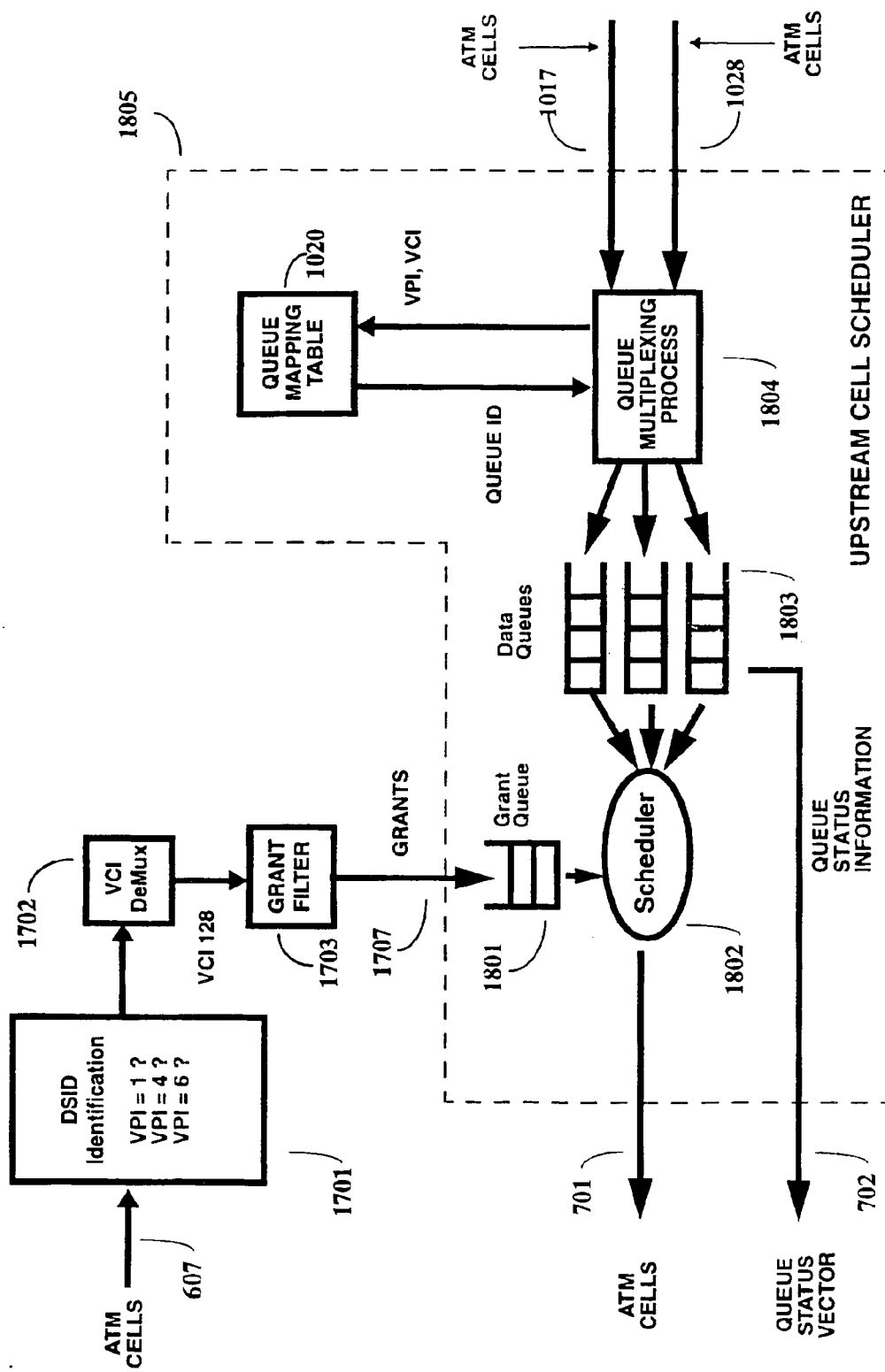
FIG. 18 shows a circuit diagram of an upstream cell scheduler corresponding to an STU.

FIG. 18 shows a circuit diagram of an upstream cell scheduler 1805 corresponding to an STU. There are two inputs associated with enabling the STU to perform upstream transmissions. First, special virtual connections on line 612 are used specifically for grants (e.g., direct, contention, and null). Grant cells designated for this particular STU are identified by their VPIs by the DSID identification circuit 1701. The VCI demultiplexer 1702 routes the grant cells to the grant filter 1703 according to the VCI value (e.g., VCI 128) and then to the grant queue 1801 via line 1707. The queued grants are dispensed to the scheduler 1802 which schedules ATM cells for upstream bound transmissions over line 701 according to the slotted transmission process of FIG. 16. The actual data to be transmitted is input on line 1017 to the queue multiplexing process 1804. By referencing the VPI, VCI values into a queue mapping table 1020, a queue ID is determined. The queue ID allows the queue multiplexing process to prioritize ATM cells on an individual basis into the various cell queues 1803. Eventually, the ATM cells stored in the cell queues 1803 are cleared for transmission by scheduler 1802. Furthermore, the aggregate queue length of the ATM cells awaiting transmission in the data queues 1803 are sent to the headend controller via line 702.

Figure 19:
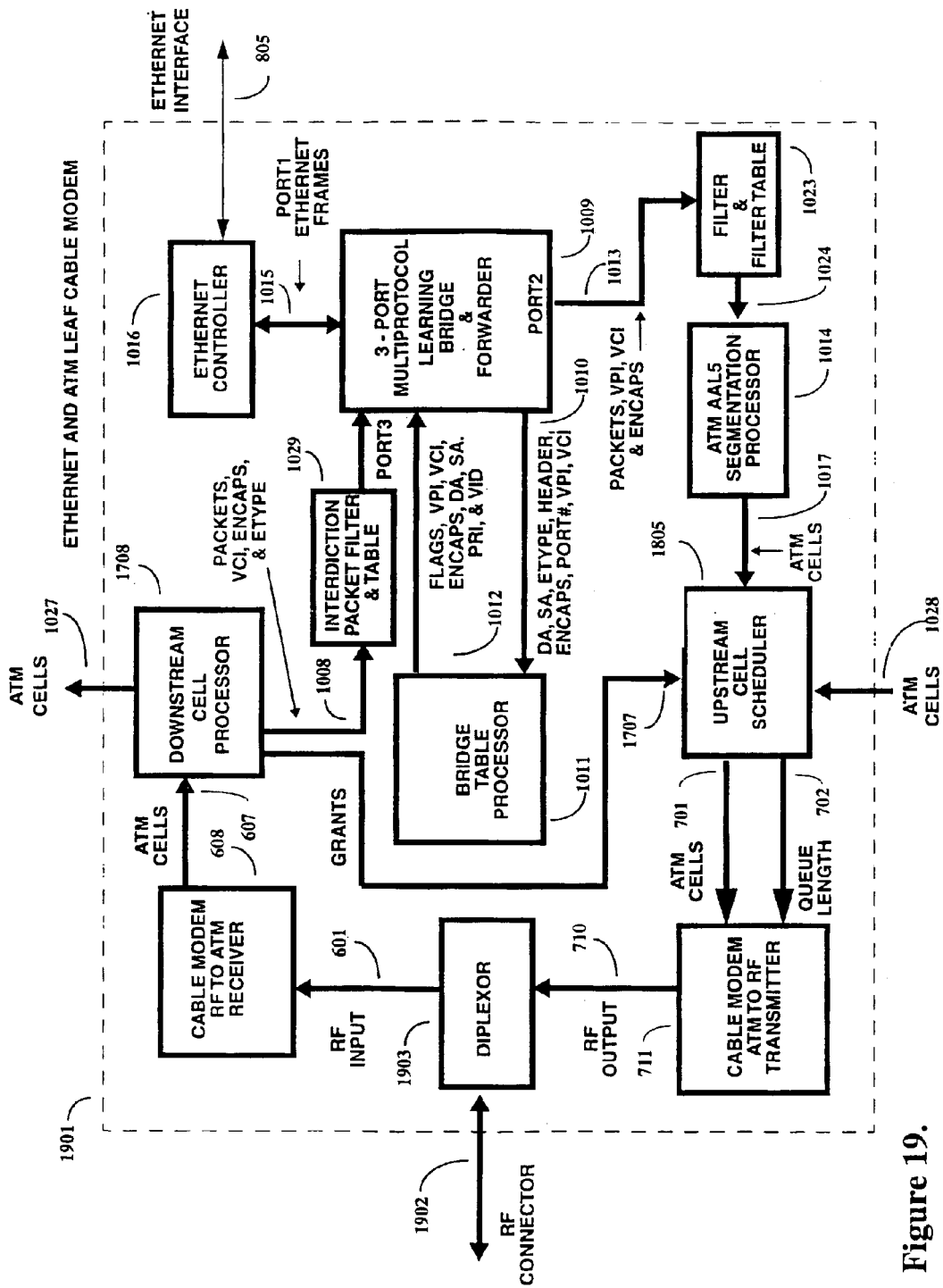
FIG. 19 shows a flow diagram associated with an STU.

FIG. 19 shows a block diagram of an Ethernet and ATM Leaf Cable Modem 1901. This figure is equivalent to that shown in FIG. 10, except that the ATM based Ethernet Leaf Processor that had been connected to an ATM switch is now adapted to an RF connected cable leaf modem. The RF connected cable leaf modem exhibits the same behavioral semantics as described with reference to FIG. 10. The three new blocks included in FIG. 10 that was not shown in FIG. 10 include the Downstream Cell Processor 1708, Cable Modem RF to ATM Receiver 608, and Diplexor 1903. The downstream cell processor 1708 has been described in reference to FIG. 17. Its output is the same as that of the ATM AAL5 reassembly processor 1004 of FIG. 10. They are functional equivalents. The Cable Modem RF to ATM Receiver was described in reference to FIG. 6. The Diplexor 1903 is a common high pass/low pass type filter coupler that routes the downstream RF input to Receiver 613 while routing the RF output from the transmitter 717 upstream.

Figure 20:
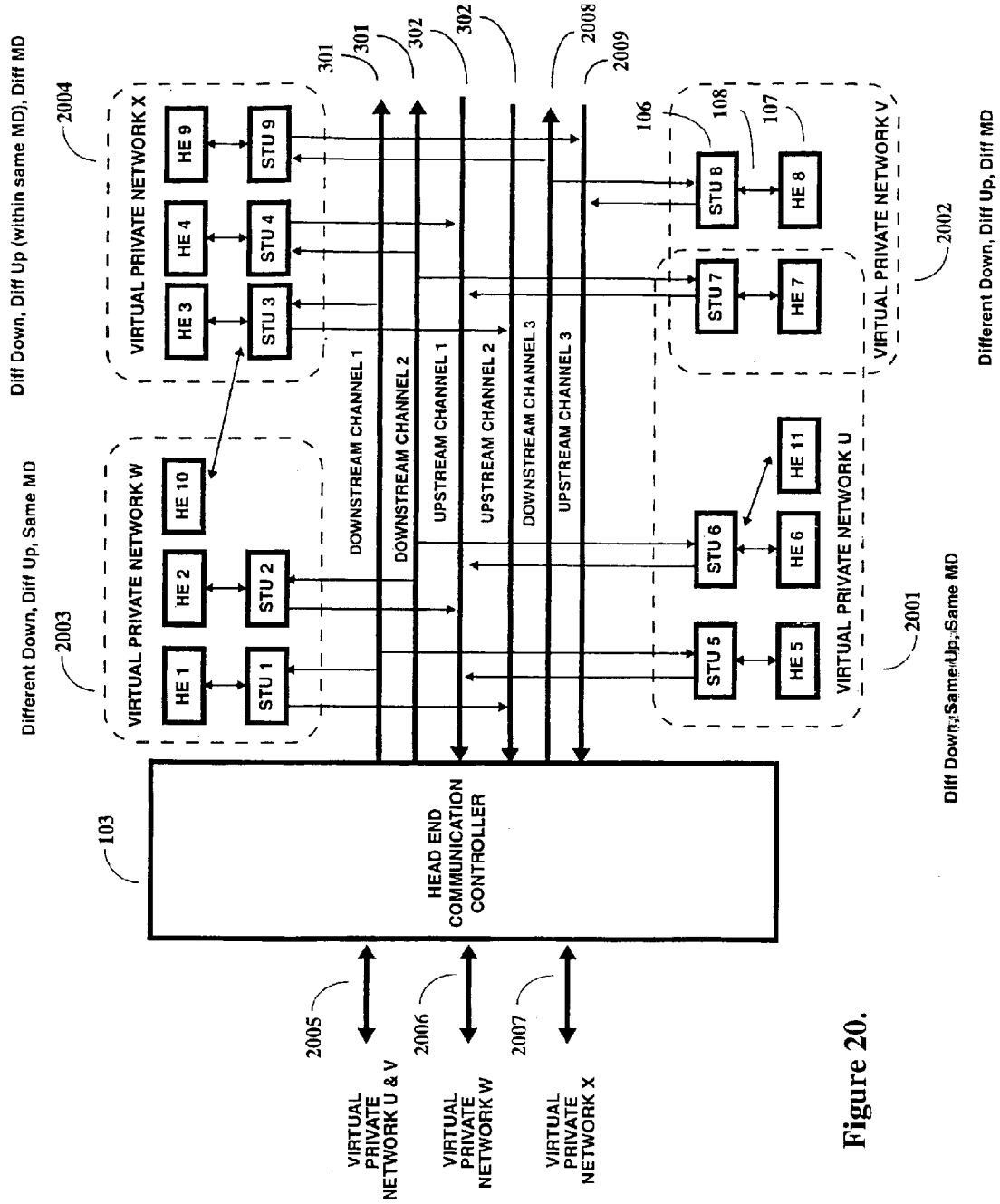
FIG. 20 shows the ATM system of the present invention having multiple virtual networks supported by multiple RF channels.

FIG. 20 shows the ATM system of the present invention having multiple virtual networks supported by multiple RF channels. The Head End Communication Controller 103 can have any number of downstream and upstream channels for supporting a plurality of virtual private networks. For purposes of illustration, three downstream channels and three upstream channels are shown for supporting virtual private networks U and V on interface 2005 and virtual private networks W and X on interface 2007. Downstream channels 1 and 2 and upstream channels 1 and 2 function as described above. However, downstream channel 3 and upstream channel 3 demonstrate the use of a different MAC domain. The virtual private network U 2001 consists of STU 5, STU 6, and STU 7. STU 5 services a single Home Equipment (e.g., home computers) 5, and STU 7 services a single Home Equipment (HE) 7. However, STU 6 services both HE 6 and HE 11, thereby showing that a single STU can service more than one HE. Furthermore, it can be seen that separate devices on different downstream channels can be serviced on the same upstream channel (e.g., STUs 5, 6, and 7 are serviced by downstream channels 1, 2, and 2 respectively, but are all serviced by a single upstream channel 1).

Virtual private network V 2002 consists of STU 7, HE 7, STU 8, and HE 8. STU 7 is connected to downstream channel 2 and upstream channel 1. In contrast, STU 8 is connected to downstream channel 3 and upstream channel 3, which belongs to a different MAC domain. Note also that STU 7 and HE 7 belongs to both virtual private network U 2001 and virtual private network V 2002. This illustrates the flexibility of the present invention to accommodate the same STU and HE in multiple virtual private networks over the same upstream and downstream channels. Virtual private network W 2003 consists of STU1, HE 1, STU 2, HE 2, and HE 10. STU1 and STU 2 have different upstream and downstream channels, yet they belong to the same virtual private network. Although HE10 participates in virtual private network W, it is serviced by STU 3 which principally belongs to virtual private network X 2004. Consequently, an HE does not have to be in a virtual private network in order to participate in that particular virtual private network. Conversely, a single STU can service multiple HEs belonging to different virtual private networks. For example, STU 3 services HE 10 which belongs to virtual private network W and HE 3 which belongs to virtual private network X. Virtual private network X 2004 consists of STU 3, STU 4, and STU 9 with respective HE 3, HE 4, and HE 9. STU 3 and STU 4 belong to the same MAC domain but have different downstream and upstream channels. STU 9 is in a different MAC domain, but belongs to the same virtual private network X as STUs 3 and 4.

Figure 21:
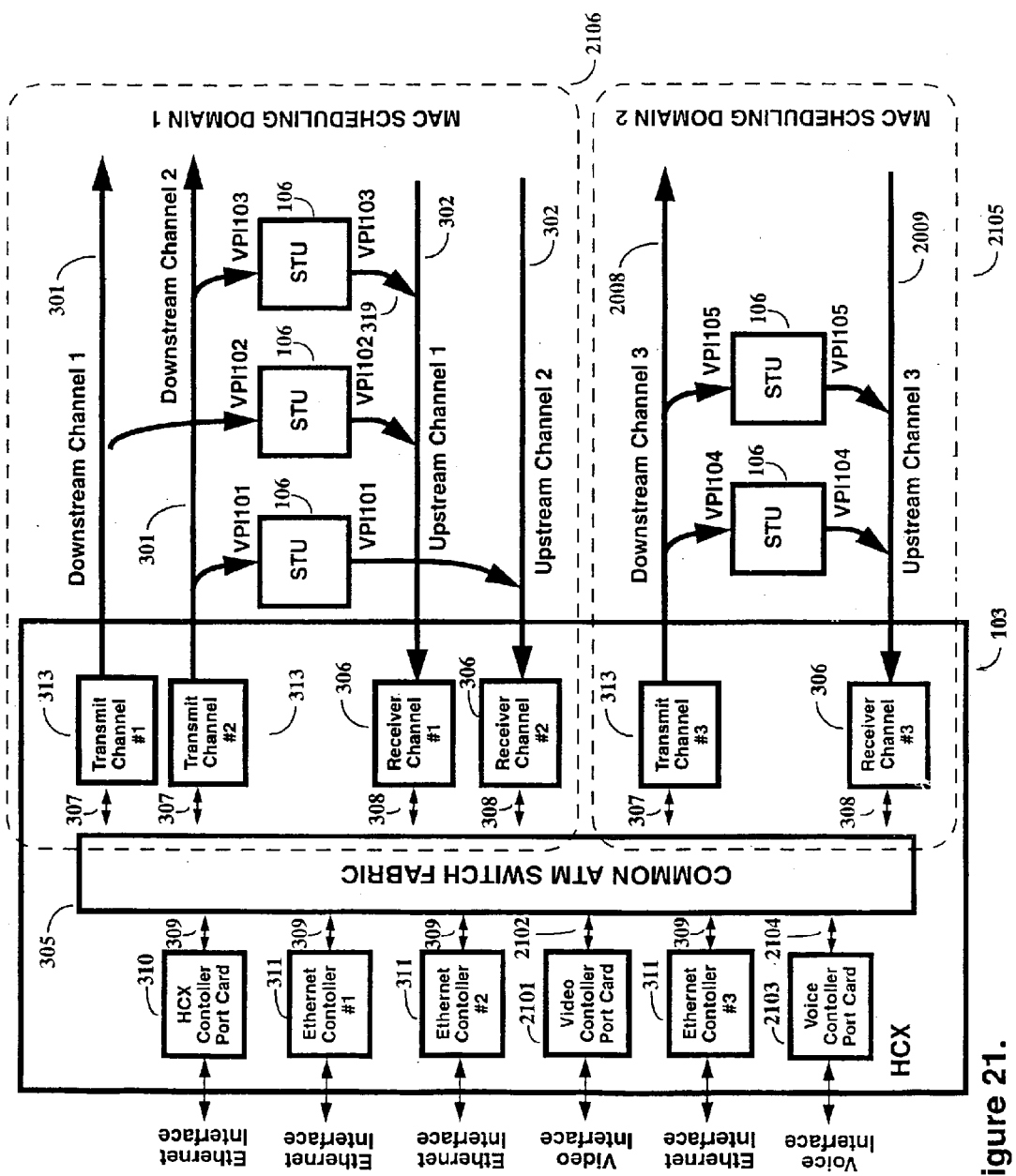
FIG. 21 shows a schematic diagram of a Headend Communications Controller supporting two MAC scheduling domains and an integrated services interface.

FIG. 21 shows a schematic diagram of a Headend Communications Controller supporting two MAC scheduling domains and an integrated services interface. The downstream channels 1 and 2 and upstream channels 1 and 2 correspond to those shown in FIG. 20 and comprise MAC scheduling domain 1, shown as 2106. Likewise, downstream and upstream channels 3 correspond to those shown in FIG. 20 and comprise a different MAC scheduling domain 2, shown as 2105. The integrated services interface includes Video Controller Port Card 2101 and Voice Controller Port Card 2103.

Figure 22:
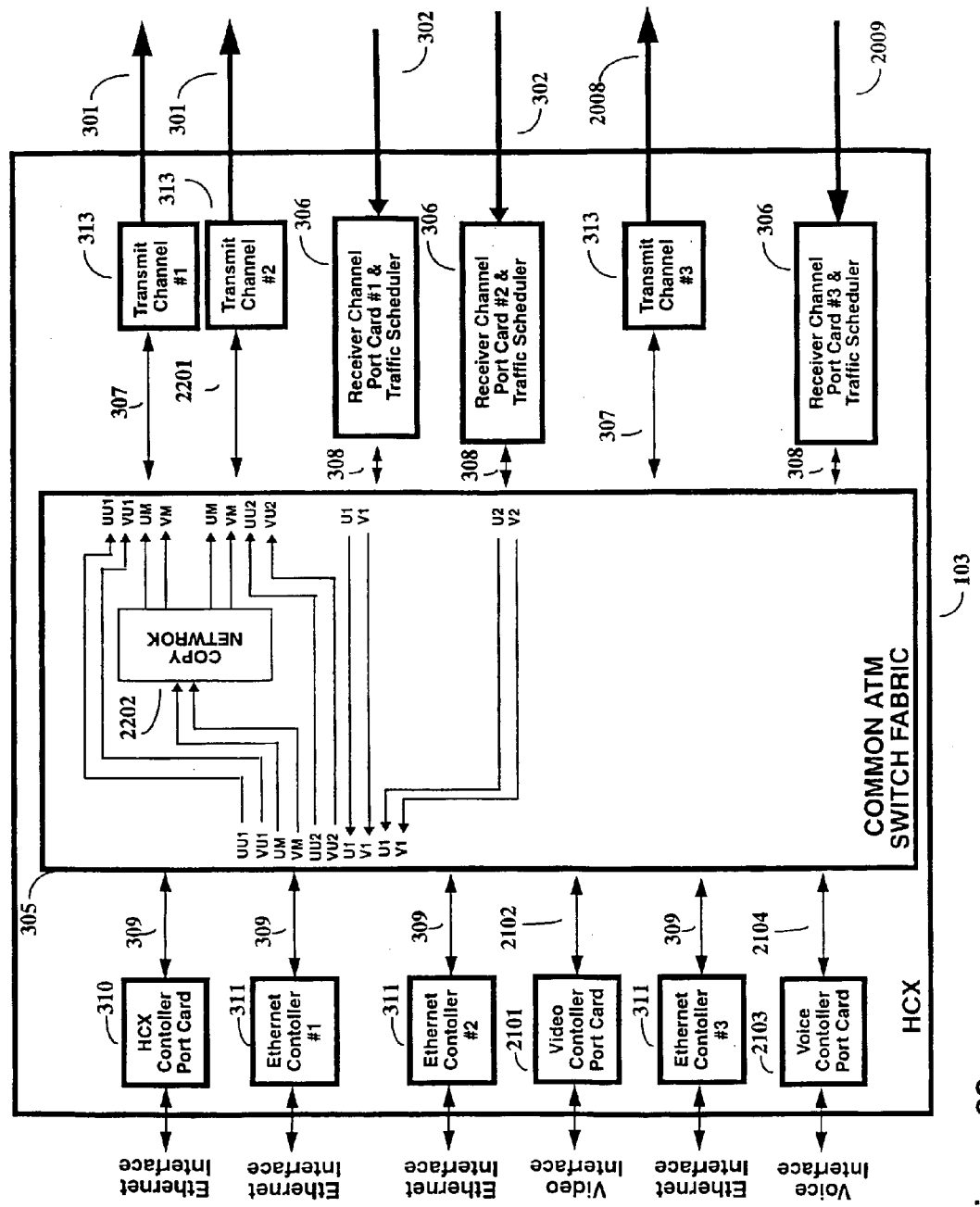
FIG. 22 is a schematic diagram illustrating how a single Ethernet controller can support multiple virtual private networks over the same transmit and receive channels.

FIG. 22 is a schematic diagram illustrating how a single Ethernet Root controller can support multiple virtual private networks over the same transmit and receive channels. This is feasible because Common ATM Switch Fabric 305 supports point-to-point connections as well as point-to-multipoint connections. Thereby, a unicast transmission can be sent from Ethernet Root Controller 311 via Common ATM Switch Fabric 305 to either of the two transmit channels 313 on the downstream. Likewise, unicast information can be received by the Ethernet Controller 311 on either of the two receiver channels 302. However, group addressed information (e.g., multi-cast and broadcast) is shared by all members associated with that group. In the example shown in this figure, Ethernet Controller #1 311 can send a first unicast transmission to virtual private networks U and V on transmit channel #1 through interface 307. These signals are depicted as UU1 and VU1. Ethernet Controller #1 can also send a second unicast transmission to virtual private networks U and V via a different transmit channel #2 through a separate interface 2201. These signals are depicted as UU2 and VU2. Ethernet Controller #1 can also send a multicast transmission to virtual private networks U and V. The multicast transmissions (UM and VM) from the Ethernet Controller #1 are duplicated by Copy Network 2202. One set of the UM and VM signals is sent via interface 307 to transmit channel #1 while the duplicate set of the UM and VM signals is sent via interface 2201 to the transmit channel #2. On the upstream side, Ethernet Controller #1 can receive a first transmission (U1 and V1) from the U and V virtual private networks from Receiver Channel Port Card #1. At the same time, Ethernet Controller #1 can receive a second transmission (U2 and V2) from the U and V virtual private networks on the receiver channel port card #2.

The traces shown in the ATM Switch 305 correspond to virtual connections, which may be a virtual path routings or a collection of virtual circuits. There exist a variety of different equivalent methods for providing the same interconnectivity through an ATM switch. Hence, it is shown that with the present invention, one ethernet controller can support multiple of virtual private networks up to the capacity of the ATM switch over multiple downstream transmitter channels and multiple receiver upstream channels. The number of transmitter channels can be scaled to any arbitrary number by means of the virtual connections and copy networks, and the number of receiver channels can be scaled arbitrarily, independent of the number of virtual private networks actually deployed over those channels.

Figure 23:
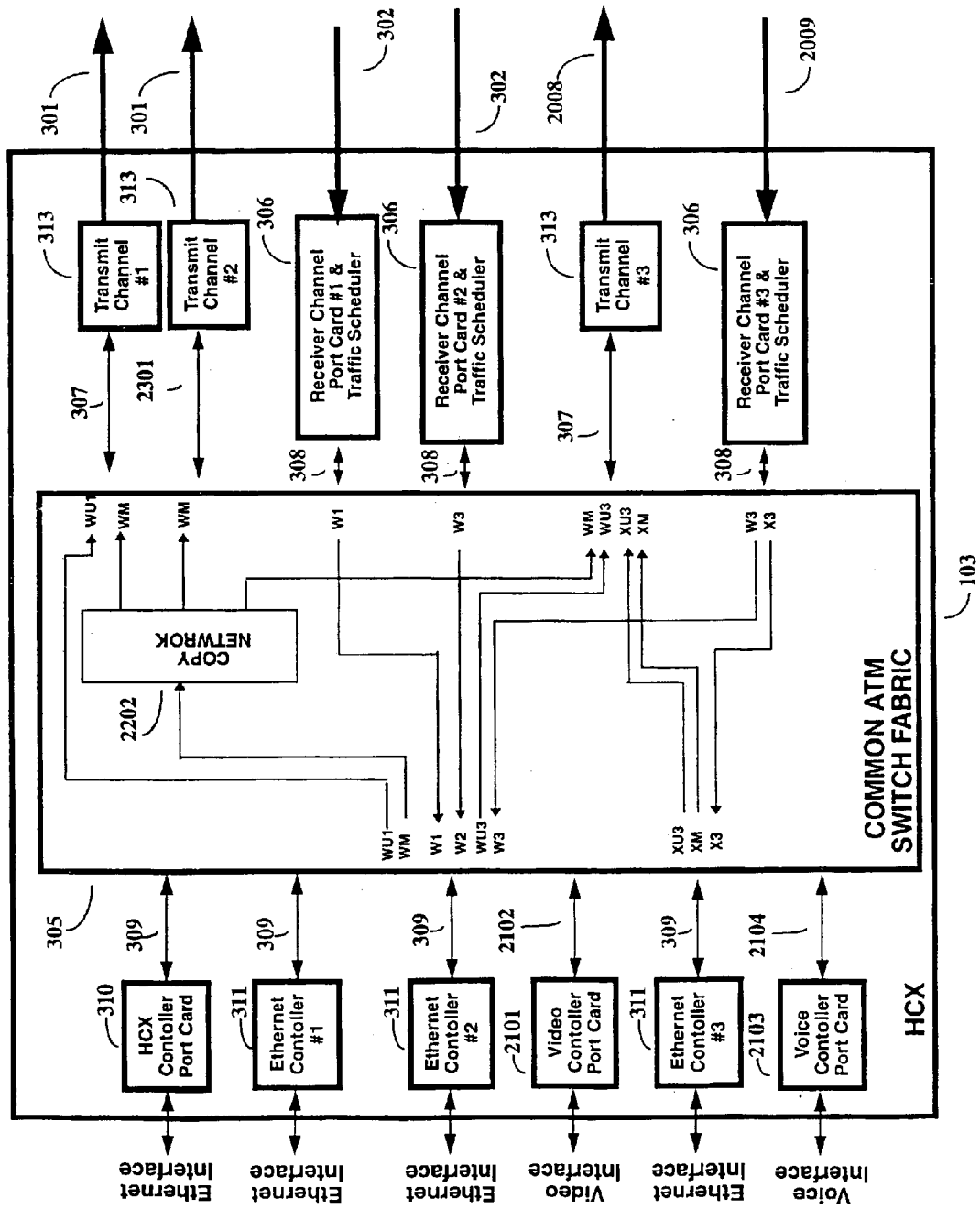
FIG. 23 is a schematic diagram illustrating how multiple Ethernet controllers can support different virtual private networks.

FIG. 23 is a schematic diagram illustrating how multiple Ethernet controllers can support different virtual private networks. In the example shown, Ethernet Controller #2 is assigned to virtual private network W, and Ethernet Controller #3 is assigned to virtual private network X. Ethernet Controller #2 can send a unicast signal (WU3) and a multicast signal (WM) to the Transmit Channel #3. Likewise, Ethernet Controller #3 can send a unicast signal (XU3) and a multicast signal (XM) to the same Transmit Channel #3 even though it has a different interface than that of Ethernet Controller #2. And because the same Transmit channel is being used, there is no need for a copy network. On the upstream side, the Receiver Channel Port Card #3 receives both unicast signals from the virtual private network W (W3) as well as from virtual private network X (X3). The W3 signal is routed through virtual circuits of the ATM Switch to Ethernet Controller #2 while the X3 signal is routed to the Ethernet Controller #3. It should be noted that the combination of FIGS. 22 and 23 teach that the present invention allows for scalability and a variety of interconnections and configurations. This flexibility also allows one Ethernet controller to participate in multiple MAC domains and multiple Ethernet Controllers to participate in any combination of downstream channels, upstream channels, and MAC domains.

Figure 24:
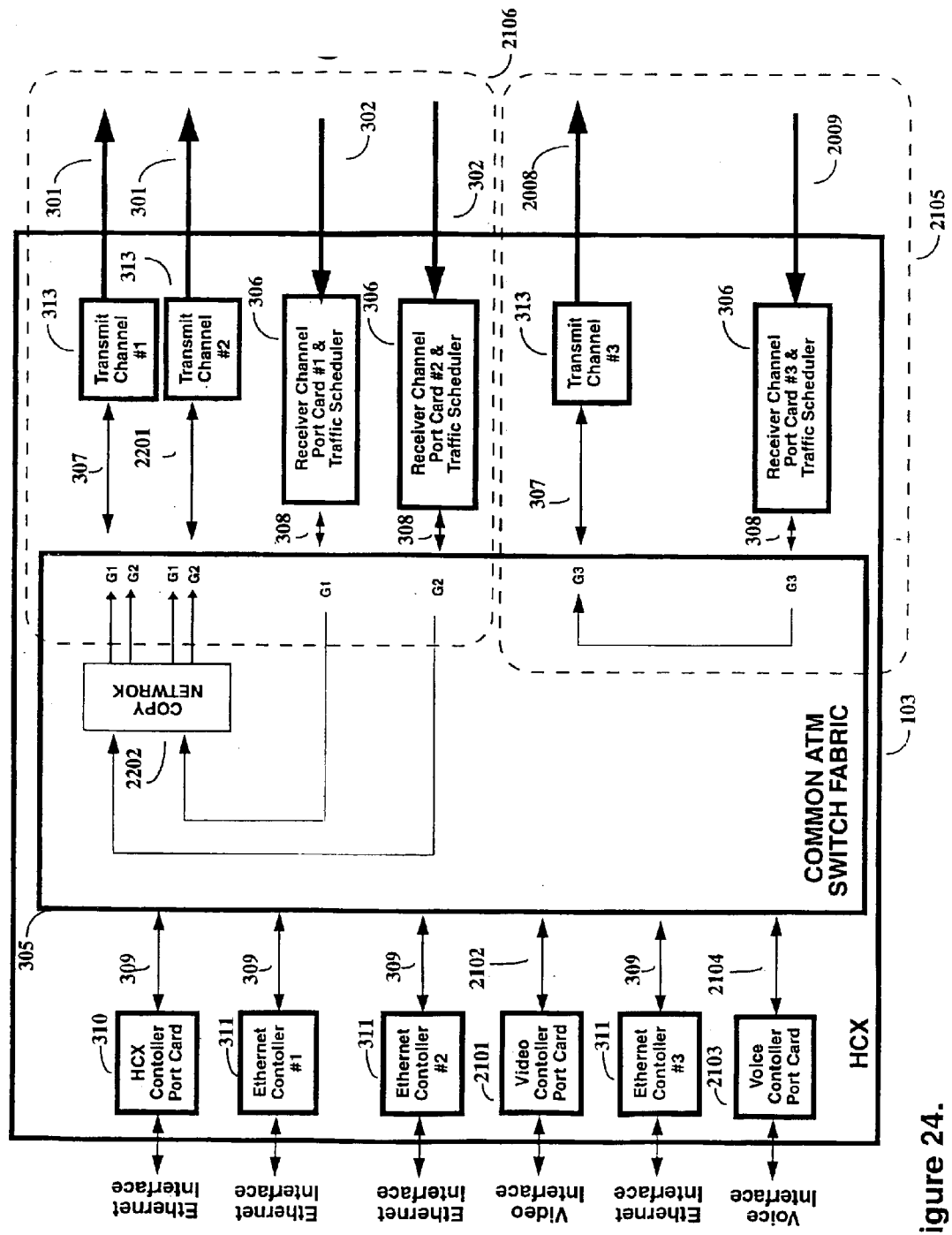
FIG. 24 shows an implementation of a MAC scheduling domain.

FIG. 24 shows an implementation of two MAC scheduling domains. Each of the Receiver Port Cards 306 contain a Traffic Scheduler which is responsible for processing the requests received on that upstream channel in issuing grants on the downstream as part of the grant mechanism described above. A MAC domain is comprised of a set of downstream transmitter channels and the set of upstream receiver channels that send their grants down that set of transmitter channels. Grants are issued on a broadcast or multicast VPI value on a specific VCI (e.g. 128) to groups of STUs which may be participating on that particular upstream channel. However, these groups of STUs may be listening on one of a plurality of downstream channels in the MAC scheduling domain. Hence, all grant messages are sent down all the transmit channels simultaneously. For example, a grant G1 from Receiver Channel Port Card #1 and a grant G2 from Receiver Channel Port Card #2 are input to Copy Network 2202 which copies and sends duplicate sets of both grants G1, G2 to Transmit Channel #1 and Transmit Channel #2. Note that in the second MAC scheduling domain 2105 where there is only one Receiver Channel Port Card #3 and one Transmit Channel #3, there is no need for a copy network. The significance of this design is that one can scale the number of transmit channels up or down by simply establishing the appropriate point-to-multipoint connections. The number of receiver channels can be similarly scaled because of the traffic scheduling being employed. In the preferred embodiment, the traffic scheduler resides in the Receiver Channel Port Card; the scheduler receives reports regarding upstream traffic and requests and then generates grants which are sent to one or more Transmitter Port Cards. It should be noted that the traffic scheduler may reside elsewhere in the head-end controller so long as it receives upstream traffic reports and requests from each Receiver Port Card and issues grants which are sent on one or more downstream channels. In the preferred embodiment, all upstream channel reports, station requests, and grants are packaged in one or more ATM cells. It should be noted that other packet formats may be used to convey this information.

Figure 25:
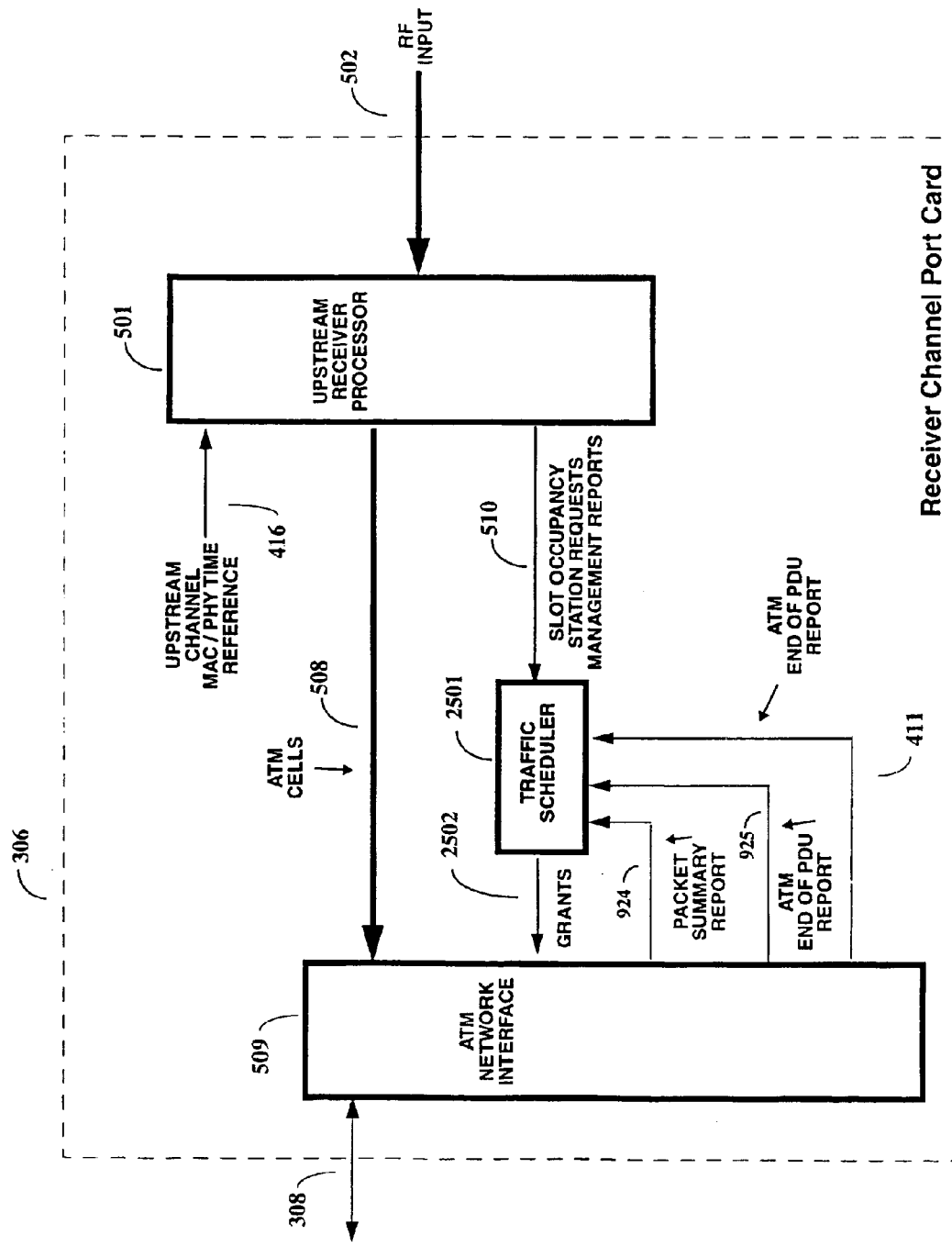
FIG. 25 is a schematic diagram of a Receiver Channel Port Card.

FIG. 25 is a schematic diagram of a Receiver Channel Port Card. As described above, the RF input is fed into the Upstream Receiver Processor 501 on interface 502. ATM cells on line 508 are input to the ATM Network interface 509 from the Upstream Receiver Processor 501. The Traffic Scheduler 2501 accepts the slot occupancy reports, station requests and management reports from the Upstream Receiver Processor 501 for scheduling purposes. Specifically, this information is used to issue grants on line 2502 to the ATM Network Interface 509. These grants are passed on downstream via interface 308 to the STUs giving them permission to use upstream resources. The ATM End of PDU reports generated by the ATM HEC Processor and ATM Cell Scheduler informs the Traffic Scheduler of downstream traffic. More significantly, the Packet Summary Report which contains specific packet information (e.g., TCP downstream data) is used as a downstream traffic indication by the Traffic Scheduler.

Figures 26A, 26B:
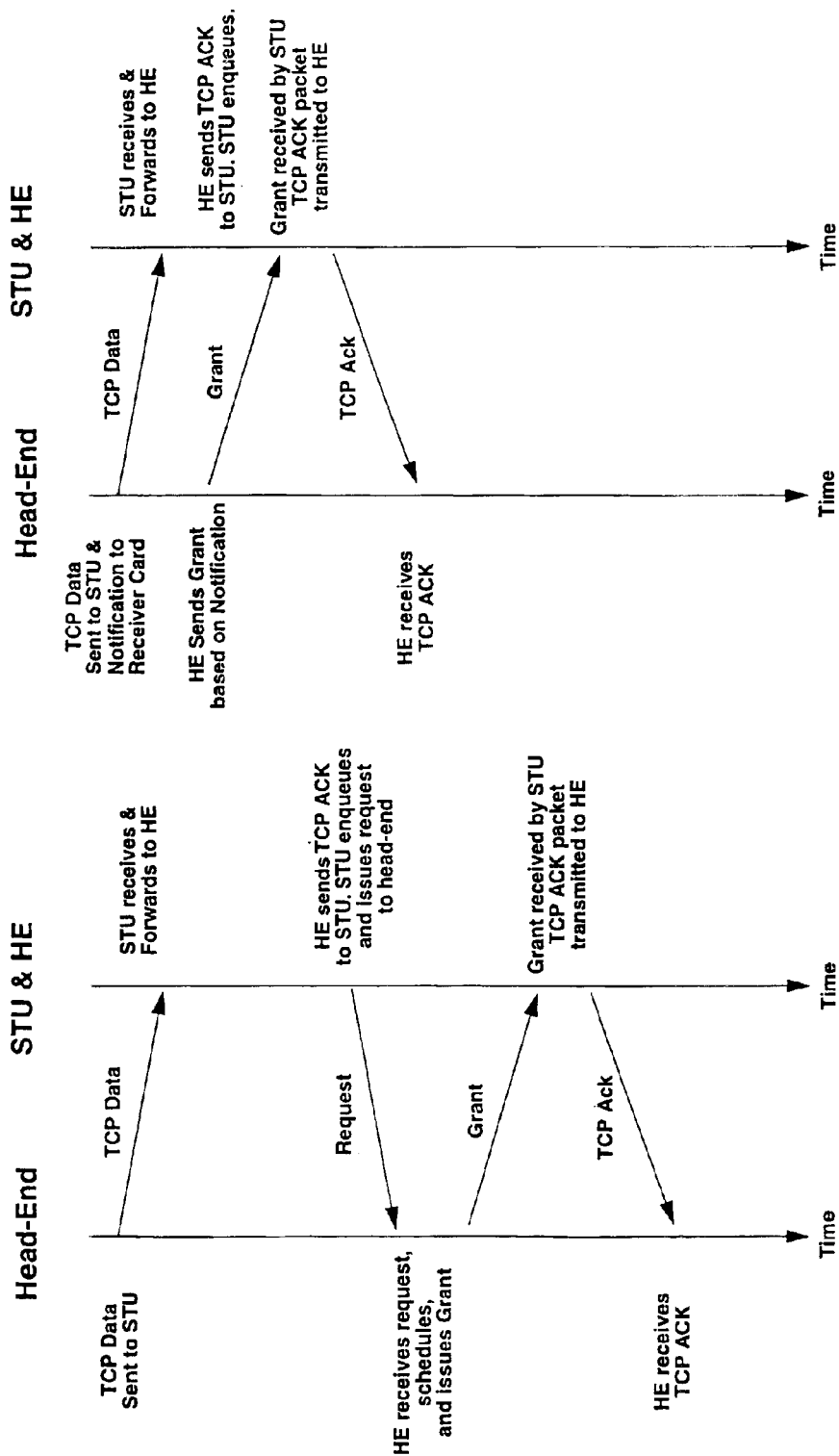
FIG. 26a is a diagram illustrating the protocol flow between a Headend Controller (HE) with an STU and associated Home Computing Equipment (HCE).
FIG. 26b is a diagram illustrating a protocol flow between a Headend Controller with an STU and Associated HCE having improved timing by informing the scheduler of TCP data that was previously sent downstream.

FIG. 26a is a diagram illustrating the protocol flow between a Headend Controller (HE) with an STU and associated Home Computing Equipment (HCE). The y-axis corresponds to the elapse of time Starting at the top, the Headend Controller initially sent TCP data downstream to the STU. The STU receives the TCP data and forwards it to the HCE. Some time later, the HCE sends a TCP acknowledgment signal (ACK) back to the STU. The TCP ACK signal acknowledges the receipt of TCP data and is also used in error recovery mechanism and flow control. When the STU receives a TCP ACK from the HCE, it enqueues that packet and issues a request back upstream to the Headend Controller. In response, the Headend Controller receives the request, performs scheduling, and issues a grant for that STU request on the downstream corresponding to the scheduling. A short time later, the grant is received by the STU and an TCP ACK packet is transmitted to the Headend Controller. The Headend Controller receives and processes the TCP ACK.

FIG. 26b is a diagram illustrating a protocol flow between a Headend Controller with an STU and Associated HCE having improved response timing by informing the scheduler of TCP data that was previously sent downstream. Initially, TCP data is sent downstream by the Headend Controller to the STU. As described above, packet summary and ATM end of PDU reports are input to the scheduler pertaining to the TCP data that was just sent. Thereby, the scheduler knows to expect an acknowledgment back corresponding to that packet. At the same time, a notification is sent to the receiver card. The TCP data is then received by the STU which forwards it to the Home Computing Equipment. In response, the HE sends a TCP ACK signal to the STU. The STU enqueues the TCP ACK. However, the Headend Controller sends a grant to the STU just before a request from that STU is received. The Headend Controller can send the grant based on the notification that was received. This grant is sent downstream to the STU. Thereupon, a TCP ACK packet is transmitted upstream to the Headend Controller for processing. Note that the difference in the time scale of when the TCP ACK is received between FIGS. 26a and 26b shows that the TCP flow is more efficient when the scheduler is supplied with information to sufficiently predict when to send grants, thereby removing the time associated with a typical request/grant loop. It should be noted that the function of the response time improvements in FIG. 26a and FIG. 26b have been illustrated using the TCP protocol. This response time improvement in general in nature may be achieved for other protocols besides CP, where applicable.

It should be noted that data communication networks with a shared channel to a central bandwidth scheduler, including satellite and wireless systems, must utilize either a polling mechanism, where the scheduler asks the station if it has any data to send, or a contention mechanism, where the station sends data or a request to send data to the scheduler during a suitably designated opportunity. In the former case, the time at which the station responds has been allocated to only to that station and in the latter case, any waiting station can respond, thus opening the possibility of collision and loss of the sent data. Polling means that a station's requests can always be passed to the scheduler at some known, bounded delay, but it also wastes bandwidth on stations that have nothing to send. This becomes prohibitive for large numbers of stations.

Contention mechanisms work very well in high-speed, low-delay environments like that of an Ethernet network or IEEE 802.3 network. For systems like CATV plants, there is a relativity long delay between the time request can be sent by a station and the scheduler can respond with an allocated time ("grant") at which the station can send. In addition, when collisions occur, the necessary Contention Resolution Algorithms (CRAs) can cause even longer delays before they can be resolved and all of the stations can pass a request to the scheduler. When a station has information to send, it takes a minimum of a round trip delay through the system (including scheduler overhead) when there is not collision and the time can grow to many round trip delays when collisions occur. The problem then is the need to keep stations out of contention and reduce delays without using a polling system.

The problem occurs at the medium access (MAC) layer of the data network, but this solution uses knowledge about the behavior of the transport layer of data networking. All reliable transport protocols send acknowledgments (ACKs) to the sender of the data. The number of data packets received per acknowledgment sent varies with the particular transport protocol (e.g., TCP/IP. Appletalk) and its particular implementation, but in general, information about a data packet being sent to a specific station can be used by the scheduler as a "hint" to give that station a grant in which to send acknowledgment. Knowledge about which particular protocol is being used and feedback on whether the grants were used to improve the quality of the "hints" sent to the scheduler. For example, in TCP/IP, an ACK should be sent no less often than one every two received packets (though some implementations violate this). Thus, a good hint to the scheduler of when to allocate a grant is send one grant for every two packets sent to the station. Additional information, such as whether or not the grants were used, can be utilized to improve the quality of the hints. The grant can be sent to the station at about the same time as the packet for a time that takes into account the station's time to process the data and produce a grant. Now the delay for the station to send a response is decreased to a small delay to make sure the ACK is ready to send plus the time to send from the station to the headend (much smaller than the other direction in cable systems). Hints can work when the station is sending data and receiving ACKs, too, although the hint information requires more processing for most efficient use of the communications channel. The benefit of this approach is that it uses information about the use of a MAC layer protocol by higher level protocols to improve the efficiency of the MAC layer protocol.

Figure 27:
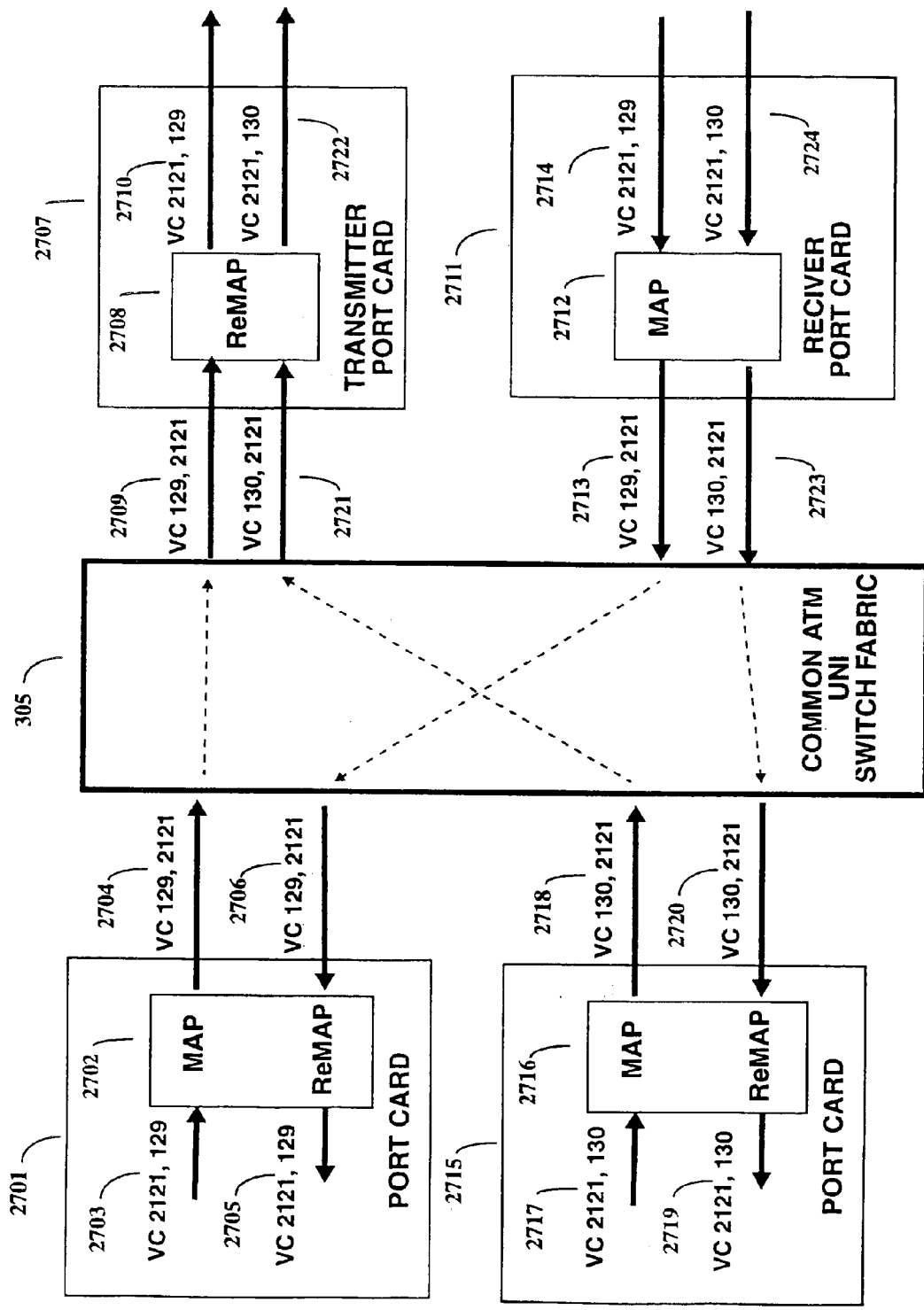
FIG. 27 illustrates the mapping of the VCI, VPI space of an ATM cell through a common ATM UNI Switch Fabric.

FIG. 27 illustrates the mapping of the VCI, VPI space of an ATM cell through a common ATM UNI Switch Fabric 305. Port card 2701 supports a VC 2121, 129 corresponding to a virtual path identifier of 2121 and a virtual circuit identifier of 129. In the currently preferred embodiment, the VPI space of an ATM cell is used in the downstream to indicate the destination station. Thereby, VC 2121, 129 corresponds to a station assigned an identification of 2121 which is connected via virtual circuit 129. Unfortunately, a Common ATM UNI Switch Fabric 305 only supports an 8-bit VPI field of an ATM cell header. This imposes a limit of 0–255 different station IDs. The present invention overcomes this limitation by swapping or "mapping" the VPI value with the VCI value. Since the VCI value has a 16-bit field, identifications can now extend from 0–65,535. This mapping is proper so long as the VCI value does not exceed 255.

In the example shown, the virtual connection 2703 on VC 2121, 129 is input to mapping block 2702. But before the mapping is performed, block 2702 determines whether the VCI exceeds a pre-determined threshold (e.g., 128). The mapping function is performed only if the threshold is exceeded. In this example, the VCI value of 129 exceeds the threshold value of 128, thereby mapping block 2702 maps VC 2121, 129 to a new virtual connection at 2704 on VC 129, 2121. VC 129, 2121 can now be properly carried by the Common ATM UNI Switch Fabric 305 to the Transmitter Port Card 2707 on interface 2709. Similarly, for remapping to be performed, the VPI is checked to determine whether it exceeds the threshold. After determining that the VPI is greater than 128, ReMap block 2708 remaps the VPI and VCI values to recover the original VC 2121, 129 for output on line 2710. Consequently, Port Card 2701 and Transmitter Port Card 2707 can emulate an NNI transmission in VP space while utilizing a UNI Switch Fabric by means of the mapping and remapping functions of blocks 2702 and 2708. The benefit of this implementation is that by mapping all VCs into VPs through the switch fabric, the VC values (e.g., station IDs) are allowed to vary accordingly, thereby facilitating virtual paths through the switch fabric which minimizes the number of virtual connections that need to be supported, thereby improving the switching performance and reducing switch table memory requirements. Furthermore, these functions are performed transparently to the user.

The return path through Receiver Port Card 2711 receives VC 2121,129 on line 2714. Mapping block 2712 checks that the VCI is greater than 128 before it maps the new VC 129, 2121 to line 2713. VC 129, 2121 is then routed through Common ATM UNI Switch Fabric 305 to Port Card 2701 via line 2706. Block 2702 then determines whether the VPI exceeds 128 before it performs a remapping function to recover VC 2121, 129 on line 2705. Hence, a bidirectional connection is demonstrated.

Port Card 2715 shows the mapping function for VC 2121, 130, which has a virtual connection value of 130 instead of 129. After the mapping function is performed by block 2716, this allows a different VPI to be routed through the Common ATM UNI Switch Fabric 305 to Transmitter Port Card 2707. The remapping is performed by block 2708 to recover VC 2121, 130 on line 2722. Likewise, on the return path, a VC 2121, 130 received on line 2724 of Receiver Port Card 2711 is mapped by block 2712 to VC 130, 2121 which is. input on 2723 to the Common ATM UNI Switch Fabric 305. VC 130, 2121 is routed as an input 2720 the Remap Block 2716 which remaps and recovers VC 2121, 130 on line 2719. It should be noted in this teaching that Port Card 2701 and Port Card 2715 are each communicating with the same STU, identified by VPI 2121, but each card uses a different VCI. This same mechanism can be extended to support many port cards and many STUS. It should be noted that each port card can maintain many virtual connections to many STUs.

Figure 28:
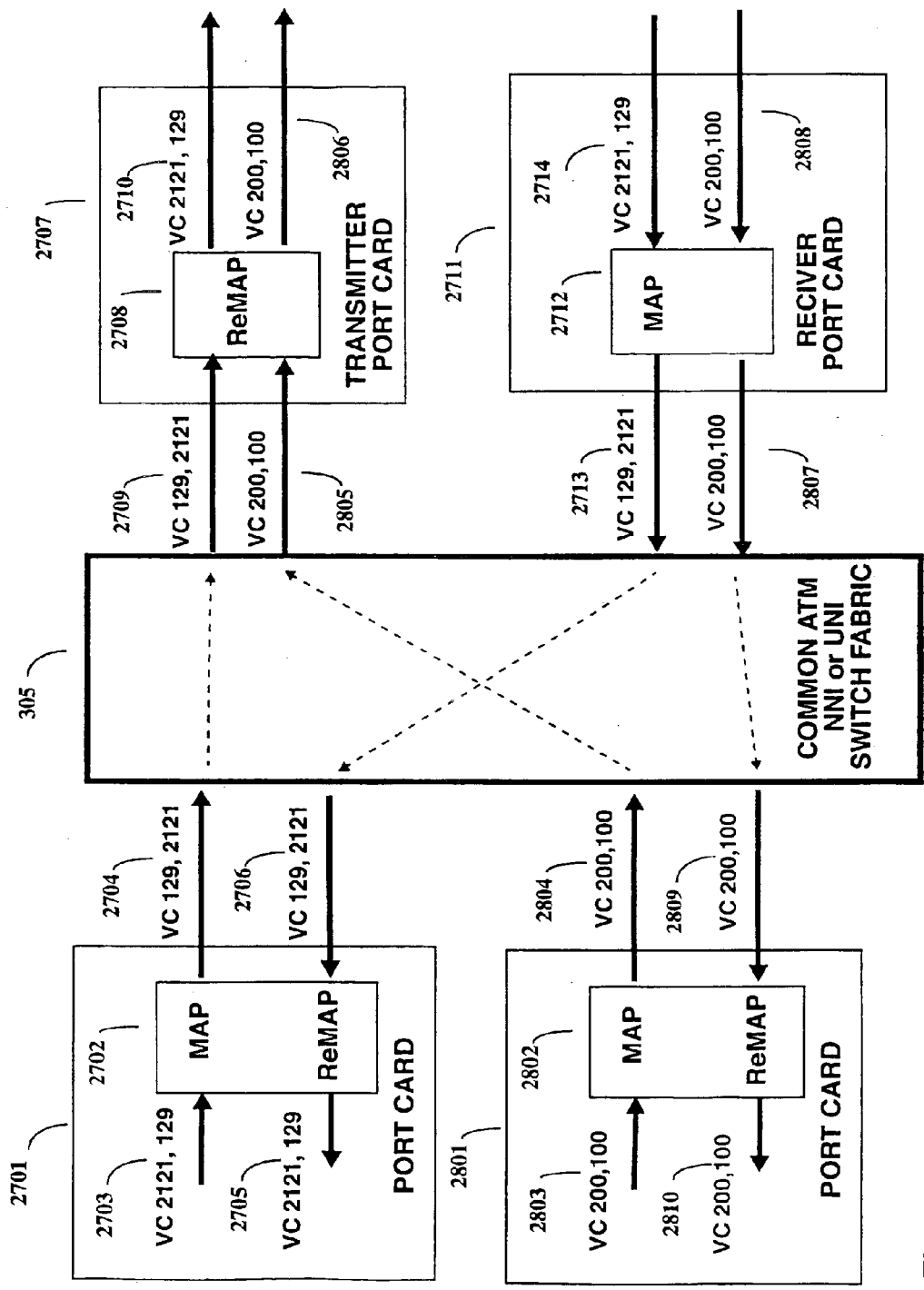
FIG. 28 shows the VCI, VPI space of an ATM cell through a common ATM Switch Fabric with selective mapping.

FIG. 28 shows the VCI, VPI space of an ATM cell through a common ATM Switch Fabric 305 with selective mapping. Switch Fabric 305 may be either an NNI or UNI switch. As described above, the mapping and remapping functions are only applied if a specific threshold is met or exceeded. Otherwise, the packet is routed through the switching fabric as is, without any mapping or remapping being applied. For example VC 200, 100 on 2803 of Port Card 2801 has a VCI of 100 which is less than the threshold value of 128. Hence, the Mapping Block 2802 simply passes VC 200, 100 on through to 2804 without performing the mapping function. VC 200, 100 can be handled by the Common ATM NNI or UNI Switch Fabric 305 which routes it to line 2805 of Transmitter Port Card 2707. Since no mapping was performed, ReMap Block 2708 is instructed to pass VC 200, 100 through without performing its remapping function.

Similarly, on the return path, a VC 200, 100 received on line 2808 of the Receiver Port Card 2711 is not mapped by Mapping Block 2712 because the VCI value is less than the threshold (e.g., 100<128). Hence, VC 200, 100 is routed on line 2807 through the Common ATM NNI or UNI Switch Fabric 305 as an input on line 2809 to Port Card 2801. Again, because mapping was not previously performed, block 2802 does not perform its remapping function. Instead, VC 200, 100 is passed through on 2810. Note that the mapping/remapping of VC 2121, 129 described above can be performed on this same scheme.

Figure 29:
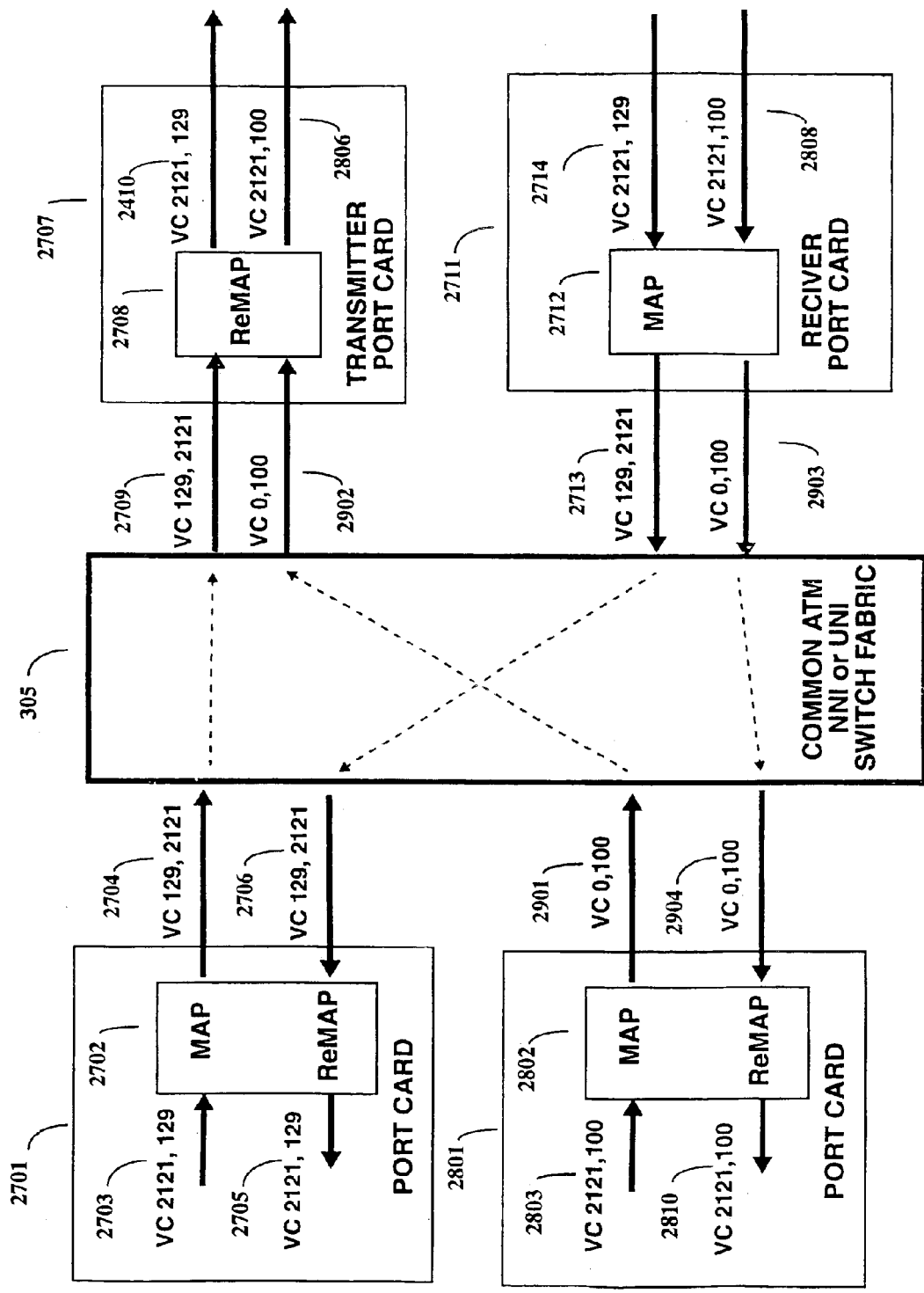
FIG. 29 illustrates the collapsing of the VCI, VPI space of an ATM cell through a Common ATM NNI or UNI Switch Fabric.

FIG. 29 illustrates the collapsing of the VCI, VPI space of an ATM cell through a Common ATM NNI or UNI Switch Fabric 305. Rather than swapping the VCI with the VCI, certain predesignated VPI values can be collapsed into a VPI value of zero. For example, VC 2121, 100 of Port Card 2801 can be collapsed by Mapping Block 2802 to a VC 0, 100. This VC 0, 100 can be carried on line 2901 through the Common ATM NNI or UNI Switch Fabric as an input 2902 to Transmitter Port Card 2707. ReMap Block 2708 then contains information which reconverts VC 0, 100 into the original VC 2121, 100 for output on line 2806. Likewise, on the receive path, a VC 2121, 100 received by Receiver Port Card 2711 on line 2808 is collapsed to VC 0, 100 based on a table stored in Mapping Block 2712. The table stores information pertaining to which VPI values are to be changed into a different VPI value that can be routed by the ATM switching fabric. Thereupon, the converted VC 0, 100 is routed through the Common ATM NNI or UNI Switch Fabric 305 for input 2904 to Port Card 2801. The ReMapping Block 2802 contains a similar table as the one found in Mapping Block 2712. By performing a table look-up, VC 0, 100 is converted back to its original VC 2121, 100 for output on line 2810. Note that conventional virtual connections as well as the mapping/remapping scheme can also be employed in conjunction with this conversion/collapsing scheme. By implementing this direct mapping/collapsing scheme, a UNI switch may be upgraded with an NNI switch without having to replace or impacting any of the associated port cards (e.g., port cards 2701, 2707, 2711, and 2801). It should be noted that the Mapping and Remapping functions presented in FIGS. 27–29 can be generalized to operate over specific fields and bit ranges within the ATM cell header, that is a port of the VCI field may be swapped with a portion of the VPI field, and vice versa. Additionally, the mapping and remapping functions may consist of a table lookup function, which takes a specific fields within the ATM header and maps to another ATM header.

Figure 30:
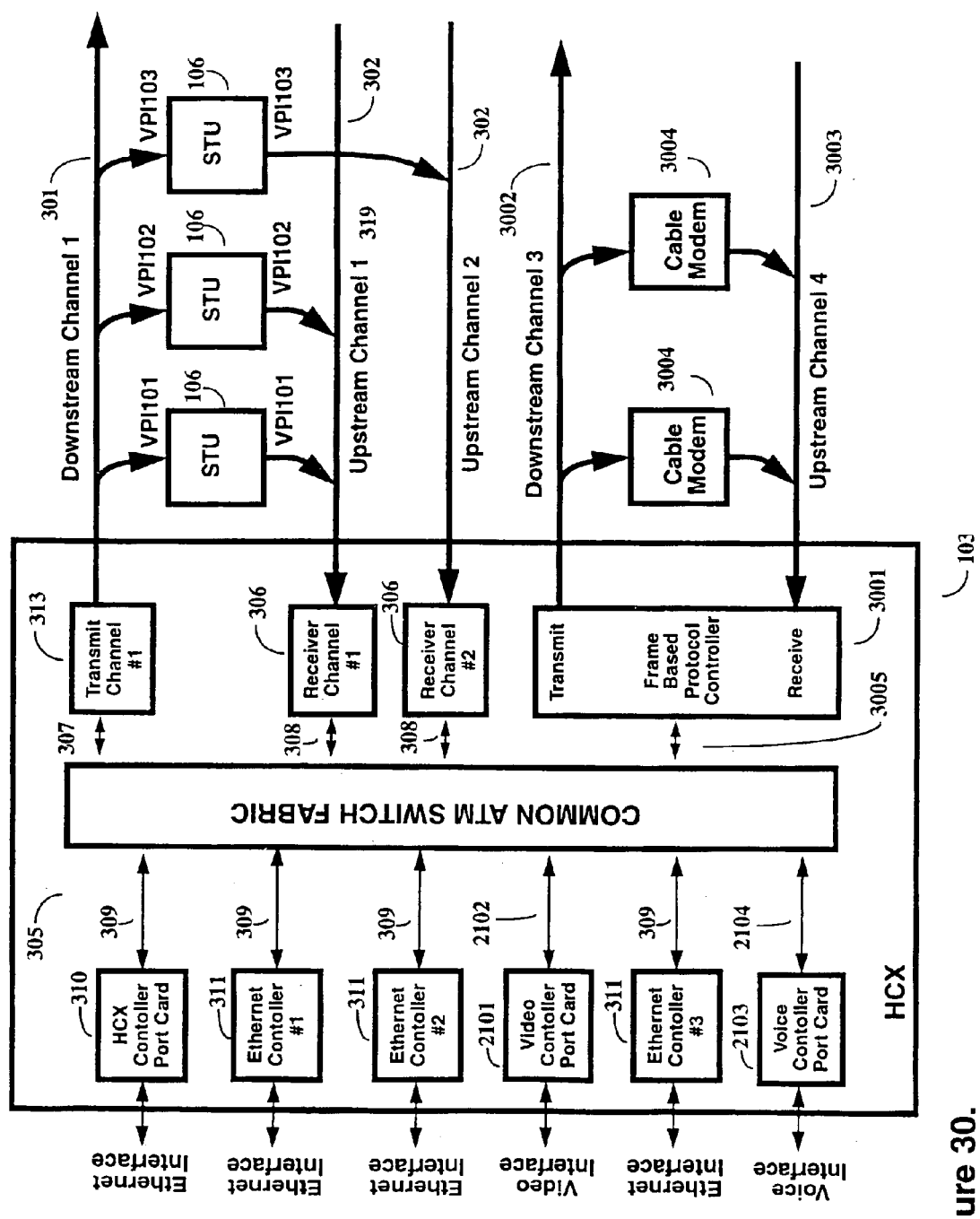
FIG. 30 shows a schematic diagram of a Headend Communications controller supporting two MAC scheduling domains, whereby one of the MAC domains has a non-ATM based protocol.

FIG. 30 shows a schematic diagram of a Headend Communications Controller supporting two MAC scheduling domains, whereby one of the MAC domains has a non-ATM based protocol. Due to the emergence and evolution of new standards and protocols, a non-ATM Protocol Controller 3001 is implemented in order to anticipate and facilitate the compliance with any such non-ATM based protocols. Furthermore, non-ATM Protocol Controller 3001 can expeditiously be used to interface with older, pre-existing parts of the system which might not be ATM based. Non-ATM Protocol Controller 3001 includes transmit and receive channels 3002 and 3003 which are coupled to cable modems 3004. With the use of the non-ATM Protocol Controller 3001, the same Headend Controller, Common ATM Switch fabric, and virtual circuits can be used to handle ATM cells through interfaces 307 and 308 as well as non-ATM based protocols through interface 3005.

Figure 31:
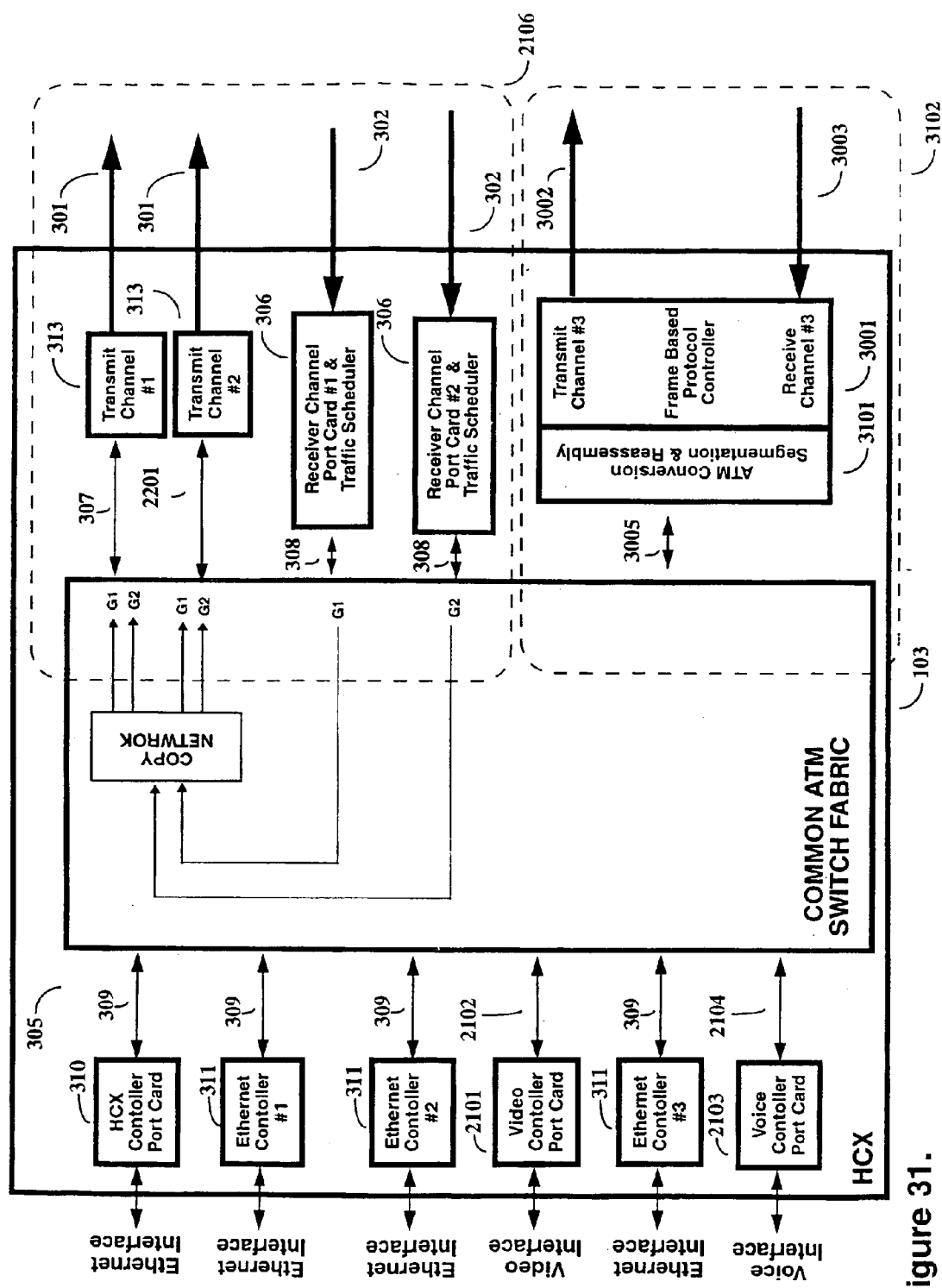
FIG. 31 shows a schematic diagram of two MAC scheduling domains, whereby one of the MAC domains has a grant mechanism through the switch fabric for supporting ATM cells whereas the other MAC domain contains an ATM Conversion circuit for performing segmentation and reassembly so that it is self-contained and does not require grants through the switch fabric.

FIG. 31 shows a schematic diagram of two MAC scheduling domains, whereby one of the MAC domains has a grant mechanism through the switch fabric for supporting ATM cells whereas the other MAC domain contains an ATM Conversion circuit for performing segmentation and reassembly so that it is self-contained and does not require grants through the switch fabric. Receiver Channel Port Cards 306, belonging to the same MAC domain, both have a Traffic Scheduler for generating grants (e.g., G1 and G2) which are transmitted through the Common ATM Switch Fabric downstream via Transmit Channel Port Card 313. However, the Non-ATM Based Protocol Controller 3001 is interfaced with the Common ATM Switch Fabric through interface 3005 by means of an ATM Conversion circuit 3101 which contains Segmentation and Reassembly. Now, because Non-ATM Based Protocol Controller 3001 is wholly contained, there is no need to form a request and grant path through the Common ATM Switch Fabric. Hence, it can exist in its own MAC domain.

Figure 32:
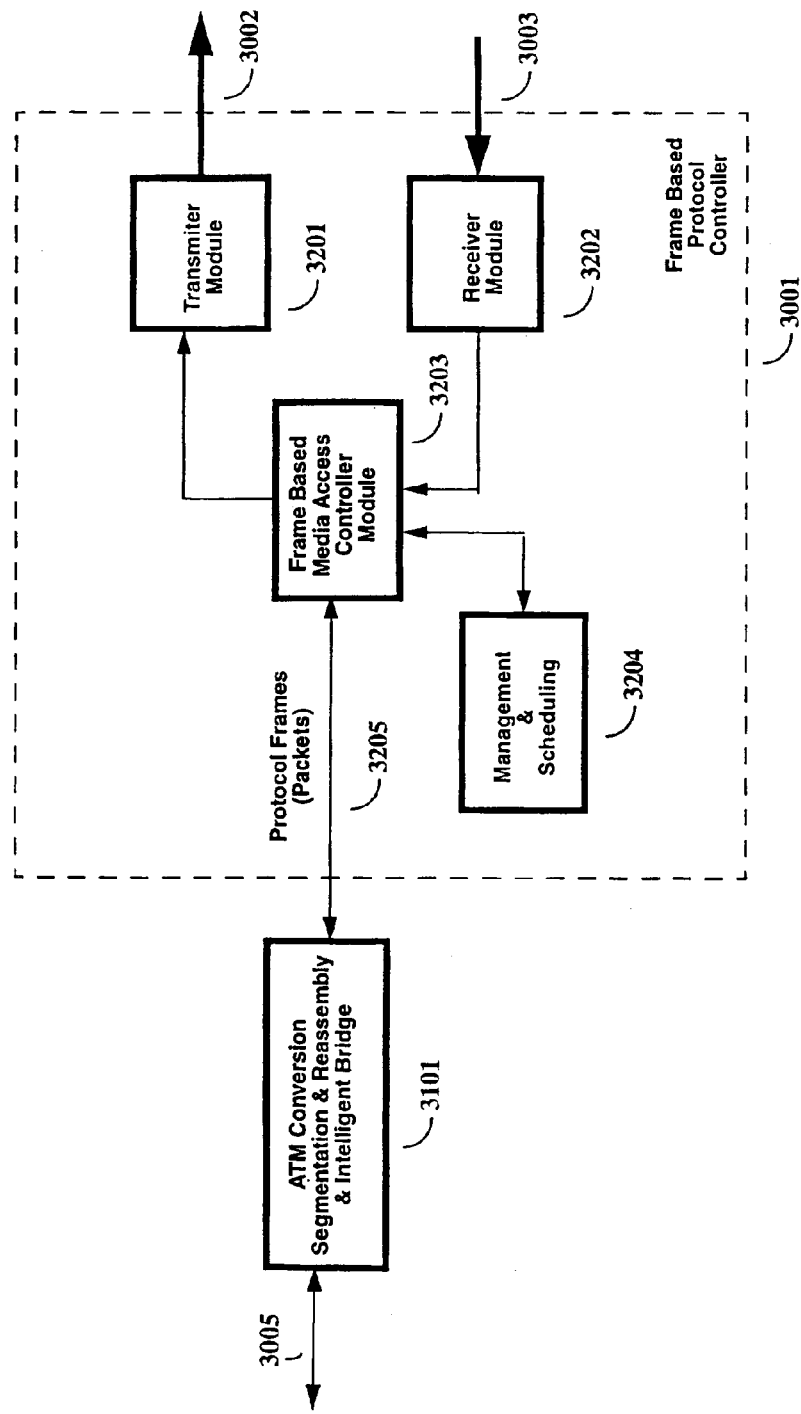
FIG. 32 is a schematic diagram showing the Non-ATM Based Protocol Controller connected to the ATM Conversion Segmentation and Reassembly circuit.

FIG. 32 is a schematic diagram showing the Non-ATM Based Protocol Controller 3001 connected to the ATM Conversion Segmentation and Reassembly circuit 3101. The function of the Non-ATM Based Protocol Controller 3001 is to exchange Ethernet frames or IP packets through the downstream and upstream RF. A Transmitter Module 3201 handles downstream traffic on 3002, and Receiver Module 3202 handles upstream traffic received on 3003. The Media Access Controller Module 3203 which coordinates the MAC scheduling and flow according to the Management and Scheduling block 3204. Protocol Frames/Packets are communicated between the Media Access Controller Module 3203 and the AIM Conversion Segmentation and Reassembly circuit 3101 through interface 3205. The ATM Conversion Segmentation and Reassembly circuit 3101 also contains an intelligent Bridge.

Figure 33:
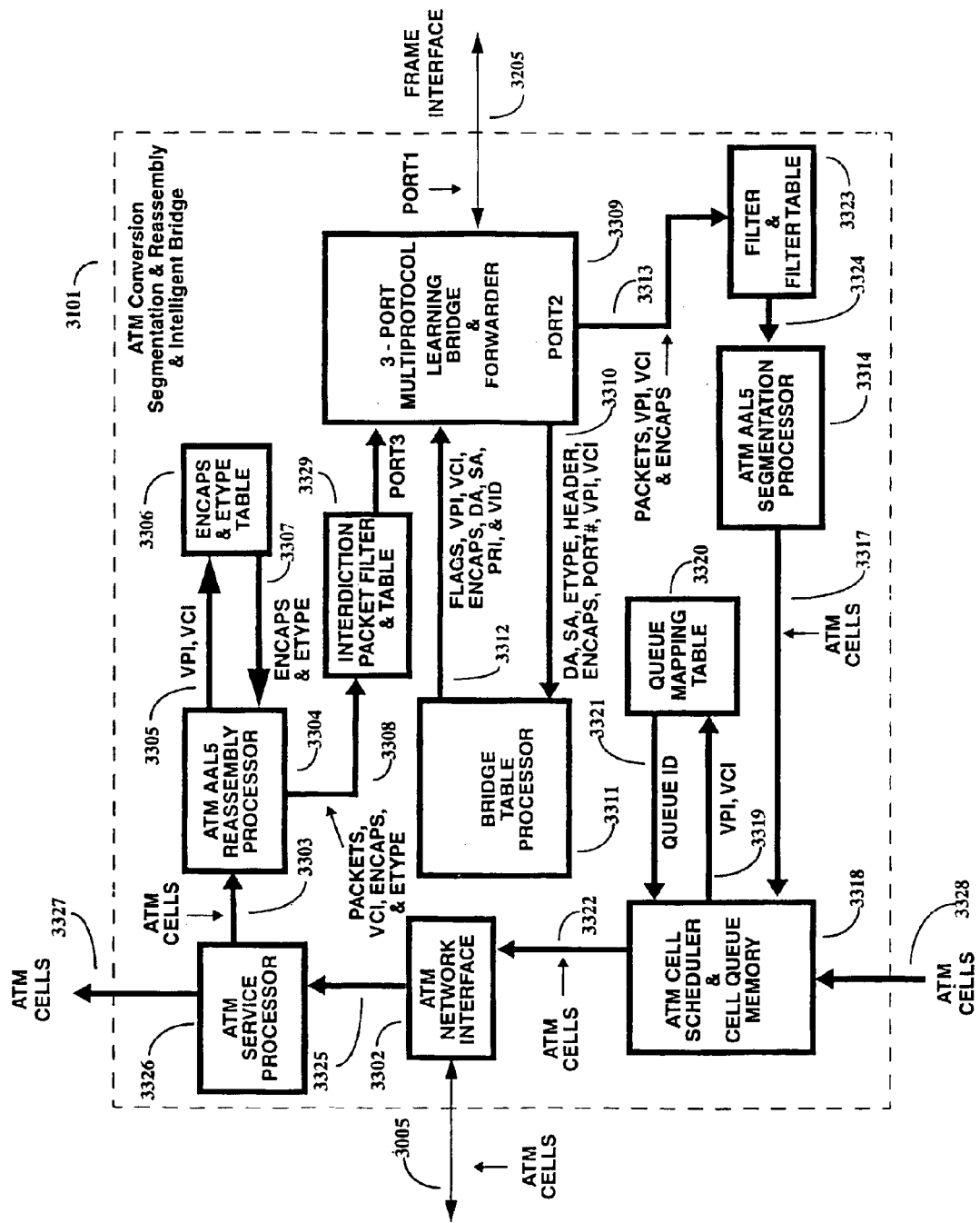
FIG. 33 shows a detailed schematic diagram of the ATM Conversion Segmentation and Reassembly circuit.

A detailed schematic diagram of the ATM Conversion Segmentation and Reassembly circuit is shown in FIG. 33. The ATM Conversion Segmentation and Reassembly circuit is very similar to the Ethernet ATM Leaf Processor shown and described with reference to FIG. 10 above. Some of the differences is the absence of the Ethernet Controller and the frames now communicate through interface 3205 directly with port 1 of the 3-Port Multiprotocol Learning Bridge and Forwarder 3309 which maps virtual connections to and from frame based address information. Basically, similar to what was described above, ATM cells received by the ATM Networking Interface 3302 on interface 3005 are transmitted to the ATM Service Processor 3326 on line 3325. Based on the VPI and VCI, the ATM Service Processor 3326 decides whether the ATM cells are to be forwarded to an external interface through line 3327 or to the ATM AAL5 Reassembly Processor 3304. In the ATM AAL5 Reassembly Processor 3304, ATM cells are reconstituted into packets according to the commonly available semantics of AAL5 reassembly and the encapsulation information 3307 obtained by a lookup of the virtual connection information 3305 in the Encapsulation and ETYPE Table 3306. The packet, the virtual connection obtained from the ATM cells which carried the data, the encapsulation type, and ETYPE information are transmitted 3308 to the 3-Port Multiprotocol Learning Bridge & Forwarder 3309.

Upon receiving an Ethernet Frame from Port 3, the Forwarder 1009 constructs a query 3310 to the Bridge Table Processor 3311 which performs a table lookup function based upon the information in the query. The Bridge Table Processor 3311 returns a response 3312 to the Forwarder 3309 with instructions on how to proceed with the Ethernet frame.

Filter And Filter Table 3323 provides a multi-protocol packet examination function which decides whether a packet is allowed to continue upstream or whether it should be discarded. The Filter Table is configure by the cable operator to allow only authorized transmissions upstream. Hence, if Filter 1023 determines that the packet is valid, the packet is allowed to proceed upstream to the ATM AAL5 Segmentation Processor 3314 on line 3324. Otherwise, if there is no match, the packet is discarded. Thereby, cable operators have the ability to control transmissions from the STUs, and unauthorized transmissions can be prevented The ATM AAL5 Segmentation Processor 3314 is responsible for receiving Ethernet frames, virtual connection, and encapsulation information 3313 from the Forwarder 3309 and converting the Ethernet data into a stream of ATM cells. The Ethernet data is processed according to the encapsulation information. The virtual connection information is copied to the VPI and VCI values contained in the ATM cells generated by the process. The ATM cells are then transmitted 3317 to the ATM Cell Scheduler & Cell Queue Memory Processor 3318.

In the preferred embodiment, the Queue Controller 3318 performs a lookup of the virtual connection information 3319 in the Queue Mapping Table 3320 to obtain the queue identifier ("Queue ID") number in which to place the ATM cells. The Queue Controller 3318 then enqueues the appropriate internal cell queue. The Queue Controller 3318 maintains many internal queues in priority number and transmits cells 3322 from the highest priority queue which has enqueued cells directly to the ATM Network Interface 3302 and onto the ATM switch fabric on 3005 without having to wait for a grant message due to the lack of a request/grant mechanism. Thereby, ATM Conversion Segmentation and Reassembly and Intelligent Bridge 3101 essentially moves the previously defined Ethernet handling from the STU into the Headend and acts as an interface to the entire non-ATM media access. Because most of the functions inside the Ethernet Leaf Processor are equivalent to the Ethernet processing found in an STU, this non-ATM MAC can be fronted into the common ATM switching fabric identical to a cable modem. Consequently, the same equivalence with the virtual networks described above is achieved. It should be noted that the Queue Controller 3318 may be implement other scheduling mechanisms other that a priority sort of the queues.

Figure 34:
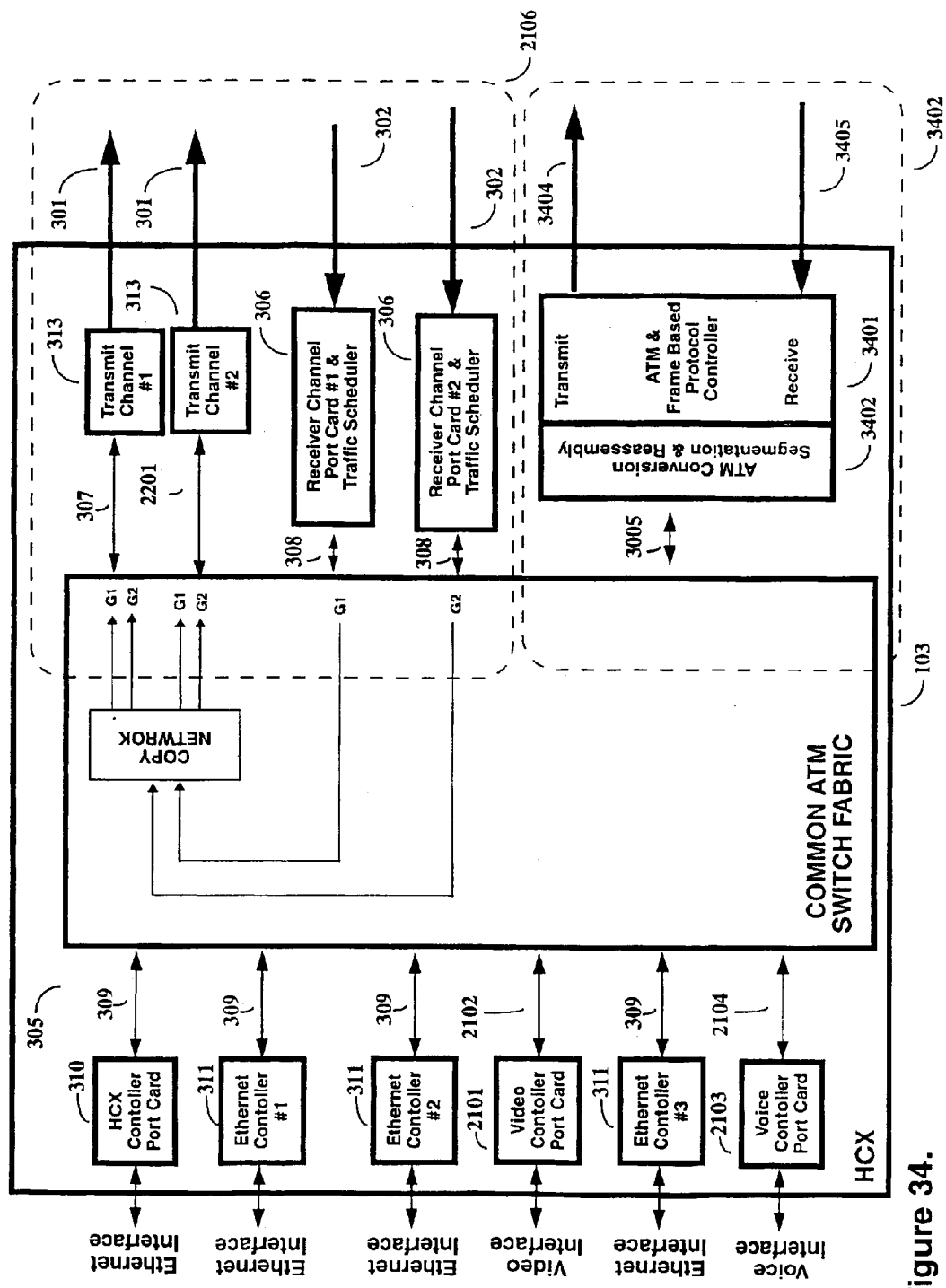
FIG. 34 shows a schematic diagram of two MAC scheduling domains, whereby one of the MAC domains is ATM only protocol and the other MAC domain corresponds to a protocol that is ATM and frame based.

FIG. 34 shows a schematic diagram of two MAC scheduling domains, whereby one of the MAC domains is ATM only protocol and the other MAC domain corresponds to a protocol that is both ATM and frame based. Receiver Channel Port Cards 306, belonging to the same MAC domain, both have a Traffic Scheduler for generating grants (e.g., G1 and G2) which are transmitted through the Common ATM Switch Fabric downstream via Transmit Channel Port Card 313. However, the ATM and Frame Based Protocol Controller 3401 contains a receiver for receiving ATM cells or frames on line 3405 on the upstream and a transmitter for transmitting ATM cells or frames on the downstream 3404. The ATM and Frame Based Protocol Controller 3401 is interfaced with the Common ATM Switch Fabric through interface 3403 by means of an ATM Conversion circuit 3402 which contains Segmentation and Reassembly. Now, because Non-ATM Based Protocol Controller 3401 is wholly contained, there is no need to form a request and grant path through the Common ATM Switch Fabric. Hence, it can exist in its own MAC domain.

Figure 35:
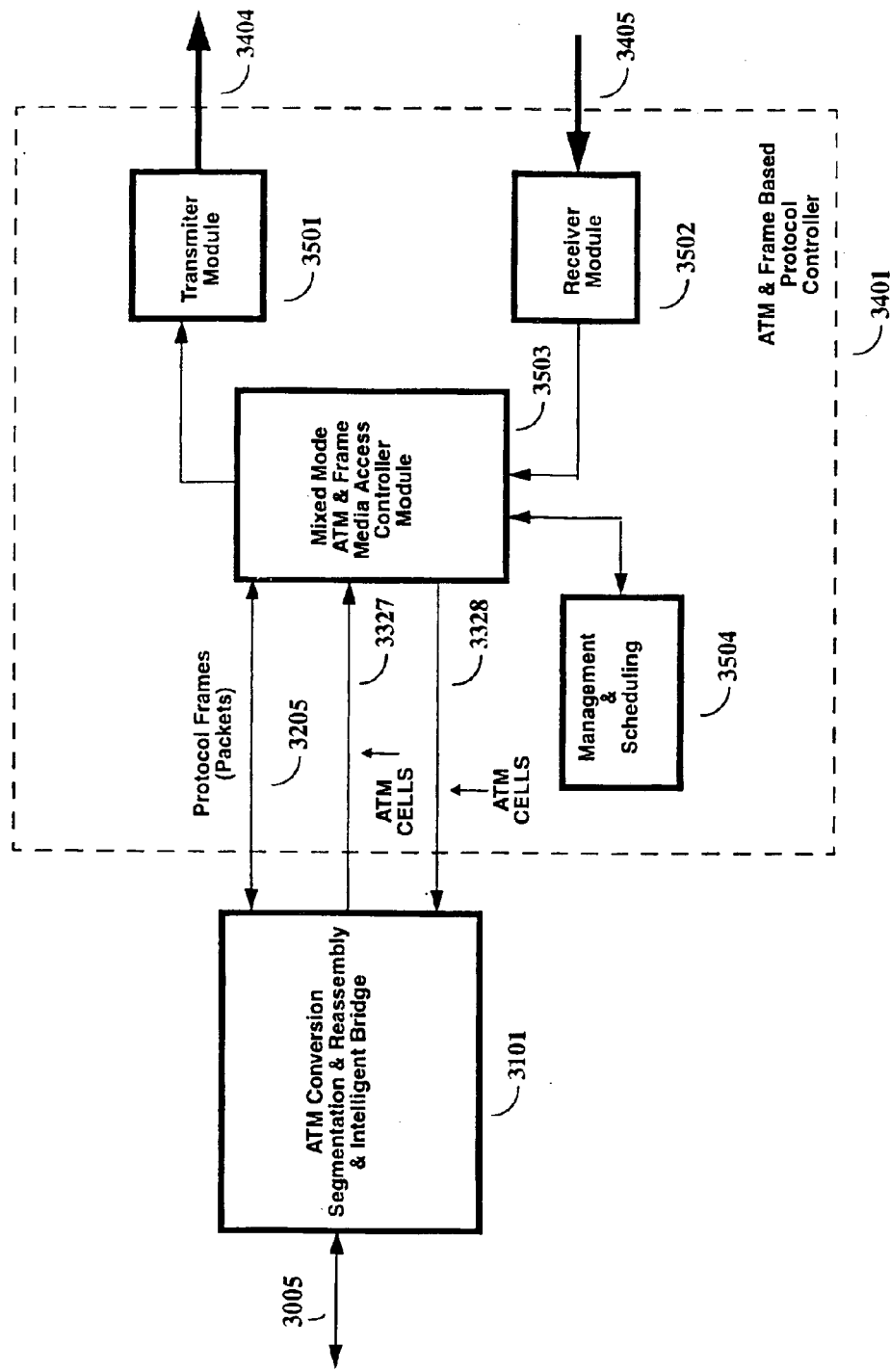
FIG. 35 is a schematic diagram showing the ATM and Frame Based Protocol Controller connected to the ATM Conversion Segmentation and Reassembly circuit.

FIG. 35 is a schematic diagram showing the ATM and Frame Based Protocol Controller 3401 connected to the ATM Conversion Segmentation and Reassembly circuit 3101. The function of the Non-ATM Based Protocol Controller 3001 is to exchange Protocol frames (packets) or ATM cells through the downstream and upstream RF. A Transmitter Module 3501 handles downstream traffic on 3404, and Receiver Module 3502 handles upstream traffic received on 3405. The Mixed mode Media Access Controller Module 3503 coordinates the MAC scheduling and flow according to the Management and Scheduling block 3504. Protocol Frames/Packets are communicated between the Mixed Mode Media Access Controller Module 3503 and the ATM Conversion Segmentation and Reassembly circuit 3101 through interface 3205. ATM cells are communicated between the Mixed Mode Media Access Controller Module 3503 and the ATM Conversion block 3101 on lines 3327 and 3328. Note that the same ATM Conversion block 3101 can be used in ATM only mode, non-ATM mode, and ATM and non-ATM mode.

Figure 36:
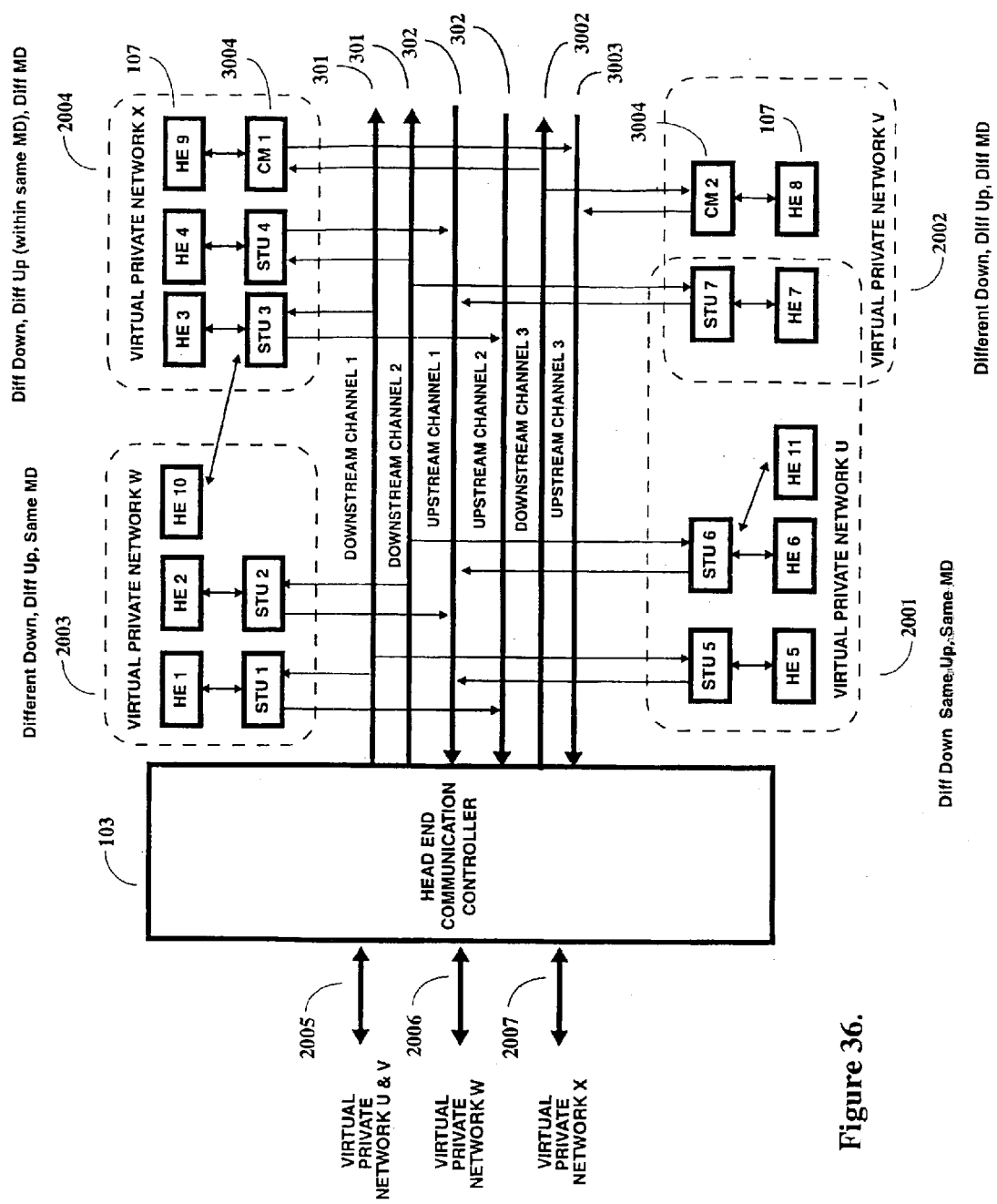
FIG. 36 is a schematic diagram depicting how cable modems belonging to a different protocol can cooperate within various virtual private networks.

FIG. 36 is a schematic diagram depicting how cable modems belonging to a different protocol can cooperate within various virtual private networks. Virtual Private Network X 2004 contains a Cable Modem1 3004 which services HE9 107; Virtual Private Network V 2002 contains a cable modem2 3004 which services HE8. Both cable modems 3004 reside on downstream channel 3 and upstream channel 3 which are separate MAC domains for non-ATM protocols. By virtue of the equivalencies inherent to the virtual connections described above (e.g. establishing virtual private networks through a common ATM switch to the Ethernet Root Processors and establishing the Ethernet Leaf Processor at the Headend to front that functionality onto another MAC domain), cable modems 3004 which are restricted to a different protocol can, nevertheless, cooperate within their respective virtual private networks. In other words, a virtual private networks can consist of cable modems that do not share the same MAC type as the STUs. It should be noted that any number of virtual private networks may be established over downstream channel 3002 and upstream channel 3003, with each virtual private networks consisting of one or more Anus.

Figure 37:
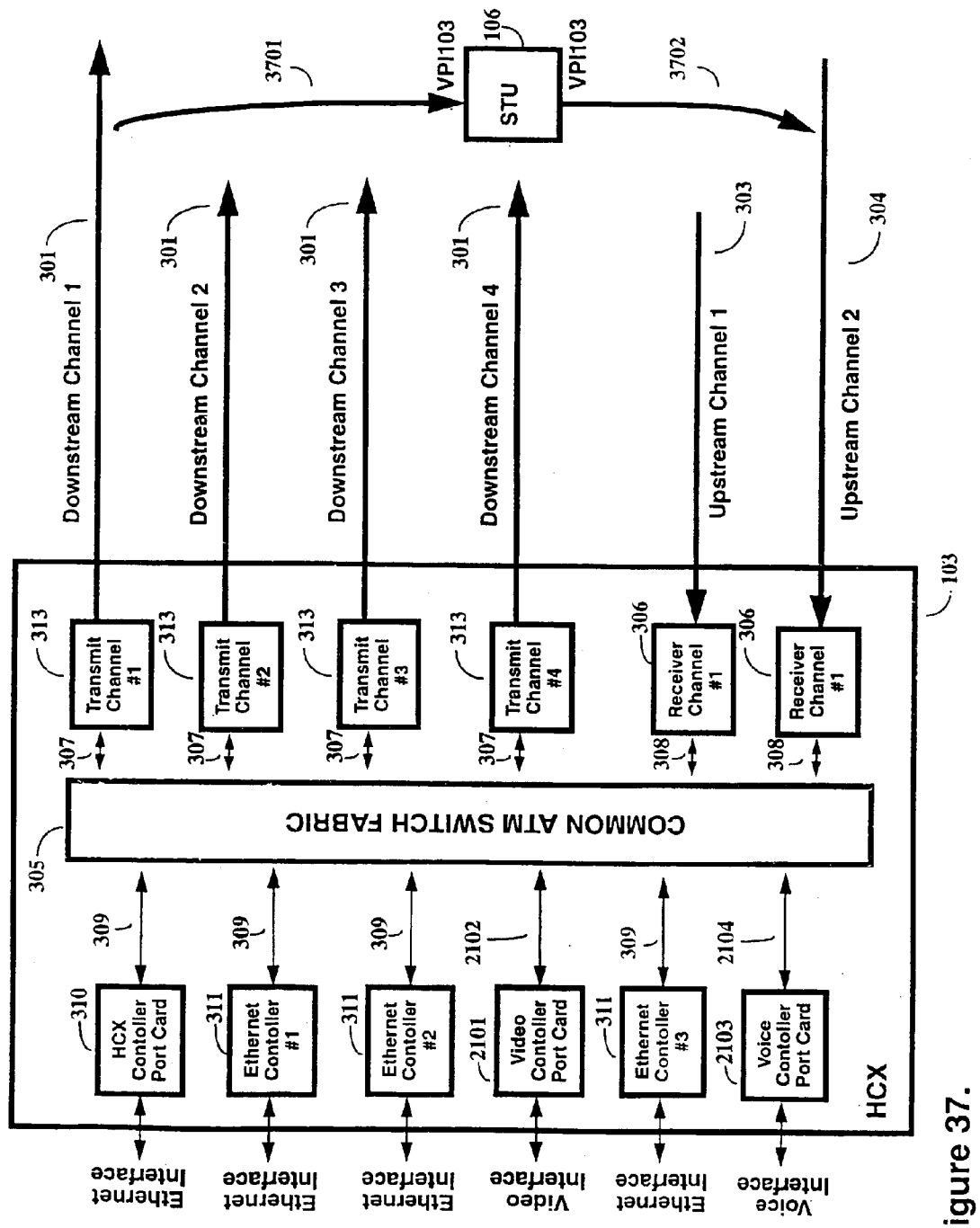
FIG. 37 shows a schematic diagram of a Headend Communications Controller supporting an STU which has the ability to selectively be coupled to one of a number of different downstream channels for its reception of desired data.

FIG. 37 shows a schematic diagram of a Headend Communications Controller supporting an STU which has the ability to selectively be coupled to one of a number of different downstream channels for its reception of desired data. This selectivity feature is significant because the Headend Controller 103 is capable of handling a variety of different types of data, such as audio, graphics, video, text, etc. This data is sent downstream 301 on channels 1–4 to STUs. During transmission, attenuation and a number of error sources, such as noise, interference, crosstalk, etc. may result in the data becoming corrupted. In an effort to correct these errors, a forward error correction scheme is implemented on a per channel basis. The degree to which errors may be corrected depends on the interleave depth of the forward error correction. Increasing the interleave depth results in less errors. However, increasing the interleave depth directly increases the time that is required to perform the forward error correction, which detrimentally influences the round-trip latency through the network. For high quality video transmissions, it is desirable to increase the interleave depth because the corresponding increase in latency has minimal impact on the viewer while the viewer enjoys better picture quality. In contrast, for high-speed Internet data transmissions or interactive gaming applications occurring in real-time an increase in the network latency severely degrades performance, as perceived by the user.

In one embodiment of the present invention, this high quality versus high latency dilemma is resolved by assigning interleave depths on a downstream channel basis. For instance, downstream channel 1 might be designated with a relatively high interleave depth, whereas downstream channel 2 might be designated with a lower interleave depth. Consequently, data transmissions on downstream channel 1 have less errors but have greater latencies as compared against data transmissions on downstream channel 2. The user is given control over which channel he or she wishes to dial into for receiving the desired service. For example, the user on STU 103 may be watching television in which picture quality is of more importance than latency. Hence, a path 3701 is established to downstream channel 1 over VPI 103 as shown in FIG. 27. Path 3702 is established to upstream channel 2 for sending non time-critical data (e.g., email).

Figure 38:
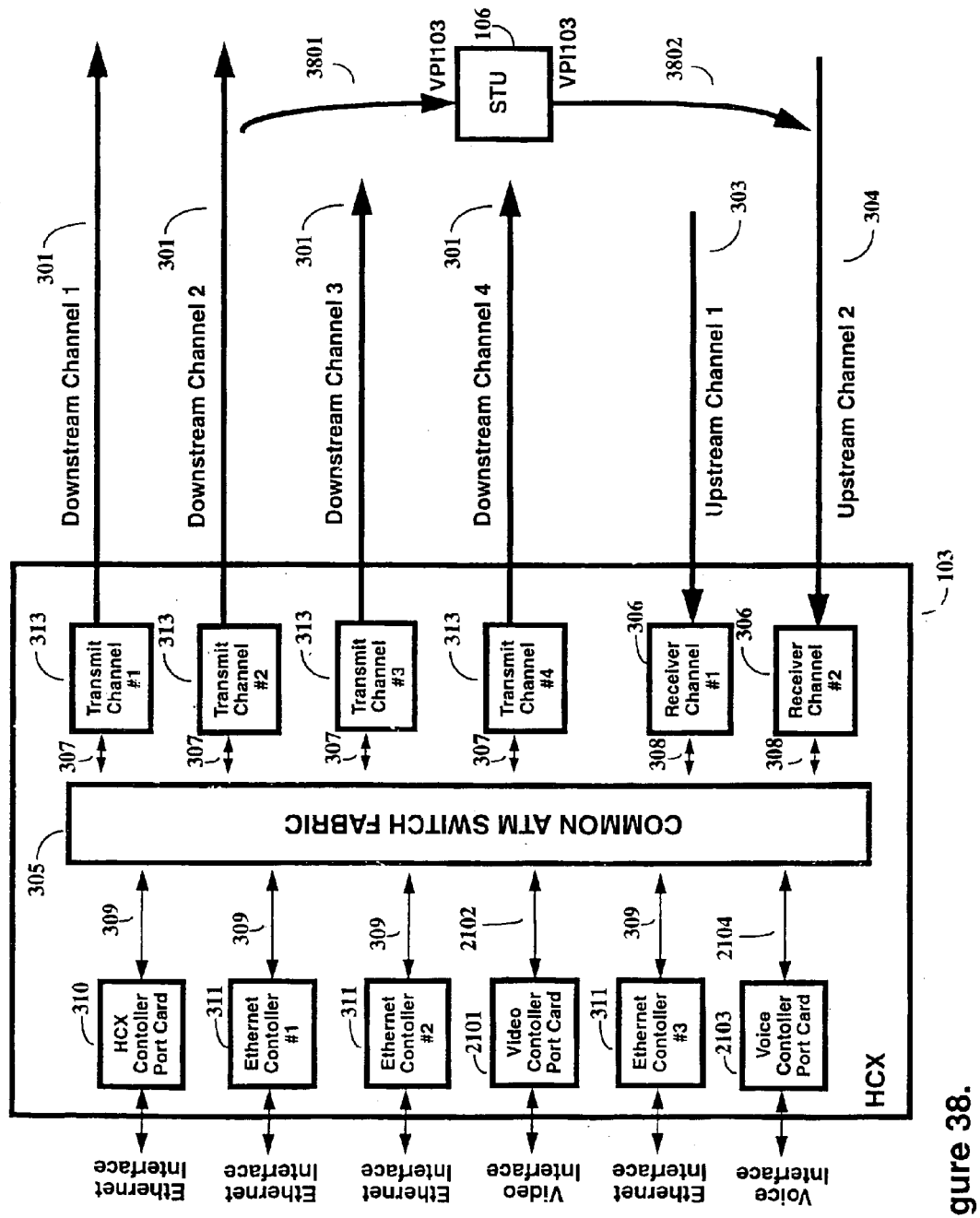
FIG. 38 shows a schematic diagram of a Headend Communications Controller supporting an STU which has been selectively reconfigured to establish a virtual path with a different downstream channel.

Suppose that the user next wishes to perform web browsing and desires to minimize any delays. The user's home equipment would then transmit a request to switch from downstream channel 1 (high latency) to downstream channel 2 (lower latency) as shown in FIG. 38. The protocol for handling such requests can be implemented in many different ways. For example, it may be implemented as a service location protocol, a proprietary application interchange that overlays the TCP/IP provided by the cable operator, or as a web browser applet that allows the user to select the desired quality of service. The selected quality of service request is transmitted upstream to the Headend Controller 103 which sets up a different virtual circuit, thereby reconfiguring the user's STU to the downstream channel appropriate for that selection. Note that there is no difference in the services received by the STU. Changing the downstream channel only changes the degree of error correction and latency. The cable operator may charge according to the quality of service selected by the users. With the present invention, the user can be selected whether response time or error rate is important to their perceived service, to communicate such preferences to the head-end controller, and thereby affect changes such that the STU is channel hopped to the appropriate downstream channels which suits the subscribers needs.

Some applications, such as broadcast digital video require as error free a downstream channel as possible. For these applications, a large amount of burst protection is required, so that the user does not perceive appearance problems due to noise. Since broadcast video is not interactive, user response time perception is not an issue. For interactive digital Internet services however, response time is an issue, so lower latency is preferred by users. As Internet service in general solve error loss problems with a reliable transport protocol, the amount of burst protection required in the downstream channel is minimal, thereby providing little latency contribution. Internet protocols can function in high latency situations however, users perceive a longer response time and they'll likely desire a lower latency, or a QoS suited for Internet application they are using. If a user is both receiving a digital broadcast video service and accessing an Internet service via the same Subscriber Terminal Unit and the same downstream channel, the user may select a downstream channel QoS suited for better video reception and then tolerate the longer response time of the Internet service. If the user requires a better response time for their Internet service (e.g. web browsing, game playing, or DP telephony) then they may elect to select a dow stream channel QoS suitable for the Internet service, and then tolerate the "snow" or the error artifacts perceived on their TV screen. This selection is in effect a QoS Knob for the user, with one end of the adjustment selecting very small burst protection and lowest latency and the other end of the scale support best burst protection and much higher latency. A QoS Knob can be available separately the downstream channel and the upstream channel, or may be combined. Also, cable operators can differentially charge based on the QoS requested by the user. It is expected that the lowest latency channels will be in demand for Internet services due to the better response time. If the availability of these channels is few, then the cable operator can differentially charge for providing lowest latency service. It is expected that the lowest error rate channels will be in demand for digital broadcast video services, and consequently be in demand for video on demand services. Average delay and error rate channels will be plentiful for most services, providing the cable operator a means to justify a basic QoS price point for average service. Moving to either QoS side of average error rate and average latency can justify a higher billing rate.

The implementation of the QoS Knob can be provided to users using several different mechanisms, using both direct and indirect techniques. For direct techniques, the user may request a QoS channel for the Subscriber Terminal Unit via a UNI signaling exchange between the consumers Home Equipment and the head-end controller. The head-end controller then processes the request and affects a change suitable to support the users requests. Such changes may include moving the virtual connections between the head-end controller and the Subscriber Terminal Unit from one downstream channel to another; another change may be changing the scheduling parameters for the downstream traffic to the STU or the upstream traffic from the STU to affect a change. If the new QoS resources (channels and bandwidth) are available, the subscribers request can be processed, and the cable operator has the option to change their billing rate accordingly. If the resources are not available, the user should be given feedback, via the direct signaling response, and their billing should not be changed. Another example of direct QoS Knob implementation would be for a web browser server to be running on the Head-End Controller Port Card and the user access their QoS selection via a web browser running in their Home Computing Equipment (e.g. a world wide web browser running on a PC). Changes made via the web interface would be the same as via the direct UNI signaling. It should be noted that other direct signaling techniques, such as IP RSVP and IEEE 802.1P and IEEE802.1Q priorities can be used as a basis for establishing a direct signaling channel. It should be noted that future digital television sets and digital set-top boxes will be interactive allowing signaling to be accomplished from the user via screen messages and wireless remote controls.

It should be noted that indirect techniques include the observance in a change in packet protocols and application protocol messages that flow through the head-end controller. The subscriber may have arranged with the cable operator for differential QoS to be automatically enabled when certain applications are running. For example, the packet filter 922 can be augmented to observe the start or stop of an IP based telephony application for a particular STU. Such observances, can be communicated to the Headend Controller Port Card via a management message which can then affect a change in the QoS delivered to and from the STU.

Additional details are presented in "The UPSTREAMS Protocol for HFC Networks" proposal which was submitted to an IEEE committee as IEEE P802.14-95/152 and which is referenced herein. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a communication system, a method for controlling receipt of upstream data and transmission of downstream data, comprising the steps of:

storing a plurality of valid IP addresses in a memory;

receiving packets transmitted by a subscriber terminals on one or more upstream channels, wherein the packets are received by a packet interface on a first upstream path;

examining the packets to determine destination addresses;

comparing IP addresses corresponding to an address resolution protocol packet with the valid IP addresses stored in memory to determine whether packets are valid or invalid;

processing valid packets;

discarding invalid packets selectively forwarding the packets from the packet interface on a first downstream path for transmission over one or more downstream channels to designated subscriber terminal units according to the destination addresses.

2. The method of claim 1, further comprising the steps of:

storing information pertaining to which packets are intended to be received by a particular subscriber terminal unit in a memory;

examining each packet received by the particular subscriber terminal unit to determine whether the packet was intended to be received by that particular subscriber terminal unit;

processing only downstream multicast packets that were intended to be received by that particular subscriber terminal unit;

discarding downstream multicast packets that were not intended to be received by that particular subscriber terminal unit.

3. A communication system comprising:

a cable network having one or more downstream channels and one or more upstream channels;

a plurality of subscriber terminal units coupled to the cable network;

a head end controller coupled to the cable network for controlling upstream and downstream communications, wherein the head end controller includes:

a packet interface for receiving packets from subscriber terminal units on a first upstream path;

a packet forwarder coupled to the packet interface for selectively forwarding packets from the packet interface on a first downstream path for transmission over one or more downstream channels to designated subscriber terminal units:

a memory for storing a plurality of valid IP addresses;

a filter coupled to the memory for comparing IP addresses corresponding to an address resolution protocol packet with the valid IP addresses stored in memory, wherein only valid packets are processed and invalid packets are discarded.

4. The communication system of claim 3, wherein one of the subscriber terminal units comprises:

a memory for storing a plurality of valid IP addresses;

a filter coupled memory for comparing IP addresses corresponding to an address resolution protocol packet with the valid IP addresses stored in memory, wherein only valid packets are allowed to proceed upstream and invalid packets are discarded.

5. The communication system of claim 3, wherein one of the subscriber terminal units is comprised of:

a memory for storing information pertaining to which packets are to be received by the subscriber terminal unit;

a filter coupled to memory for selectively processing only downstream multicast packets according to the information stored in the memory.

* * * * *